US008815070B2

(12) United States Patent
Wang et al.

(10) Patent No.: US 8,815,070 B2

(45) Date of Patent: Aug. 26, 2014

(54) MICROELECTRODE ARRAY ARCHITECTURE

(75) Inventors: Gary Chorng-Jyh Wang, Cupertino, CA (US); Ching Yen Ho, Los Gatos, CA (US); Wen Jang Hwang, Fremont, CA (US); Wilson Wen-Fu Wang, San Jose, CA (US)

(73) Assignee: Sparkle Power, Inc., San Jose, CA (US)

(*) Notice: Subject to any disclaimer, the term of this patent is extended or adjusted under 35 U.S.C. 154(b) by 432 days.

(21) Appl. No.: 13/029,140

(22) Filed: Feb. 17, 2011

(65) Prior Publication Data

US 2011/0247934 A1 Oct. 13, 2011

Related U.S. Application Data

(60) Provisional application No. 61/312,240, filed on Mar. 9, 2010, provisional application No. 61/312,242, filed on Mar. 9, 2010, provisional application No. 61/312,244, filed on Mar. 10, 2010.

(51) Int. Cl.
*B01J 8/00* (2006.01)
*B01L 3/00* (2006.01)

(52) U.S. Cl.
CPC ... *B01L 3/502792* (2013.01); *B01L 2400/0427* (2013.01); *B01L 2300/161* (2013.01); *B01L 2300/089* (2013.01); *B01L 2300/0816* (2013.01)
USPC ............................................ 204/643; 422/81

(58) Field of Classification Search
USPC .................................... 204/643; 422/81, 189
See application file for complete search history.

(56) References Cited

U.S. PATENT DOCUMENTS

2007/0242111 A1* 10/2007 Pamula et al. .................. 347/81

OTHER PUBLICATIONS

Pollack, et al. "Electrowetting-based actuation of droplets for integrated microfluidics" Lab on a Chip, vol. 2, No. 2, May 2002, p. 96-101.*

* cited by examiner

*Primary Examiner* — J. Christopher Ball

(74) *Attorney, Agent, or Firm* — Grace Lee Huang; Arch Eqvity Holdings, LLC

(57) ABSTRACT

Disclosed herein is a device A device of the microelectrode array architecture, comprising: (a) a bottom plate comprising an array of multiple microelectrodes disposed on a top surface of a substrate covered by a dielectric layer; wherein each of the microelectrode is coupled to at least one grounding elements of a grounding mechanism, wherein a hydrophobic layer is disposed on the top of the dielectric layer and the grounding elements to make hydrophobic surfaces with the droplets; (b) a field programmability mechanism for programming a group of configured-electrodes to generate microfluidic components and layouts with selected shapes and sizes; and, (c) a system management unit, comprising: (i) a droplet manipulation unit; and (ii) a system control unit.

18 Claims, 72 Drawing Sheets

MICROELECTRODE ARRAY ARCHITECTURE

CROSS REFERENCE TO RELATED APPLICATIONS

The present application claims benefit of priority under 35 U.S.C. 119(e) to: U.S. Patent Application 61/312,240, entitled "Field-Programmable Lab-on-a-Chip and Droplet Manipulations Based on EWOD Micro-Electrode Array Architecture" and filed Mar. 9, 2010; U.S. Patent Application 61/312,242, entitled "Droplet Manipulations on EWOD-Based Microelectrode Array Architecture" and filed Mar. 9, 2010; U.S. Patent Application 61/312,244, entitled "Micro-Electrode Array Architecture" and filed Mar. 10, 2010. The foregoing applications are hereby incorporated by reference into the present application in their entireties.

The present application also incorporates by reference in its entirety U.S. patent application Ser. No. 13/029,137, entitled "Droplet Manipulations on EWOD Microelectrode Array Architecture", and filed on the same date as the present application, namely, Feb. 17, 2011; U.S. patent application Ser. No. 13/029,138, entitled "Field-Programmable Lab-on-a-Chip and Droplet Manipulations Based on EWOD Micro-Electrode Array Architecture", and filed on the same date as the present application, namely, Feb. 17, 2011.

FIELD OF THE INVENTION

The present invention, Microelectrode Array Architecture, relates to the manipulation of the independently controllable discrete droplets; including but not limited to the electrowetting-on-dielectric (EWOD) based microfluidic systems and methods. This invention offers scalable system architecture based on an array of identical basic microfluidic unit cells called microelectrodes.

The microelectrode is the fundamental element of the present invention. The microelectrode is analogue to complementary metal-oxide-semiconductor (CMOS) transistors in ASIC design. The microelectrode is the standard component to establish a development path for microfluidics (similar to the CMOS transistors for the development of digital electronics) for assembling microfluidic components into networks that perform fluidic operations in support of a diverse set of applications.

The present invention relates to the architecture that has the field-programmable capability to build digital microfluidic systems that include at least Field-programmable Lab-on-a-Chip (FPLOC), Field-programmable Permanent Display, and Fluidic Micro-Crane.

BACKGROUND OF THE INVENTION

The first generation of microfluidic biochips contained permanently etched micropumps, microvalves, and microchannels, and their operation was based on the principle of continuous fluid flow. In contrast to continuous-flow microfluidic biochips, digital microfluidic biochips offer scalable system architecture based on a two-dimensional microfluidic array of identical basic unit cells, where the liquid is divided into independently controllable discrete droplets. The discrete droplet can be moved by various actuation methods, including thermal, surface wave, electrostatic, dielectrophoretic and, most commonly, electrowetting. For electrowetting actuation, the configuration of electrowetting-on-dielectric (EWOD) has become the choice for aqueous liquids for its reversible operations.

Digital microfluidics such as the Lab-on-a-chip (LOC) generally means the manipulation of droplets using EWOD technique. The conventional EWOD-based device generally includes two parallel glass plates. The bottom plate contains a patterned array of individually controllable electrodes, and the top plate is coated with a continuous ground electrode. Electrodes are preferably formed by a material like indium tin oxide (ITO) that has the combined features of electrical conductivity and optical transparency in thin layer. A dielectric insulator coated with a hydrophobic film is added to the plates to decrease the wettability of the surface and to add capacitance between the droplet and the control electrode. The droplet containing biochemical samples and the filler medium are sandwiched between the plates while the droplets travel inside the filler medium. In order to move a droplet, a control voltage is applied to an electrode adjacent to the droplet and, at the same time, the electrode just under the droplet is deactivated.

Over the past several years there have been advances utilizing different approaches to microfluidics based upon manipulation of individual nanoliter-sized droplets through direct electrical control. Examples of such systems can be found in U.S. Pat. No. 6,911,132 B2, entitled "Apparatus for Manipulating Droplets by Electrowetting-Based Techniques," issued on Jun. 28, 2005 to Pamula et al.; U.S. Pat. No. 7,569,129 B2, entitled "Methods for manipulating droplets by electrowetting-based techniques," issued on Aug. 4, 2009 to Pamula et al.; U.S. patent application Ser. No. 12/576,794, entitled "Apparatuses and methods for manipulating droplets," filed on Oct. 9, 2009 to by Pamula et al.; U.S. Pat. No. 7,815,871 B2, entitled "Droplet microactuator system," issued on Oct. 19, 2010 to Pamula et al.; U.S. patent application Ser. No. 11/343,284, entitled "Apparatuses and Methods for Manipulating Droplets on a Printed Circuit Board," filed on Jan. 30, 2006 by Pamula et al.; U.S. Pat. No. 6,773,566, entitled "Electrostatic Actuators for Microfluidics and Methods for Using Same," issued on Aug. 10, 2004 to Shenderov et al.; U.S. Pat. No. 6,565,727, entitled "Actuators for Microfluidics Without Moving Parts," May 20, 2003, to Shenderov et al.; U.S. patent application Ser. No. 11/430,857, entitled "Device for transporting liquid and system for analyzing" filed on May 10, 2006 by Adachi et al., the disclosures of which are incorporated herein by reference. These techniques offer many advantages in the implementation of the digital microfluidics paradigm as described above but current fabrication techniques to produce these microfluidic chips still depend on rather complex and expensive manufacturing techniques. Some of these microfluidic chips are currently produced in microfabrication foundries utilizing expensive processing steps based on semiconductor processing techniques routinely used in the integrated circuit (IC) fabrication industry. In addition to higher cost for semiconductor manufacturing techniques, semiconductor foundries are not easily accessible. Some are using Printed Circuit Board technologies and claim typically to have fabrication or prototyping turn-around times of as quick as 24 hours.

Unfortunately, the conventional microfluidic systems employing microfluidic technique built to date are still highly specialized to particular applications. Many current lab-on-a-chip technologies (including both continuous-flow and digital microfluidic devices) are relatively inflexible and designed to perform only a single assay or a small set of very similar assays. The progress in microfluidic system development (including both continuous-flow and digital microfluidic devices) has been hampered by the absence of standard commercial components. Also, due to the fixed layouts of current microfluidic chips, a new chip design is required for each application, making it expensive to develop new applications. Furthermore, many of these devices are fabricated using expensive microfabrication techniques derived from semiconductor integrated circuit manufacturing. As a result, applications for microfluidic devices are expanding relatively slowly due to the cost and effort required to develop new devices for each specific application. Although batch fabrication allows microfabricated devices to be inexpensive when mass-produced, the development of new devices can be prohibitively expensive and time consuming due to high prototyping costs and long turn-around time associated with fabrication techniques. In order to broaden the range of applications and impact of microfluidics in medicine, drug discovery, environmental and food monitoring, and other areas including consumer electronics, there is a long-felt need both for microfluidic approaches which provide more reconfigurable, flexible, integrated devices, as well as techniques for more inexpensively and rapidly developing and manufacturing these chips.

Also, as more bioassays are executed concurrently on a LOC as well as more sophisticated control for resource management, system integration and design complexity are expected to increase dramatically. To establish a development path for digital microfluidics similar to the development of digital electronics requires the definition of architectural and execution concepts for assembling digital microfluidic devices into networks that perform fluidic operations in support of a diverse set of applications. Indeed, a hierarchical integrated digital microfluidic design approach is needed to facilitate scalable design for many biomedical applications. But more important than providing a totally complete set of validated microfluidic elements within a platform is the fact that all elements have to be amenable to a well established fabrication technology. The difficulty with a hierarchical approach is the lack of standard fabrication technologies and digital microfluidic device simulation libraries, which make the hierarchical design approach difficult to implement. The Microelectrode Array Architecture provides a fundamental element called "microelectrode" which is the standard component to establish a development path for digital microfluidics (similar to the CMOS transistors for the development of digital electronics) for assembling microfluidic components into networks that perform microfluidic operations. Also, microelectrodes can be implemented with well established fabrication technologies such as CMOS or thin film transistor (TFT) fabrication technologies. Moreover, because microelectrodes can be software programmed into all necessary digital microfluidic components to complete the LOC designs, batch fabrication of the "blank" chips allows microfabricated devices to be inexpensive when mass-produced.

There is a need in the art for a system and method for reducing the labor and cost associated with generating the digital microfluidic systems. The art raises the LOC designs to the applications level to relieve LOC designers from the burden of manual optimization of bioassays, time-consuming hardware design, costly testing and maintenance procedures. Through the field-programmability of the Microelectrode Array Architecture, the development of new devices could be achieved in couple hours by programming a "blank" chip based on the Microelectrode Array Architecture. So prototyping will be easy and inexpensive.

There is a need in the art for a new architecture to facilitate scalable design for generating digital microfluidic systems and new applications in the manipulation of droplets. The art is able to complete the hierarchical integrated digital microfluidic design approach which provides a path to deliver the same level of computer aided design (CAD) support to the biochip designer that the semiconductor industry now takes for granted.

There is also a need in the art for the improvement of the conventional digital microfluidic architecture that applications beyond the LOC design can be realized such as Field-programmable Permanent Display and Fluidic Micro-Crane systems.

It is believed that the Microelectrode Array Architecture can provide solutions to the needs mentioned above with a number of advantages over the conventional digital microfluidic systems.

The Microelectrode Array Architecture can be used by different digital microfluidic technologies, including EWOD but not limited to it. If this architecture is implemented based on EWOD technology, it's called the EWOD Microelectrode Array Architecture.

SUMMARY

Disclosed herein is a device A device of the microelectrode array architecture, comprising: (a) a bottom plate comprising an array of multiple microelectrodes disposed on a top surface of a substrate covered by a dielectric layer; wherein each of the microelectrode is coupled to at least one grounding elements of a grounding mechanism, wherein a hydrophobic layer is disposed on the top of the dielectric layer and the grounding elements to make hydrophobic surfaces with the droplets; (b) a field programmability mechanism for programming a group of configured-electrodes to generate microfluidic components and layouts with selected shapes and sizes; and, (c) a system management unit, comprising: (i) a droplet manipulation unit; and (ii) a system control unit.

In another embodiment, a device of a microelectrode array architecture employing the CMOS technology fabrication comprising: (a) a CMOS system control block, comprising: (i) a controller block for providing the processor unit, memory spaces, interface circuitries and the software programming capabilities; (ii) a chip layout block for storing the configured-electrode configuration data and the microelectrode array architecture layout information and data; (iii) a droplet location map for storing the actual locations of the droplets; (d) a fluidic operations manager for translating the layout information, the droplet location map and the microelectrode array architecture applications from the controller block into the physical actuations of the droplets; and, (b) a plurality of fluidic logic blocks, comprising one microelectrode on the top surface of the CMOS substrate, one memory map data storage unit for holding the activation information of the microelectrode, and the control circuit block for managing the control logics.

A device of a microelectrode array architecture employing the thin-film transistor TFT technology fabrication comprising: (a) a TFT system control block, comprising: (i) a controller block for providing the processor unit, memory spaces, interface circuitries and the software programming capabilities; (ii) a chip layout block for storing the configured-electrode configuration data and the microelectrode array architecture layout information and data; (iii) a droplet location map for storing the actual locations of the droplets; (iv) a fluidic operations manager for translating the data from the layout information, the droplet location map, and the microelectrode array architecture applications from the controller block, to the physical droplet actuation data for activating microelectrodes, wherein the physical droplet actuation data comprises grouping, activating, deactivating of configured-electrodes sent to a active-matrix block by a frame-by-frame manner; and, (b) the active-matrix block, comprising: (i) an active-matrix panel comprising a gate bus-line, a source bus-line, thin-film transistors, storage capacitors, microelectrodes to individually activate each microelectrode; (ii) an active-matrix controller using the data from the TFT system control block to drive the TFT-array by sending driving data to driving chips, comprising the source driver and the gate driver; and (iii) a DC/DC converter for applying driving voltage to the source driver and the gate driver.

Still in another embodiment, a method of top-down programming and designing a microelectrode array architecture device, comprising: (a) designing the lab-on-chip, permanent display or micro-crane functions by a hardware description language; (b) generating the sequencing graph model from the hardware description language; (c) performing the simulation to verify the functions of lab-on-chip, permanent display or micro-crane by the hardware description language; (d) generating the detailed implementations by architectural-level synthesis from the sequencing graph model; (e) inputting design data from a microfluidic module library and from a design specification to the synthesis procedure; (f) generating files of the mapping of assay operations of on-chip resources and the schedule for the assay operations, and a build-in self-test from the synthesis procedure; (g) performing a geometry-level synthesis with the input of the design specification to generate a 2-D physical design of the biochip; (h) generating a 3-D geometrical model from the 2-D physical design of the biochip coupled with the detailed physical information from the microfluidic module library; (i) performing a physical-level simulation and design verification using the 3-D geometrical model; and, (j) loading the lab-on-chip, permanent display or micro-crane design into a blank microelectrode array device.

Still in another embodiment, a field-programmable permanent display system comprises a microelectrode array, comprising: (a) a transparent top cover to protect the liquids; (b) a display under the top cover comprising the microelectrode array; (c) a plurality of color liquids for forming the texts and graphics; (d) an ink frame reservoir configured from the microelectrode array of the display for storing the color liquids; and, (e) a display controller for activating and deactivating multiple configured-electrodes comprising multiple microelectrode to transport the color liquids into the selected locations on the display.

Still in another embodiment, a method of bottom-up programming and designing the microelectrode array architecture device, comprising: (a) erasing the memory in the microelectrode array architecture; (b) configuring the microfluidic components of the group of configured-electrodes in selected shapes and sizes, comprising multiple microelectrodes arranged in array in the field programmability mechanism comprising reservoirs, electrodes, mixing chambers, detection windows, waste reservoirs, droplet pathways and special functional electrodes; (c) configuring the physical allocations of the microfluidic components; and, (d) designing the microfluidic operations for the sample preparations, the droplet manipulations and detections.

Still in another embodiment, a system-on-chip device for integrating microfluidics and microelectronics based on microelectrode array architecture, comprising: (a) a plurality of fluidic logic blocks inside the system-on-chip device, comprising one microelectrode on the top surface of the CMOS substrate, one memory map data storage unit for holding the activation information of the microelectrode, and the control circuit block for managing the control logics; wherein the fluidic logic blocks are the elements of the integration of microfluidics and microelectronics; and (b) a plurality of microelectronic circuitries including controllers, memories, and other logic gates; wherein the integration of fluidic logic blocks and the microelectronic circuitries can be generated using the system-on-chip microelectronic fabrication technology and design/simulation tools to make the multiple fluidic logic blocks as standard libraries for the design of the microelectronic circuitries.

In another embodiment, the Microelectrode Array Architecture can be applied to other digital microfluidic technologies such as dielectrophoresis (DEP) based technologies but for the discussions below, EWOD technology will be used to illustrate various embodiments of the present invention.

Various embodiments of the Microelectrode Array Architecture are disclosed. In one embodiment, the microelectrode is the fundamental element of the present invention. The microelectrode is analogue to CMOS transistors in ASIC design. The microelectrode is the standard component to establish a development path for digital microfluidics (similar to the CMOS transistors for the development of digital electronics) for assembling microfluidic components into networks that perform fluidic operations in support of a diverse set of applications. Microelectrodes can be implemented with well established fabrication technologies such as CMOS or thin film transistor (TFT) fabrication technologies. To facilitate scalable design for digital microfluidic systems, Microelectrode Array Architecture can be used to complete the hierarchical integrated digital microfluidic design approach.

Another embodiment is the field-programmability capability of the Microelectrode Array Architecture. The field-programmability of the present invention employs the "dot matrix printer" concept that a plurality of microelectrodes (e.g. "dots") are grouped and are simultaneously activated to form varied shapes and sizes of electrodes depending on customers' needs. Microfluidic systems for different applications and functions wherein all the electrodes, each may consist of many microelectrodes, can be software designed and re-configured. After the configuration or programming, the fluidic operations in digital microfluidic systems are then accomplished by controlling and manipulating of the configured-electrodes.

In other embodiments, the manipulation of droplets of the Microelectrode Array Architecture can be based on a coplanar structure in which the EWOD actuations can occur in the single plate configuration without the cover plate. Also, all EWOD fluidic operations can be performed with the coplanar structure. Especially the step of cutting of droplet which is not feasible by the conventional coplanar EWOD now can be performed with one single plate of the present invention.

In another embodiment, a single microelectrode is designed in the way that all logic and analog (high voltage drivers) circuitries are hidden directly beneath the metal microelectrode.

In another embodiment, the interconnection of the microelectrodes and the system control circuitry is arranged in a daisy chain configuration to minimize the number of necessary interconnections. The number of interconnections will be the bottle neck of scaling down the size of the microelectrode and scaling up the total number of the microelectrodes.

Still in another embodiment, a passive top cover plate, an active top cover plate which works as ground, or another coplanar microelectrode array as the top cover plate can be employed in the microelectrode array architecture. A passive cover plate means no electrical circuitry on the plate and it could be just a transparent cover to seal the test surface for the protection of the fluidic operations or for the purpose of protecting the test medium for a longer shelf storage life. Even though a conventional bi-planar structure, which includes two active parallel plates, is less desirable but still can be employed in the Microelectrode Array Architecture. In this case, the top plate is coated with a continuous ground electrode which has the combined features of electrical conductivity and optical transparency in a thin layer. Still the more advanced top cover plate can be implemented by another coplanar microelectrode array which is turned upside down. In all the cases, when the manipulation of droplets in which the top cover plate is implemented in the Microelectrode Array Architecture, the distance between the top and lower plates, called the gap, is adjustable. This capability of the Microelectrode Array Architecture is especially powerful and provides more flexibility to the manipulations of the droplets under the coplanar structure.

In one embodiment, the Microelectrode Array Architecture expands the two-dimensional conventional digital microfluidic architecture into a three-dimensional architecture. The three-dimensional architecture is a combination of two face-to-face coplanar plates and the flexible gap adjustment capability. This three-dimensional architecture will be shown clearly by the examples of Fluidic Micro-Crane system.

In one embodiment, the Microelectrode Array Architecture can be used to implement a Field-programmable LOC (FPLOC). The field programmability of FPLOC can significantly reduce the labor and cost associated with generating the digital microfluidic systems by relieving LOC designers from the burden of manual optimization of bioassays, time-consuming hardware design, costly testing and maintenance procedures. FPLOC is analogue to FPGA in ASIC design. A turn of modifications of custom-hardwired LOC (like ASIC) takes several months, but a turn of modifications of a design for FPLOC (like FPGA) only takes minutes to hours.

In one embodiment, a Field-programmable Permanent Display is implemented by the Microelectrode Array Architecture. A Field-programmable Permanent Display is a display which can be programmed by software but after the programming the power to the display can be turned off and the display will stay on permanently. The lowness of energy consumption and no sustaining power required for the Field-programmable Permanent Display is a big advantage over other display technologies. Many applications can utilize the Field-programmable Permanent Display invention. The test results of a FPLOC, which is based on the same Microelectrode Array Architecture, can be shown easily using Field-programmable Permanent Display as records. Field-programmable newspapers or books, or posters, billboards, pictures, signs etc. are among the obvious applications.

In another embodiment, a Fluidic Micro-Crane system based on the EWOD Microelectrode Array Architecture is used to manipulate droplets to form precise chemical compounds or to grow tissue cells. Individual cells need to grow in a medium of nutrients, controlled temperature, humidity, and carbon dioxide/oxygen. The droplet based Fluidic Micro-Crane system is the perfect solution to the needs. An advanced Fluidic Micro-Crane system ultimately can be used to "print" living tissues.

DETAILED DESCRIPTION

Microelectrode Array Architecture can be applied to other digital microfluidic technologies such as dielectrophoresis (DEP) based technologies but for the discussions below, EWOD technology will be used to illustrate various embodiments of the present invention.

EWOD based devices are commonly used to manipulate droplets by using the interfacial tension gradient across the gap between the adjacent electrodes to actuate the droplets. The designs of electrodes include the desired shapes, sizes of each of the electrode and the gaps between each of the two electrodes. In the droplet manipulation of EWOD based LOC layout design, the droplet pathways generally are composed of a plurality of electrodes that connect different areas of the design.

Figure 1A:
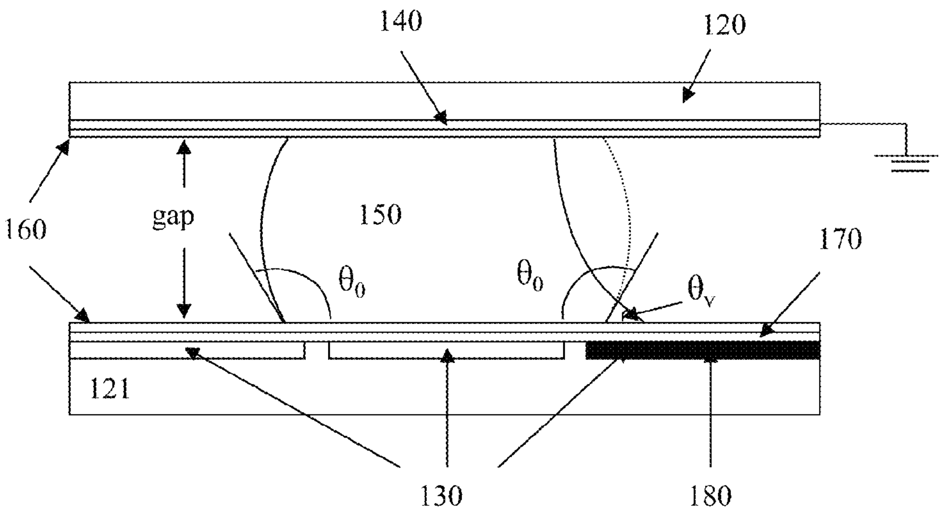
FIG. 1A is a cross-section view generally illustrating the conventional sandwiched EWOD system.

A conventional electrowetting microactuator mechanism (in small scale for illustration purposes only) is illustrated in FIG. 1A. EWOD-based digital microfluidic device consists of two parallel glass plates 120 and 121, respectively. The bottom plate 121 contains a patterned array of individually controllable electrodes 130, and the top plate 120 is coated with a continuous ground electrode 140. Electrodes are preferably formed by a material, such as indium tin oxide (ITO) that has the combined features of electrical conductivity and optical transparency in thin layer. A dielectric insulator 170, e.g., parylene C, coated with a hydrophobic film 160 such as Teflon AF, is added to the plates to decrease the wettability of the surface and to add capacitance between the droplet and the control electrode. The droplet 150 containing biochemical samples and the filler medium, such as the silicone oil or air, are sandwiched between the plates to facilitate the transportation of the droplet 150 inside the filler medium. In order to move a droplet 150, a control voltage is applied to an electrode 180 adjacent to the droplet and at the same time the electrode just under the droplet 150 is deactivated.

Figure 1B:
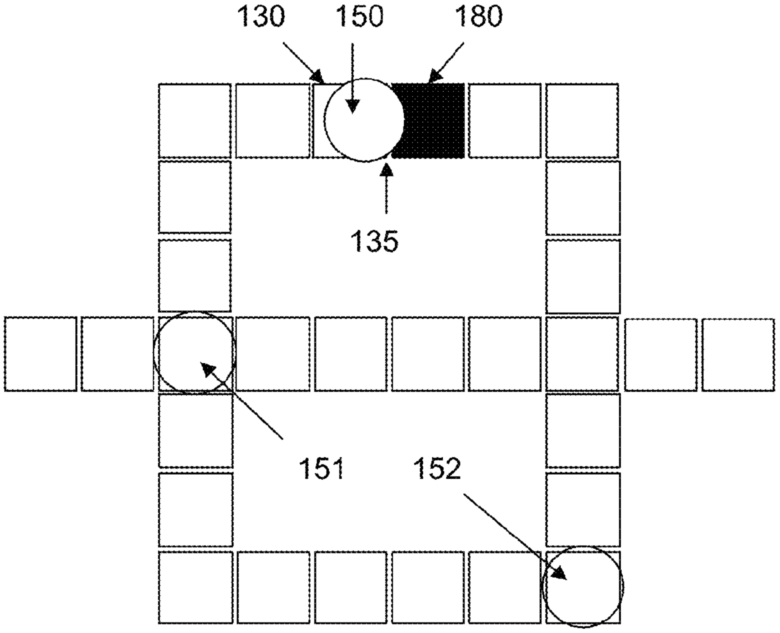
FIG. 1B is a top view generally illustrating the conventional EWOD two-dimensional electrode array.

FIG. 1B is a top view generally illustrating the conventional EWOD on a two dimensional electrode array 190. A droplet 150 is moving from electrode 130 into an activated electrode 180. The black color of electrode 180 indicates a control voltage is applied. The EWOD effect causes an accumulation of charge in the droplet/insulator interface, resulting in an interfacial tension gradient across the gap 135 between the adjacent electrodes 130 and 180, which consequently causes the transportation of the droplet 150. By varying the electrical potential along a linear array of electrodes, electrowetting can be used to move nanolitervolume liquid droplets along this line of electrodes. The velocity of the droplet can be controlled by adjusting the control voltage in a range from 0-90 V, and droplets can be moved at speeds of up to 20 cm/s. Droplets 151 and 152 can also be transported, in user-defined patterns and under clocked-voltage control, over a 2-D array of electrodes without the need for micropumps and microvalves.

Figure 2:
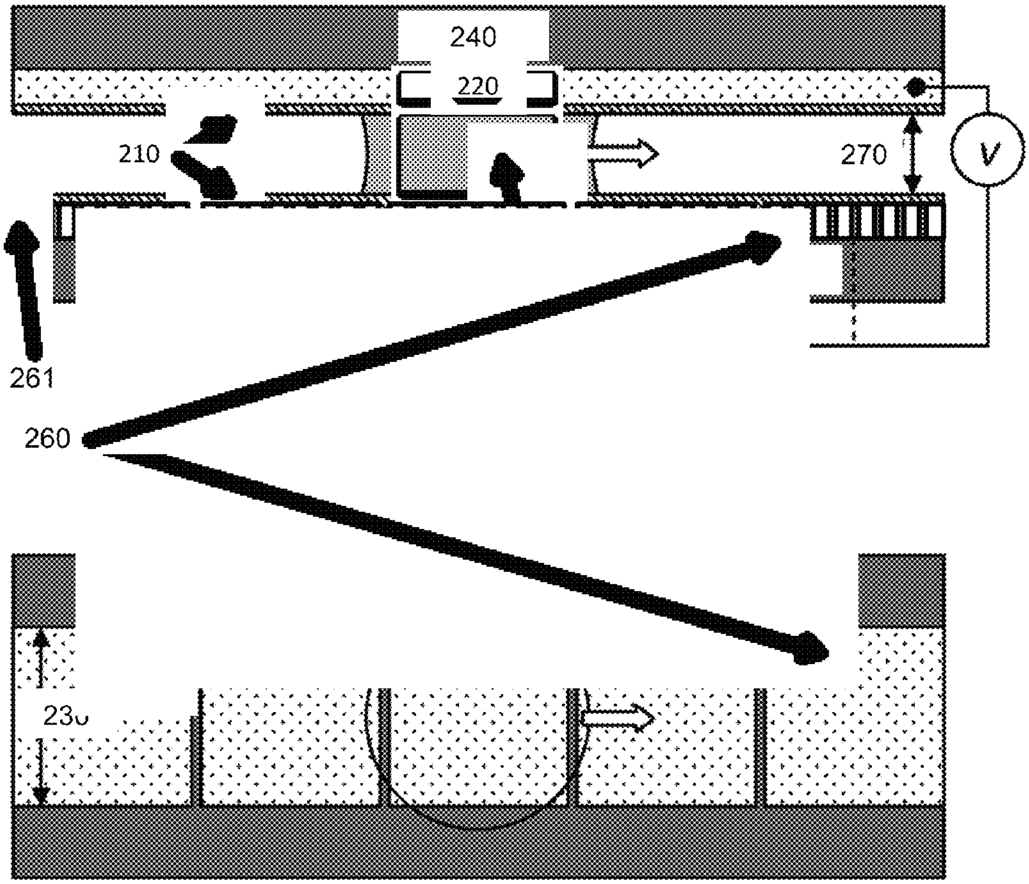
FIG. 2 is a diagram of a bi-planar DEP device to manipulate dielectric droplets.

In one embodiment, a bi-planar DEP device to manipulate dielectric droplets can be constructed as shown in FIG. 2. A plurality of microelectrodes 261 were patterned on the bottom substrate 245. And each configured-electrode 260 comprises multiple microelectrodes 261. The top plate 240 contained an unpatterned reference electrode 220. A layer of low surface energy material (such as Teflon) 210 was coated on both plates to reduce the interfacial force between the droplets 250 and the solid surfaces, which facilitates reproducible droplet handling and eliminates residues of the dielectric liquids during operations. The gap height or droplet thickness 270 is determined by the thickness of the spacer. By applying voltage between the reference electrode 220 and one of the driving microelectrodes, a dielectric droplet would be pumped onto the energized microelectrode as the arrow indicates in FIG. 2. Actuation of dielectric droplets Dielectric droplets of decane (350 $V_{DC}$), hexadecane (470 $V_{DC}$), and silicone oil (250 $V_{DC}$) were tested in parallel-plate devices with a gap height of 150 mm. The polarity of the applied DC voltage has no influence on droplet driving, while AC signals tested up to the frequency of 1 kHz actuated dielectric droplets successfully.

The differences between LDEP and EWOD actuation mechanisms are the actuation voltage and the frequency. So sharing the physical bi-planar electrode structure and configurations between EWOD and DEP is doable. Typically, in EWOD actuation, DC or low-frequency AC voltage, typically <100 V, is applied, whereas LDEP needs higher actuation voltage (200-300 Vrms) and higher frequency (50-200 kHz). In the followed disclosures of the invention, EWOD techniques will be used to demonstrate the embodiments of the invention but the invention covers the DEP actuation by appropriate changes of the actuation voltages and the frequencies in most cases.

The present invention employs the "dot matrix printer" concept that each microelectrode in the Microelectrode Array Architecture is a "dot" which can be used to form all microfluidic components. In other words, each of the microelectrodes in the microelectrode array can be configured to form various microfluidic components in different shapes and sizes. According to customer's demand, multiple microelectrodes can be deemed as "dots" that are grouped and can be activated simultaneously to form different configured-electrodes and perform microfluidic operations. Activate means to apply necessary electrical voltages to the electrodes that the EWOD effect causes an accumulation of charge in the droplet/insulator interface, resulting in an interfacial tension gradient across the gap between the adjacent electrodes, which consequently causes the transportation of the droplet; or the DEP effect that the liquids become polarizable and flow toward regions of stronger electric field intensity. Deactivate means to remove the applied electrical voltages from the electrodes.

Figure 3:
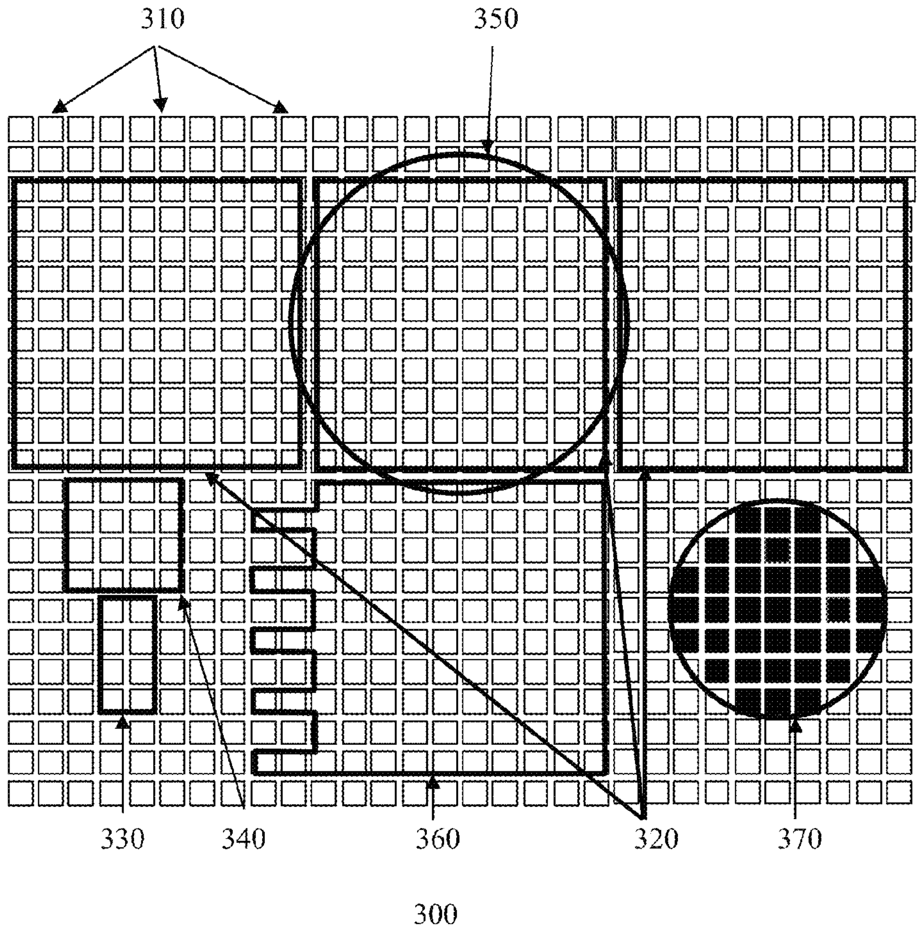
FIG. 3 is a diagram illustrating the microelectrode array that can be configured into various shape and size of configured-electrodes.

FIG. 3 illustrates one embodiment of the microelectrode array architecture technique of the present invention of forming different configured-electrodes" from microelectrodes. In this embodiment, the microelectrode array 300 is composed of a plurality (30×23) of identical microelectrodes 310. This microelectrode array 300 is fabricated based on the standard microelectrode specification (shown here as microelectrode 310) and fabrication technologies that are independent from the ultimate LOC applications and the detail microfluidic operation specifications. In another word, this microelectrode array 300 is a "blank" or "pre-configuration" LOC. Based on the application needs, then this microelectrode array can be configured or software programmed into the desired LOC. As shown in FIG. 3, each of the configured-electrode 320 is composed of 100 microelectrodes 310 (i.e., 10×10 microelectrodes). "Configured-electrode" means the 10×10 microelectrodes 310 are grouped together to perform as an integrated electrode 320 and will be activated or deactivated together at the same time. Normally, the configuration data is stored in non-volatile memory (such as ROM) and can be modified "in the field," without disassembling the device or returning it to its manufacturer. FIG. 3 shows a droplet 350 sits on the center configured-electrode 320.

As shown in FIG. 3, the sizes and shapes of the configured-electrodes of the present invention can be designed based on application needs. Examples of the control of the sizes of the configured-electrodes are configured-electrodes 320 and 340. Configured-electrode 320 has the size of 10×10 microelectrodes and configured-electrode 340 has the size of 4×4 microelectrodes. Besides the configuration of the sizes of the configured-electrodes, different shapes of the configured-electrodes also can be configured by using the microelectrode array. While configured-electrode 320 is square, configured-electrode 330 is composed of 2×4 microelectrodes in rectangular shape. Configured-electrode 360 is left-side-toothed-square, and configured-electrode 370 is round shape.

Also, as shown in FIG. 3, the volume of the droplet 350 is proportional to the size of the configured-electrode 320. In other words, by controlling the size of the configured-electrode 320, the volume of the droplet 350 is also limited to fit into the designed size of the configured-electrode 320; therefore the field-programmability of the shape and size of the "configured-electrodes" means the control of droplet volumes. Different LOC applications and microfluidic operations will require different droplet volumes, and a dynamic programmable control of the droplet volumes is a highly desirable function for LOC designers.

As shown in FIG. 3A, the shapes of the configured-electrodes of the present invention can be designed based on application's needs. The shapes of the configured-electrodes are made of a plurality of microelectrodes. Depending on the design needs, the group of microelectrodes are configured and activated as a group to form the desired shape of the configured-electrode. In the present invention, the shapes of the configured-electrodes can be square, square with tooth edges, hexagonal, or any other shapes. Referring to FIG. 3A, the shapes of configured-electrodes of the transportation path 340, detection window 350 and the mixing chamber 360 are square. The reservoir 330 is special-shaped large sized configured-electrode. The waste reservoir 320 is tetragon shaped.

FIG. 3B shows the enlarged section of the reservoir 330 and configured-electrode 370. It also shows the comparison between a conventional physically etched structure and a field-programmed structure. A permanently etched reservoir 331 and four permanently etched electrodes 371 are illustrated in FIG. 3B. In the mean time, a similar shape of "configured reservoir" 330 by grouping microelectrodes 310 and four same shape and size (4×4 microelectrodes 310) "configured-electrodes" are shown in FIG. 3B as a comparison.

Figure 4A:
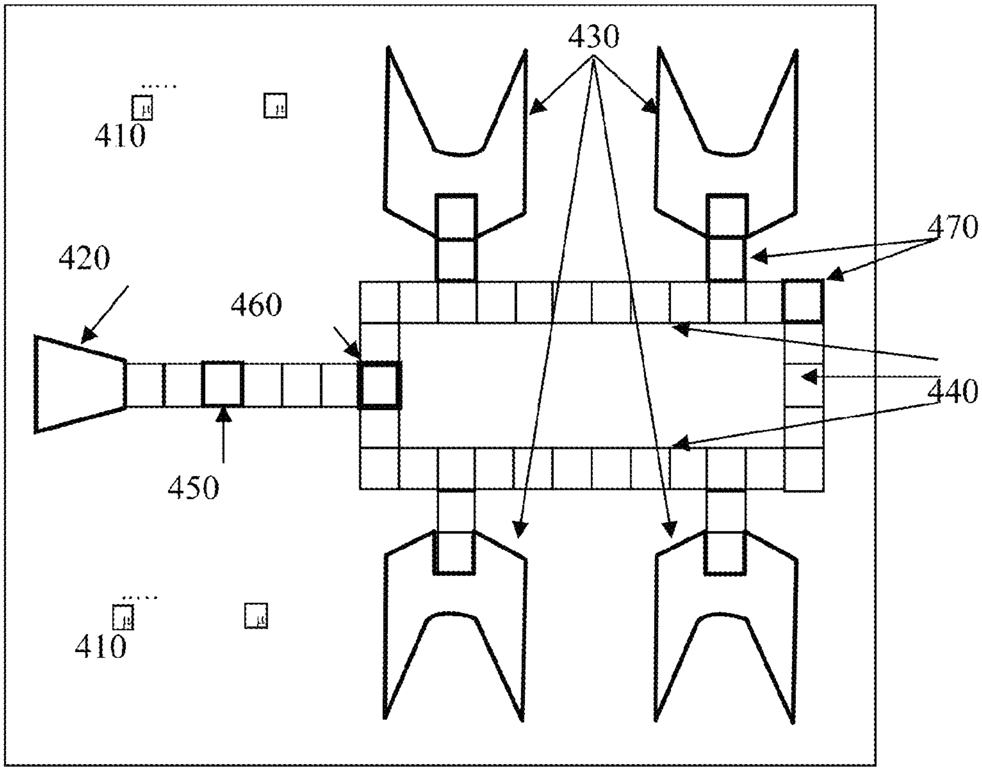
FIG. 4A is the diagram of LOC layout using the microelectrode array architecture.
Figure 4B:
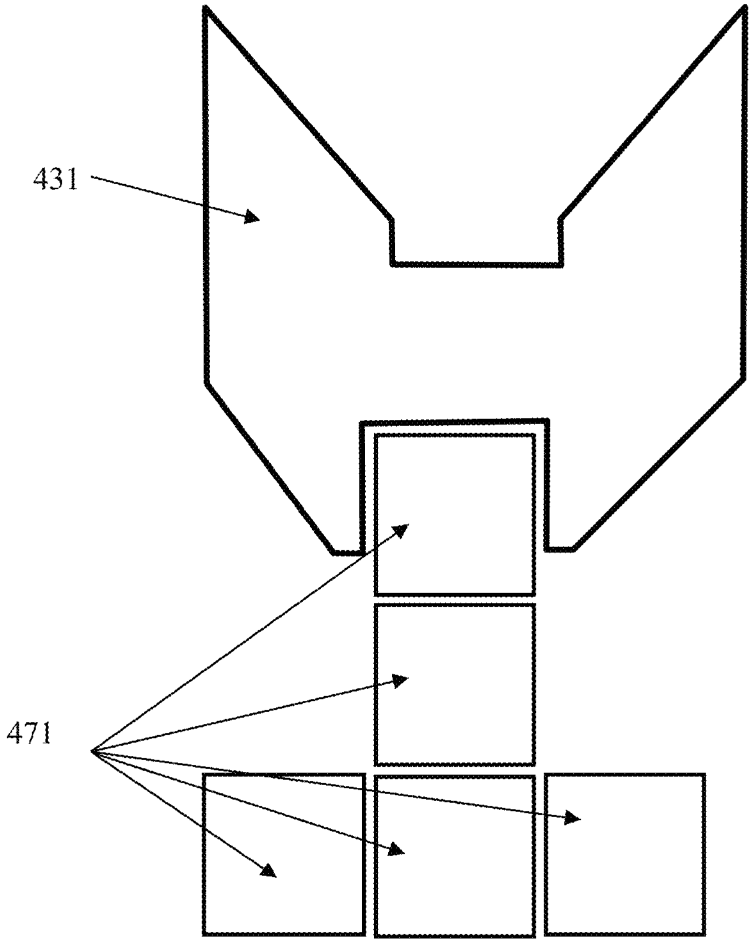
FIG. 4B is the diagram of a conventional physically etched structure.
Figure 4C:
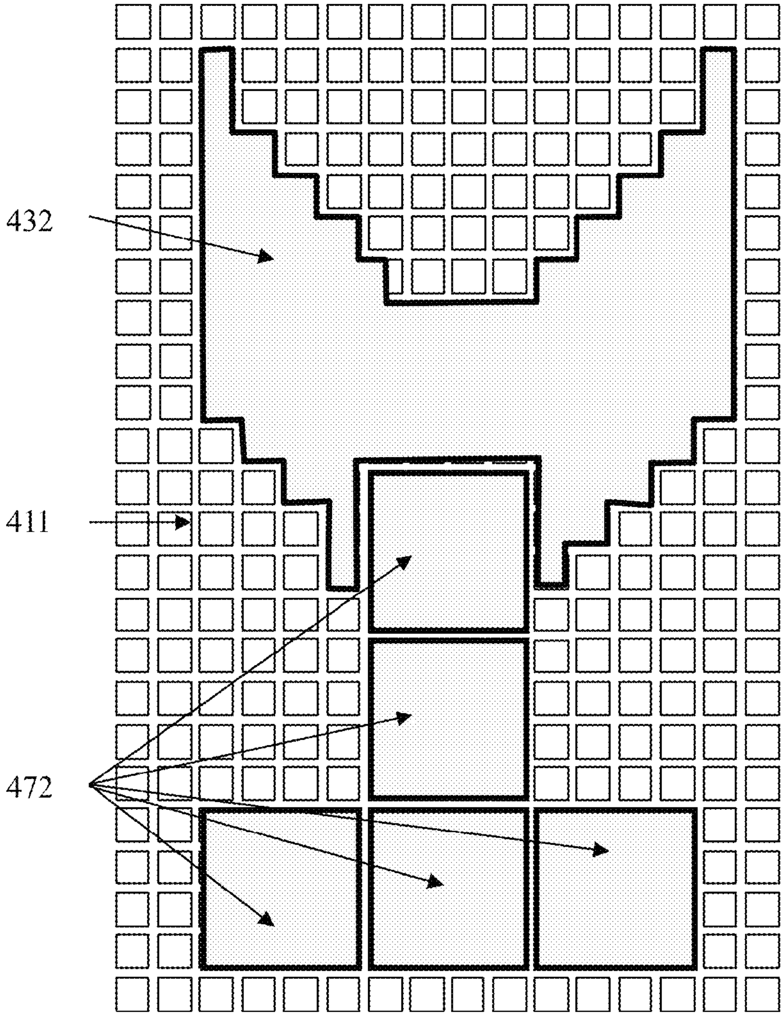
FIG. 4C is the diagram of configured-electrodes for the enlarged section of the reservoir and configured-electrodes.

FIGS. 4B and 4C shows the enlarged version of the reservoir 430 from FIG. 4A. FIG. 4B is illustrated as a physically etched reservoir structure 431 manufactured by conventional LOC systems. The components show permanently etched reservoir 431 and the four permanently etched electrodes 471. In comparison of FIG. 4B (conventional design), FIG. 4C is a field-programmed LOC structure with similar sized configured reservoir 432 grouped electrodes 472. The configured reservoir 432 can be made by grouping multiple microelectrodes 411 into desired size and shape to make such reservoir component. The grouped electrodes 471 contain 4×4 microelectrodes 411.

After defining the shapes and sizes of the necessary microfluidic components, it's also important to define the locations of the microfluidic components and how these microfluidic components connected together as a circuitry or network. FIG. 4A shows where the physical locations of these microfluidic components are positioned and how these microfluidic components are connected together to perform as a functional LOC. These microfluidic components are: configured-electrodes 470, reservoirs 430, waste reservoir 420, mixing chamber 460, detection window 450 and transportation paths 440 that connect different areas of the LOC. If it's a Field-Programmable LOC then after the layout design, there are some unused microelectrodes 410. Designers can go for a hard-wired version to save cost after the FPLOC is fully verified then unused microelectrodes 410 can be removed.

Figure 5A:
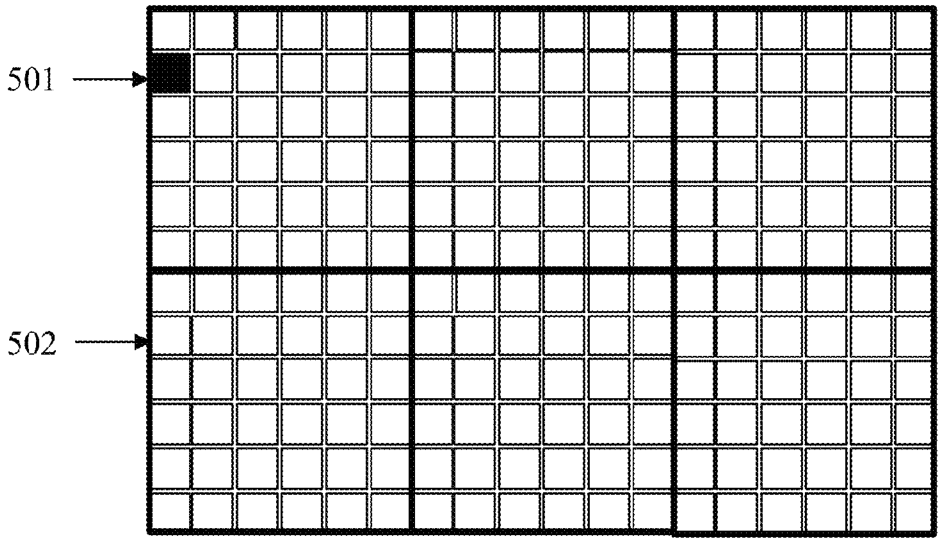
FIG. 5A illustrates an array of square microelectrodes and one of them is highlighted.
Figure 5B:
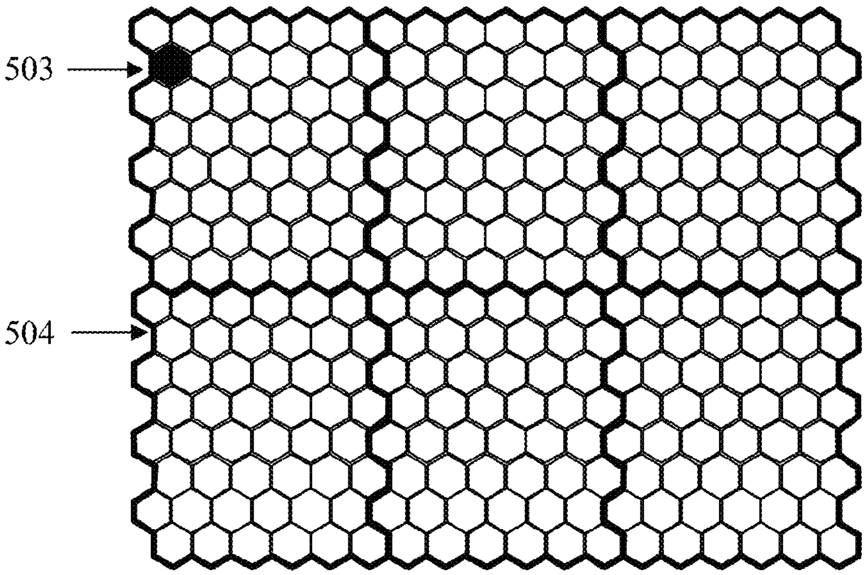
FIG. 5B shows an array of hexagon microelectrodes and one of them is highlighted.
Figure 5C:
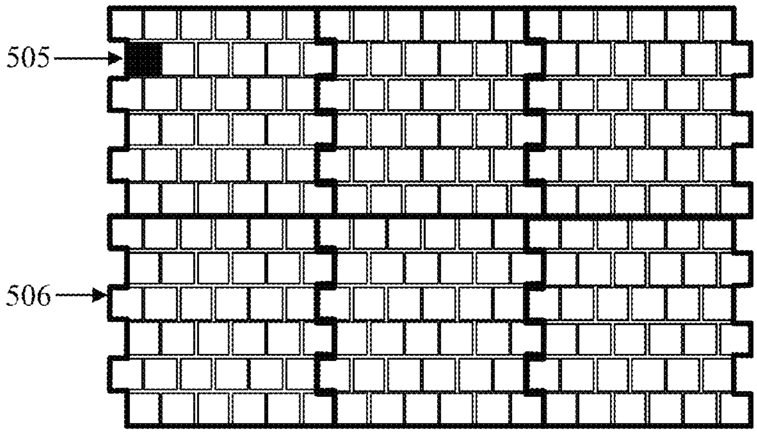
FIG. 5C shows an array of square microelectrodes that are arranged in a wall-brick layout and one of them is highlighted.

The shape of the microelectrode in Microelectrode Array Architecture can be physically implemented in different ways. In one embodiment of the invention, FIG. 5A illustrates an array of square microelectrodes and one of them is highlighted as 501. And 6×6 microelectrodes form the configured-electrode 502. FIG. 5A totally have a 3×2 configured-electrodes. In another embodiment, FIG. 5B shows an array of hexagon microelectrodes and one of them is highlighted as 503. And 6×6 microelectrodes form the configured-electrode 504 and there are 3×2 configured-electrodes in FIG. 5B. The interdigital edge of the hexagon microelectrode has the advantage in moving the droplet across the gap between the configured-electrodes. Yet in another embodiment, FIG. 5C shows an array of square microelectrodes that are arranged in a wall-brick layout and one of them is highlighted as 505. And 6×6 microelectrodes form the configured-electrode 506 and there are 3×2 configured-electrodes in FIG. 5C. The interdigital edge of the hexagon microelectrode has the advantage in moving the droplet across the gap between the configured-electrodes, but this only happens on the x-axis. There are many other shapes of the microelectrodes can be implemented and not only limited to the three shapes discussed here.

Figure 5D:
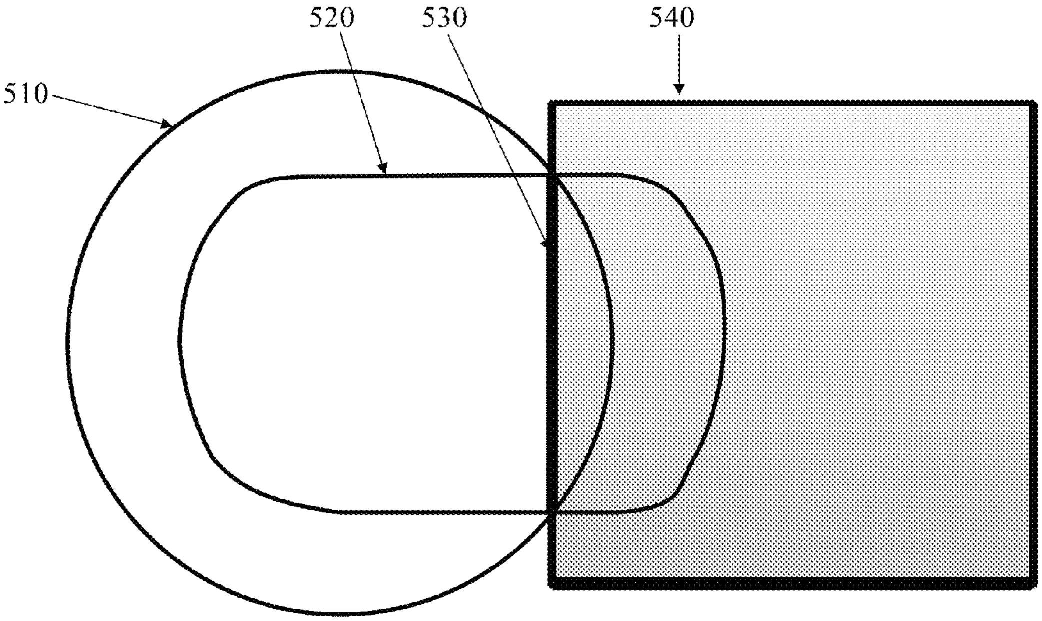
FIG. 5D is a diagram showing the same effective length from two different droplet shapes.

For Microelectrode Array Architecture to function properly based on the EWOD technology, microelectrodes must be operated within the limits of the Lippmann-Young equation. This scaling framework provides the base of the Microelectrode Array Architecture. However, exact modeling and simulations of droplet motion in EWOD are complicated. By careful examination of the Microelectrode Array Architecture, we believe the gaps among discrete microelectrodes represent the biggest uncertainty of the architecture. When a droplet is in contact with a solid surface, the interaction among molecules of the droplet, the ambient fluid, and the solid can lead to a net force of attraction (wetting) or repulsion (non-wetting). The magnitude of the capillary force is determined only by the effective length of the contact line, i.e. it is typically independent of the shape of the contact line if the electrode 540 is a solid electrode that means the electrode is not a configured-electrode from microelectrodes. So the two different shapes of droplets 510 and 520 in contact with electrode 540 shown in FIG. 5D have the same effective length 530 and have the same capillary force on the droplets.

Figure 5E:
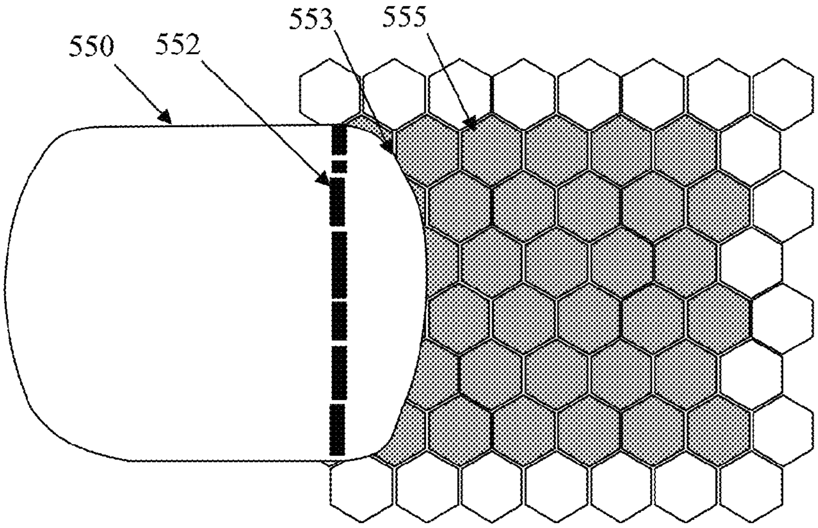
FIGS. 5E, 5F and 5G are diagrams showing different effective lengths for square microelectrodes, hexagon microelectrodes and wall-brick microelectrodes.
Figure 5F:
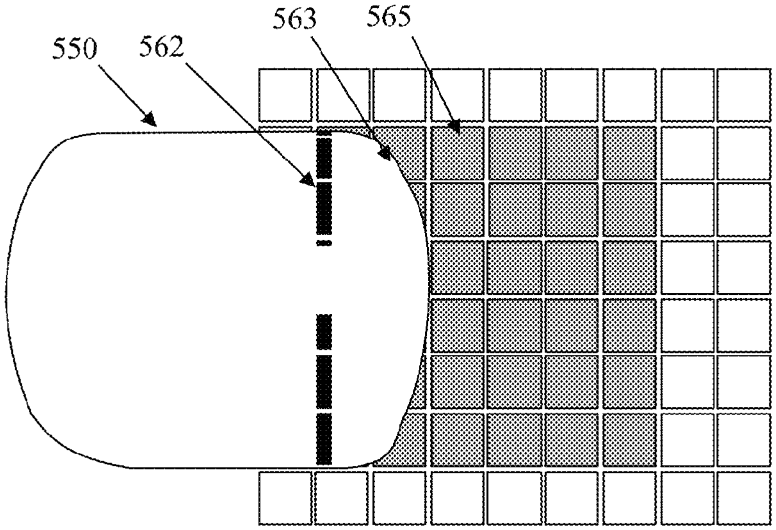
Figure 5G:
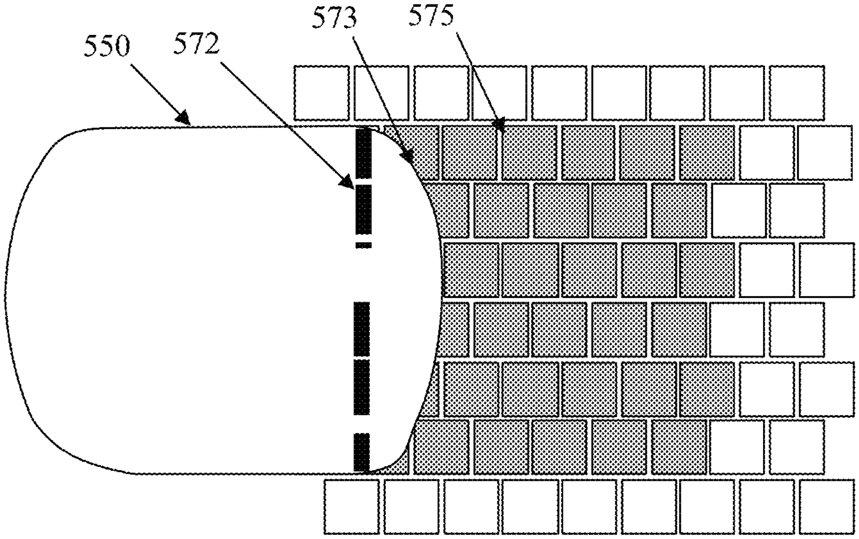

However, the shapes of the contact lines do have an effect on the microelectrode array because of the gaps between microelectrodes. Typically, when the aspect ratio decreases, the shape of the droplet is becoming squarer. FIG. 5E illustrates a squarer droplet 550 in contact with the activated hexagon-microelectrode configured-electrode 555. The magnitude of the capillary force is determined only by the effective length 552 of the contact line 553 and the gaps between hexagon microelectrodes cause the gaps in the effective length 552. The gaps in the effective length 552 means a shorter effective length and also means a smaller capillary force on the droplet. FIG. 5F shows the same droplet 550 in contact with the activated square-microelectrode configured-electrode 565. The gaps within the effective length 562 of the contact line 563 are bigger because the front part of the effective line 563 falls in the gap of the microelectrodes. In comparison to the total effective length 552 in FIG. 5E, the effect length 562 in FIG. 5F is much shorter that means the driving capability of the configured-electrode 565 in FIG. 5F is less than the configured-electrode in FIG. 5E. FIG. 5G depicts the same droplet 550 in contact with the activated square-microelectrode configured-electrode 575 but in wall-brick layout. The effective length 572 of the contact line 573 is shorter than the effective length 552 in FIG. 5E but is longer than the effective length 562 in FIG. 5F.

The effective length of the contact line is especially important to move a droplet from its starting electrode into the desired electrode. Other means can be implemented to compensate the loss of the capillary force due to the gaps among microelectrodes such as interdigital edges of configured-electrodes or reducing the gap width. Nevertheless, if the driving capability of the configured-electrode is the biggest concern then a hexagon microelectrode array, as indicated in FIG. 5B, should be used.

The structure of the microelectrode of Microelectrode Array Architecture can be designed by using scaled-down bi-planar structure based on the popular configuration of EWOD chip today. A bi-planar EWOD based microelectrode structure (in small scale for illustration purposes only) is illustrated in FIG. 1A. Three microelectrodes 130 and two parallel plates 120 and 121 are shown in the figure. The bottom plate 121 contains a patterned array of individually controllable electrodes 130, and the top plate 120 is coated with a continuous ground electrode 140. A dielectric insulator 170 coated with a hydrophobic film 160 is added to the plates to decrease the wettability of the surface and to add capacitance between the droplet and the control electrode. The droplet 150 containing biochemical samples and the filler medium, such as the silicone oil or air, are sandwiched between the plates to facilitate the transportation of the droplet 150 inside the filler medium.

In one embodiment of the present invention, the LOC device employing microelectrode array architecture technique is based on a coplanar structure in which the actuations can occur in a single plate configuration without the top plate. The coplanar design can accommodate a wider range of different volume sizes of droplets without the constrained of the top plate. The bi-planar structure has a fixed gap between the top plates and has the limitation to accommodate wide range of the volume size of droplets. Still in another embodiment, the LOC devices employing microelectrode array architecture technique based on the coplanar structure still can add a passive top plate to seal the test surface for the protection of the fluidic operations or for the purpose of protecting the test medium for a longer shelf storage life.

Figure 6A:
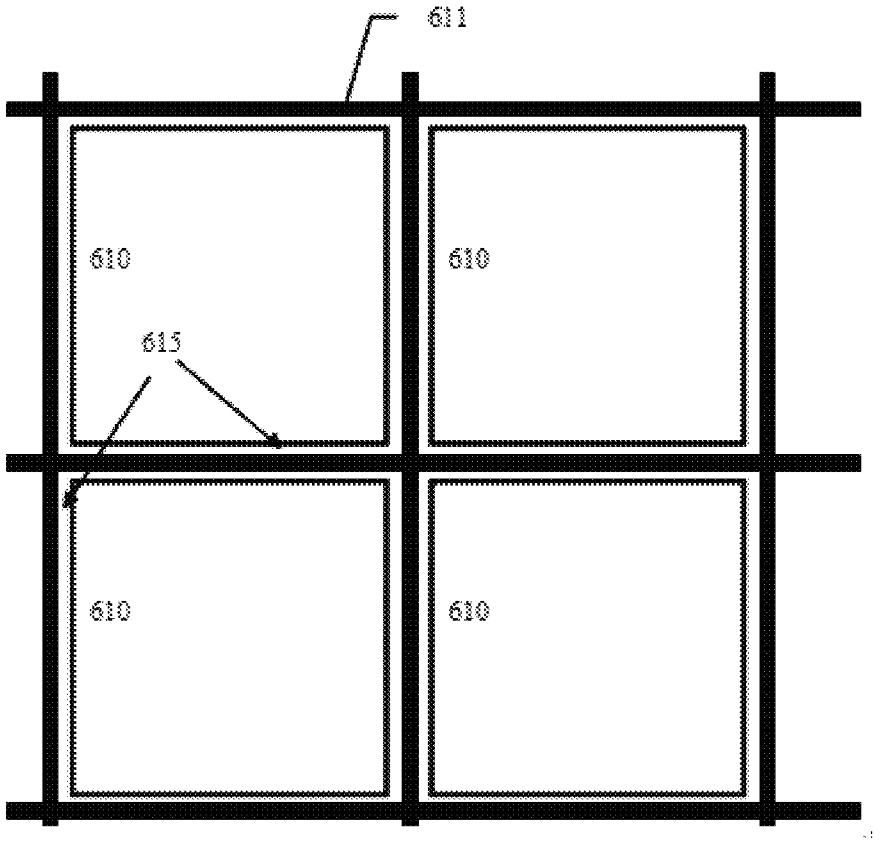
FIGS. 6A, 6B and 6C are diagrams of the "ground grids" coplanar structure.

In the present invention, the microelectrode plate structure can be physically implemented in many ways especially in the coplanar structure. FIG. 6A shows the "ground grids" coplanar microelectrode structure comprises one driving-microelectrode 610, ground lines 611, and gaps 615 between the driving-microelectrode 610 and the ground lines 611. When the electrode is activated, the driving-microelectrode 610 is charged by a DC or square-wave driving voltage. The ground lines 611 are on the same plate with the driving-microelectrode 610 to achieve the coplanar structure. The gap 615 is to ensure no vertical overlapping between 610 and 611.

Figure 6B:
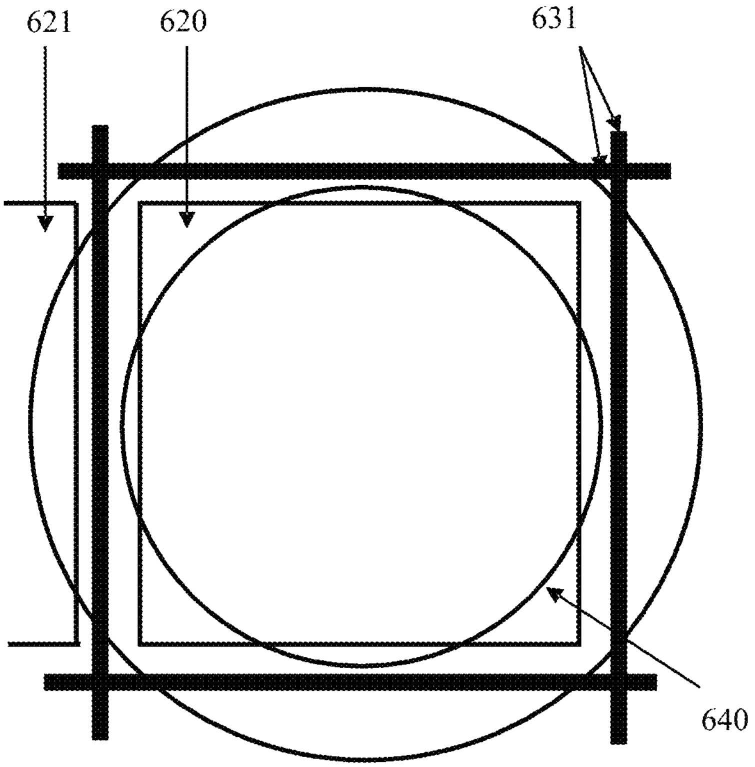

FIG. 6B is the conventional droplet operation unit includes permanently etched electrodes 620, 621, ground lines 631, (in vertical and in horizontal directions). These two etched electrodes 620, 621 are each separated by the ground lines 631 in horizontal and vertical directions. The droplet 640 sits in the electrode 620. As shown in FIG. 6B, the droplet 640 is too small to touch the surrounded ground lines 631 and the actuation of the droplet 640 can't be performed. This could be potential problems in droplet manipulation often observed in conventional droplet system. The general remedy is to load a larger size droplet 650 but it is often difficult to control the desired droplet size manually. Also, limited by the ground lines 631 in the conventional system, electrodes 620 and 621 can't have the interdigitated perimeters to improve droplet manipulations.

Figure 6C:
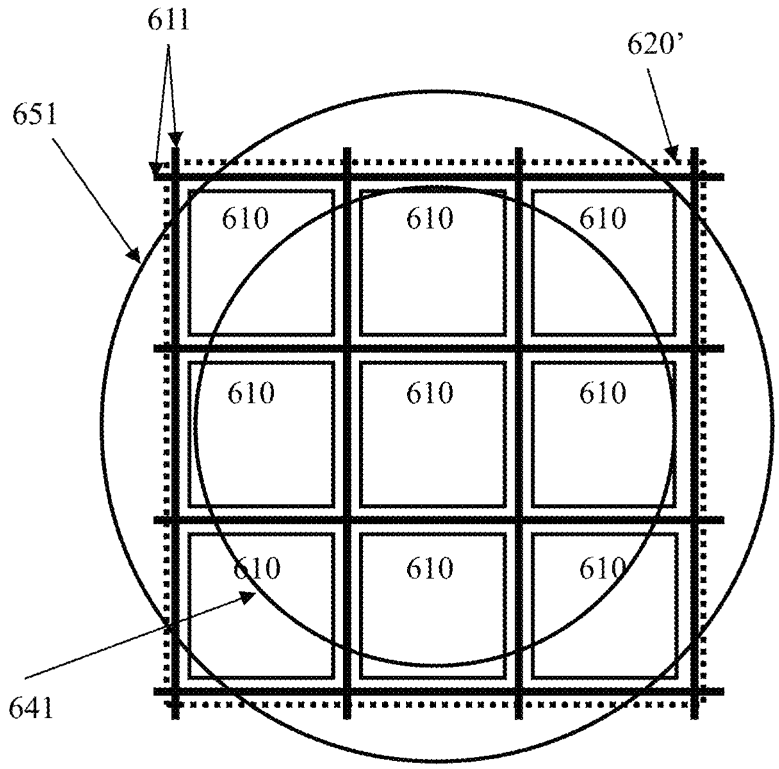

FIG. 6C shows the improved droplet operation unit of the current invention in a coplanar structure. The configured electrode 620' comprises a plurality of field-programmable microelectrodes 610. The configured electrode can be software programmed according to the size of the droplet. In this example, the configured electrode 620' includes 9 (3×3) microelectrodes 610. In FIG. 6C, the droplet 641 sits on the configured electrode 620'. The droplet 641 is similar to the size of droplet 640 (FIG. 6B) for comparison purposes. In FIG. 6C, the configured electrode 620' comprises a plural numbers of cross-sectioned ground lines 611. In the present invention, the effective droplet manipulations can be achieved since the droplet 641 physically overlaps with the configured electrode 620' and the plural ground lines 611.

Figure 7A:
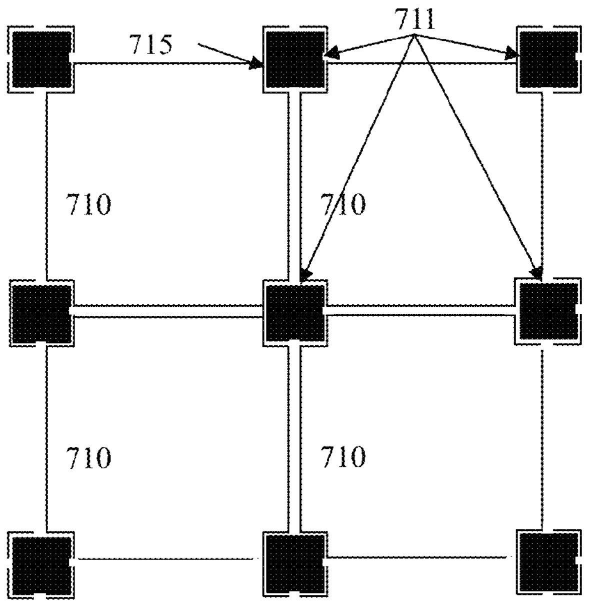
FIGS. 7A and 7B are diagrams of "ground pads" coplanar structure.
Figure 7B:
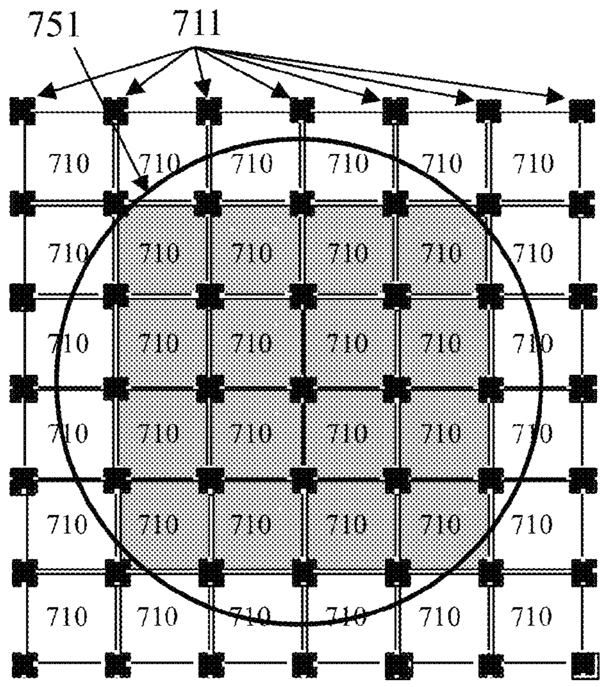

FIG. 7A illustrates another implementation of the "ground pads" coplanar microelectrode. The driving-microelectrode 710 is in the middle with the ground pads 711 at the four corners and the gap 715 between 710 and 711. Instead of the ground lines in the embodiment shown in FIG. 5A, this embodiment uses ground pads to achieve the coplanar structure. In comparison to the conventional implementation, fundamentally our invention provides a group grounding (there are 21 ground pads 711 overlap with droplet 751 in FIG. 7B) that is more reliable than the basic one-to-one relationship of conventional implementation. If one droplet depends only on one ground pad then the size of the droplet would be critical to make sure a reliable droplet manipulation because the overlap between the droplet and the ground pad is a must. A sea of ground pads don't have this constrain; regardless the size of the droplet, many ground pads would be overlapped with the droplet as shown in FIG. 7B. The driving force for the droplet is basically proportional to the charge accumulated across the biased activating electrode and the ground pad. And typically the charge accumulation is also proportional to the surface area of the electrode and ground pad. A small size ground pad will have significant degrading on the driving force unless a special treatment of the ground pad is applied to improve other physical parameters and it will complicated the fabrication processes. In our invention the group of ground pad can be easily adjusted to optimize the total surface area of the ground pads. In addition, the diving force of the droplet for a coplanar structure eventually will be balanced at around the middle point of the ground pad and the driving electrode. So there is a chance that the droplet never can reach the second ground pad and that cause an unreliable droplet operation. This is especially true for a smaller droplet. Our invention using group grounding so consistent overlaps of ground pads, microelectrodes, and droplets guarantee the reliable droplet operations. Also, in our invention the miniature microelectrode (typically is less than 100×100 $\mu m^2$) is beyond the feasibility of PCB technology and required micro-fabrication techniques derived from semiconductor integrated circuit manufacturing.

Figure 8A:
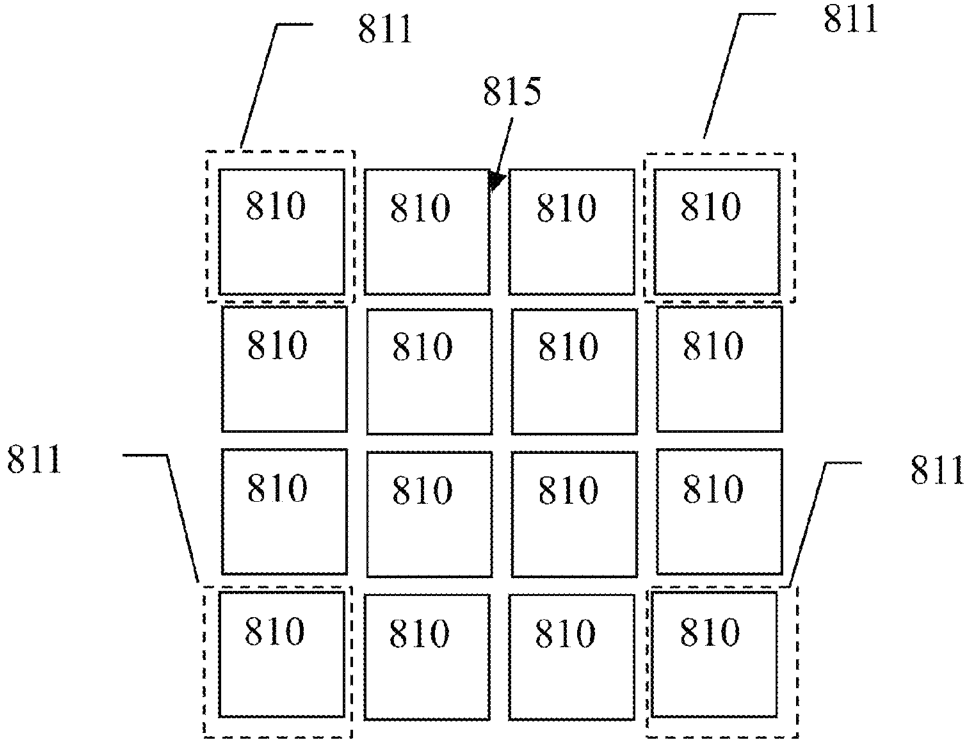
FIGS. 8A, 8B and 8C are diagrams of "programmed ground pads" coplanar structure.
Figure 8B:
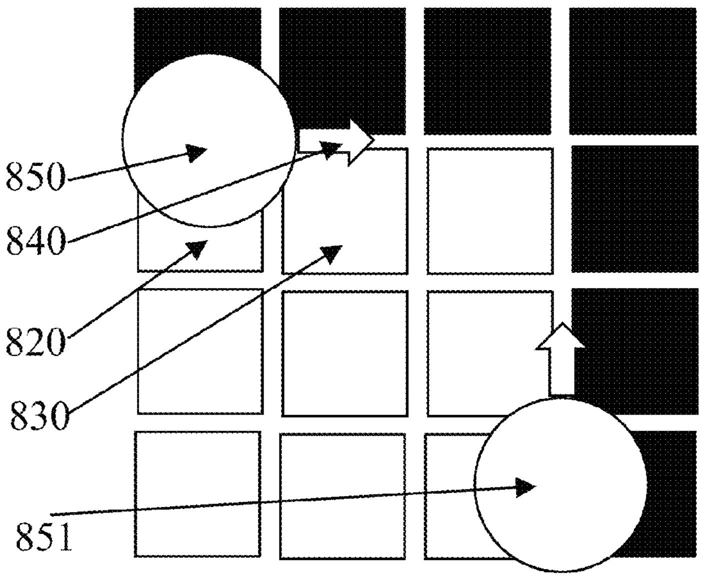
Figure 8C:
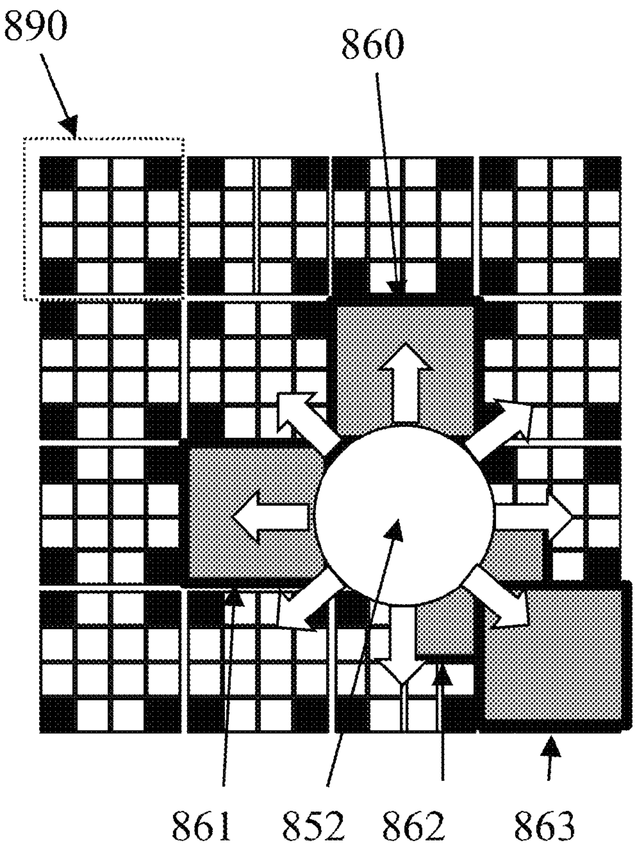

FIG. 8A illustrates another embodiment of the "programmed ground pads" coplanar microelectrode structure. There are no ground lines or ground pads on the same plate with microelectrodes. Instead, some microelectrodes are used as the ground pads to achieve a coplanar electrode structure. FIG. 8A shows 4×4 identical square microelectrodes 810 with gap 815 in between. In this embodiment, any one of the microelectrodes 810 can be configured to act as the ground electrode by physically connected to the electrical ground. In this embodiment, the microelectrodes 810 at the four corners are configured as ground electrodes 811. This invention has the advantage of group grounding vs. a one-to-one electrode and grounding structure in the conventional implementation. Also, the field-programmability and the miniature microelectrodes provide more flexibility and more granularities in the dynamic configuration of the "configured-electrodes" and the "configured-ground pads". As indicated in FIG. 8B, because of the one-to-one electrode and grounding structure in the prior art, the droplet 850 can only move on the x-axis direction and droplet 851 can only move on the y-axis direction. In this conventional coplanar structure configuration, the droplet 850 would be centered between the activated electrode 820 and the ground electrode which is marked as black because of the distribution of accumulated charges between the electrode 820 and the ground pads. The only way to move the droplet 850 is to deactivate electrode 820 and to activate the adjacent electrode 830; in this way, the droplet 850 will be pulled into the direction along the line as indicated by the arrow 840. In comparison, droplet 852 sits on a coplanar surface employing the microelectrode array architecture can move in any directions as indicated in FIG. 8C. When "configured-electrode" 860 is activated droplet 852 moves upward. The same thing happens, when "configured-electrode" 861 is activated droplet 852 moves leftward. And when interim "configured-electrode" 862 is activated droplet 852 moves diagonally and the activation of "configured-electrode" 863 (with the deactivation of "configured-electrode" 862) pulls droplet 852 diagonally onto "configured-electrode" 863. For the illustrating purpose, each "configured-electrode" 890 has the ground microelectrodes on the four corners but this is not a fixed layout. Interim steps including changes on the ground electrodes or the activating electrodes can be implemented for the best results of the manipulations of the droplet.

Figure 9:
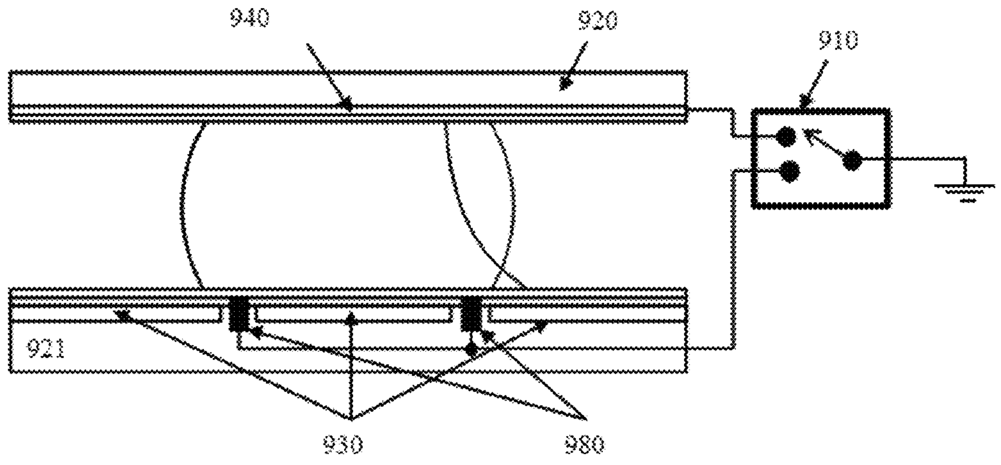
FIG. 9 illustrates a hybrid plate structure that can be controlled to switch the microelectrode structure between the coplanar mode and the bi-planar mode.

In another embodiment of the present invention, the LOC device employing microelectrode array architecture technique is based on a hybrid structure in which the actuations can occur either in a coplanar configuration or in a bi-planar configuration. FIG. 9 illustrates a switch 910 that can be controlled to switch the microelectrode structure between the coplanar mode and the bi-planar mode. In a coplanar mode the continuous ground electrode 940 on the cover plate 920 is connected to the ground and the ground grids 980 on the electrode plate 921 is disconnected from the ground. On the other hand, in a bi-planar mode the ground grids 980 on the electrode plate 921 is connected to the ground and the ground electrode 940 on the cover plate 920 is disconnected from the ground. In another embodiment, the "ground grids" can be replaced by the "ground pads" or the "programmed ground pads" of the as described in previous sections. Also, in one embodiment, the coplanar ground schemes might not be disconnected as long as the extra grounding doesn't cause any issues in bi-planar structure operations.

Figure 10:
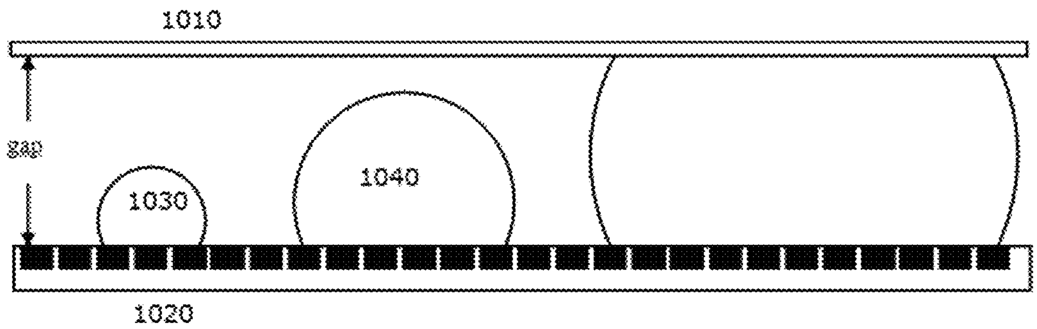
FIG. 10 is a hybrid structure with a removable, adjustable and transparent top plate to accommodate the widest range of droplet sizes and volumes.

In another embodiment, a removable, adjustable and transparent top plate is employed in the hybrid structure for the microelectrode array architecture technique to optimize the gap distance between the top plate 1010 and the electrode plate 1020 as shown in FIG. 10. The electrode plate 1020 is implemented by the microelectrode array architecture technique that the side view of the configured-electrode for droplet 1030 includes three microelectrodes (shown in black). The configured-electrode for droplet 1040 includes six microelectrodes and the configured-electrode for droplet 1050 includes eleven microelectrodes. This embodiment is especially useful in the application such as field-programmable LOC. While microelectrode array architecture provides the field-programmability in configuring the shapes and the sizes of the configured-electrode, a system structure that can accommodate the widest ranges of sizes and volumes of the droplets is highly desirable. Because the wider the droplet sizes and volumes a field-programmable LOC can accommodate, the more applications can be implemented. The optimized gap distance can be adjusted to fit the desired sizes of the droplets. In the present invention, the optimized gaps can be implemented in three approaches: First, all the droplets can be manipulated without touching the top plate 1010. This approach is generally applied to the coplanar structure. In a second approach, all droplets can be manipulated by touching the top plate 1010 that droplets are sandwiched between the top plate 1010 and the electrode plate 1020. The second approach is generally applied to bi-planar structure. The third approach or a hybrid approach incorporates the functions of coplanar structure and an adjustable gap between the top cover 1010 and the coplanar electrode plate 1020. This hybrid approach can be used to provide the droplets with the widest range. As shown in FIG. 10, the droplet 1030 and droplet 1040 sit within the gap are manipulated without touching the top plate 1010. The droplet 1050 is manipulated to be sandwiched between the top plate 1010 and the electrode plate 1020. This invention is not limited to the microelectrode array architecture technique. It can also be applied to other conventional electrode plates while the applicable ranges of the droplet sizes may be limited.

Figure 11A:
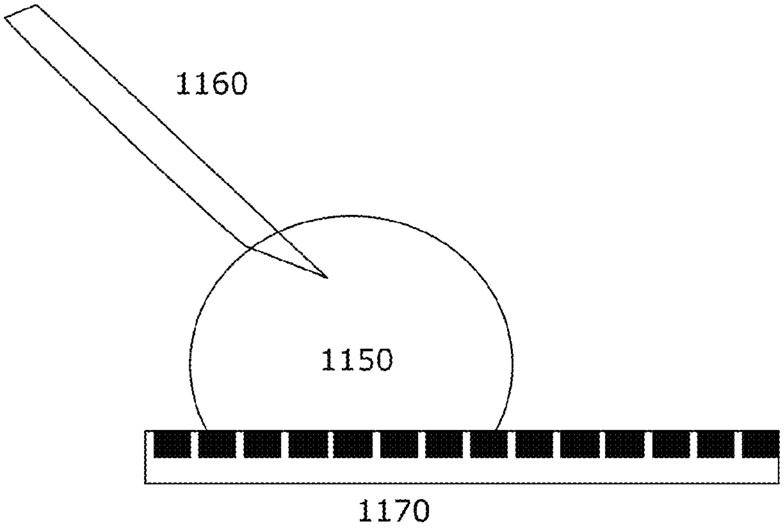
FIGS. 11A and 11B are illustrations of loading the samples.
Figure 11B:
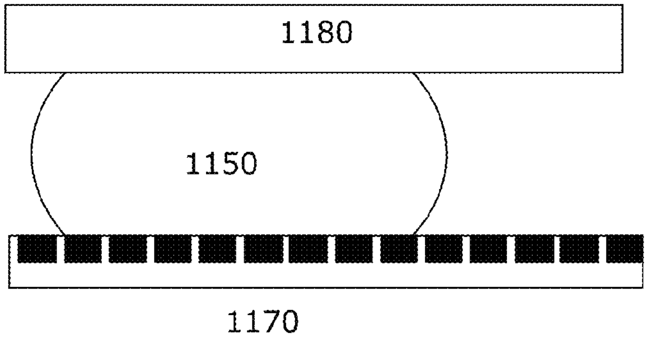

One embodiment of the present invention is based on the coplanar structure that the cover can be added after the samples or reagents are loaded onto the LOC so there is no need for fixed input ports. This is especially important for the microelectrode array architecture because the field-programmability of the architecture can dynamically configure shapes, sizes and locations of the reservoirs and the fixed input ports limit the flexibility of the system. FIG. 11A shows the loading of the sample 1150 by a needle 1160 directly onto the coplanar electrode plate 1170. The loading of the sample don't have to be very precise because if necessary the locations of the reservoirs can be adjusted dynamically to compensate the physical loading deviation. FIG. 11B indicates a passive cover 1180 is put on after the sample 1150 is loaded.

In yet other embodiments, all typical microfluidic operations can be performed by configuring and controlling of the "configured-electrodes" under the Microelectrode Array Architecture. "Microfluidic operations" means any manipulation of a droplet on a droplet microactuator. A microfluidic operation may, for example, include: loading a droplet into the droplet microactuator; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; disposing of a droplet; transporting a droplet out of a droplet microactuator; other microfluidic operations described herein; and/or any combination of the foregoing.

In yet another embodiment, besides the conventional control of the "configured-electrodes" to perform typical microfluidic operations, special control sequences of the microelectrodes can offer advanced microfluidic operations in manipulations of droplets. Advanced microfluidic operations based on the Microelectrode Array Architecture may include: transporting droplets diagonally or in any directions; transporting droplets through the physical gaps by Interim bridging" technique; transporting droplets by Electrode Column Actuation; Washing out dead volumes; transporting droplets in lower driving voltage situation; transporting droplets in controlled low speed; performing precise cutting; performing diagonal cutting; performing coplanar cutting; merging droplets diagonally; deforming droplets to speed mixing; improving mixing speed by uneven back-and-forth mixer; improving mixing speed by circular mixer; improving mixing speed by multilaminates mixer; other advanced microfluidic operations described herein; and/or any combination of the foregoing.

Figure 12A:
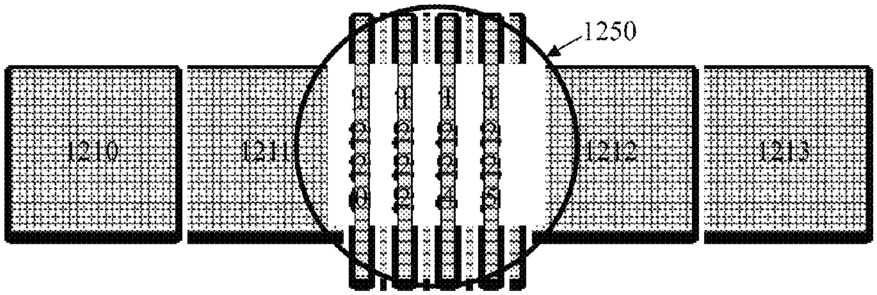
FIG. 12A illustrates the top view that droplet and suspended particles are actuated by configured-square-electrodes and configured-strip-electrodes by EWOD and DEP, respectively.
Figure 12B:
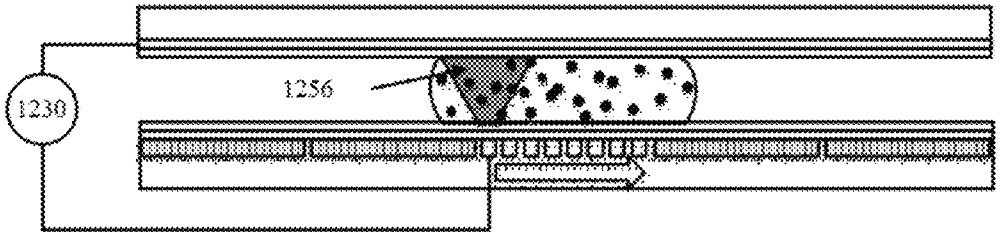
FIGS. 12B and 12C are the cross section views showing a high frequency signal applied to the strip configured-electrodes from left to right; the non-uniform electric field inside the droplet drives the particles to the right by DEP.
Figure 12C:
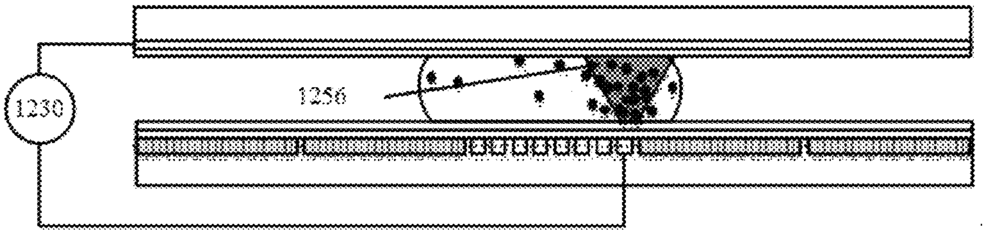
Figure 12D:
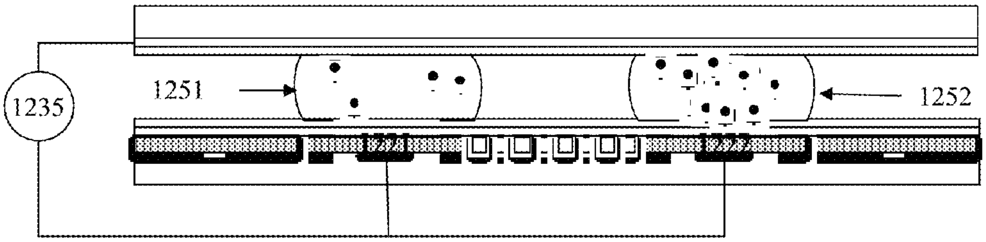
FIG. 12D shows a low frequency signal applied on the square configured-electrodes to generate two sub droplets with different particle concentrations by EWOD.

One embodiment of the invention to do the sample preparation under microelectrode array architecture is illustrated as top view in FIG. 12A that droplet 1250 and suspended particles are actuated by configured-square-electrodes (1210, 1211, 1212, and 1213) and configured-strip-electrodes (1220, 1221, 1222, 1223, 1224, 1225, and 1226) by EWOD and DEP, respectively. "Configured" means the FIGS. 12B and 12C are the cross section views that by applying a high frequency signal (VHF) 1230 on the strip electrodes from left to right (1220 to 1226), the non-uniform electric field 1256 inside the droplet drives the particles to the right by DEP. By applying a low frequency signal (VLF) 1235 on the square electrodes 1221 and 1222, two subdroplets 1251 and 1252 are obtained by EWOD with different particle concentrations. As examples, the particles attracted by positive DEP when a 2 MHz and 60 Vrms signal 1230 is applied on one of the strip electrodes from left to right. After the cells are concentrated to the right side in the droplet, the droplet is split into two sub-droplets by EWOD with 80 Vrms and 1 kHz applied on the two configured-square-electrodes. As a result, by energizing the strip electrodes with a single cycle from left to right, the cells are concentrated (right sub-droplet 1251) or diluted (left sub-droplet 1251) as in FIG. 12D.

Figure 13:
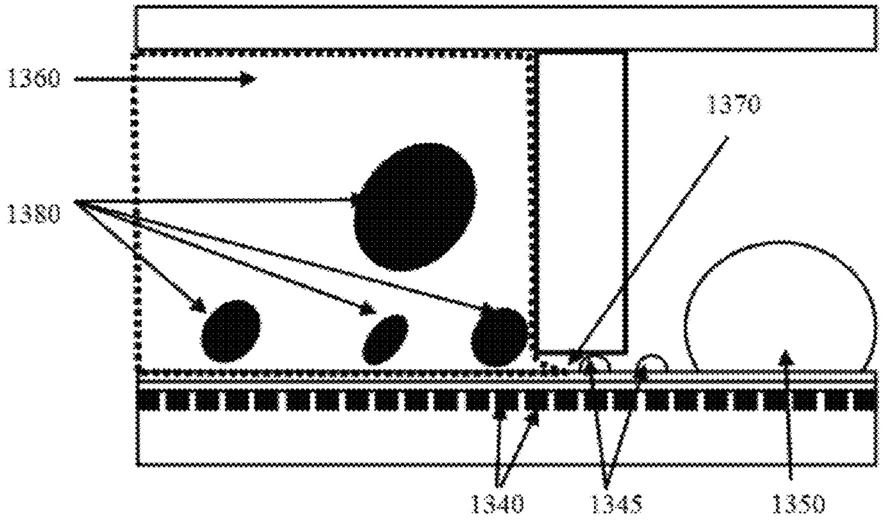
FIG. 13 illustrates another embodiment of FPLOC sample preparation using droplet aliquots technique.

FIG. 13 illustrates another embodiment of sample preparation using droplet aliquots technique under microelectrode array architecture. One of the common sample preparation steps is the removing of blood cells from the full blood to get plasma for the immunoassay. As shown in FIG. 13, using the droplet aliquots technique through microelectrodes 1340 to create smaller droplet which is too small to carry some or any of the blood cells 1380 then move the small droplets 1345 through the small-scaled vertical gap 1370 to form a desire droplet 1350. The combination of the droplet aliquots technique and the small gap 1370 can efficiently move the small droplets 1345 from the reservoir/droplet 1360 through the channel 1370 to form a bigger droplet 1350 while blood cells 1380 are blocked. The physical obstacle here is mainly used to help droplet aliquots technique and it could be different shapes than square to create smaller droplet with microelectrode. It is not used as the main cause of the removal of the blood cells. By using droplet aliquots technique, this sample preparation invention not only can remove the particles from the droplet but also can prepare the right-sized droplets for diagnostic test.

Figure 14A:
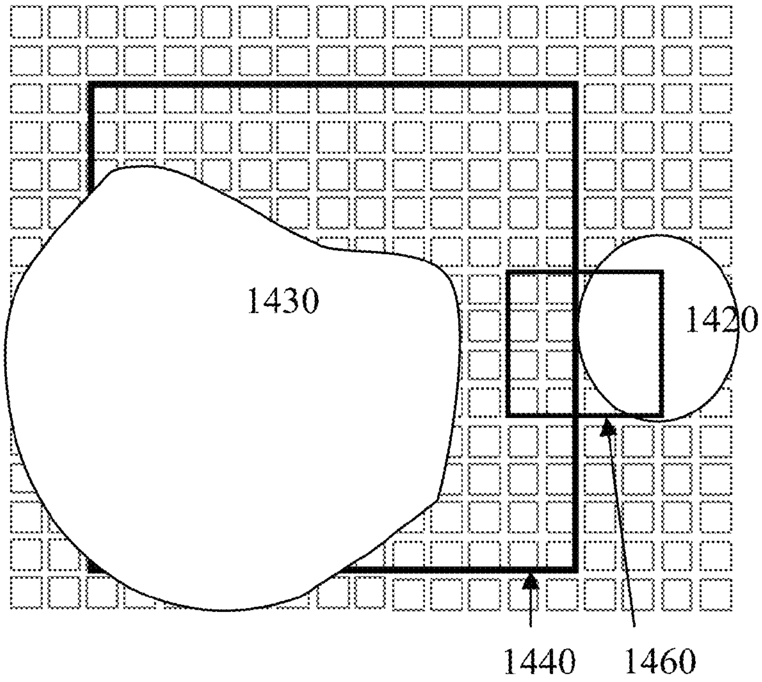
FIGS. 14A and 14B show the capability to self-adjust the position of the loaded samples or reagents to the reservoirs.
Figure 14B:
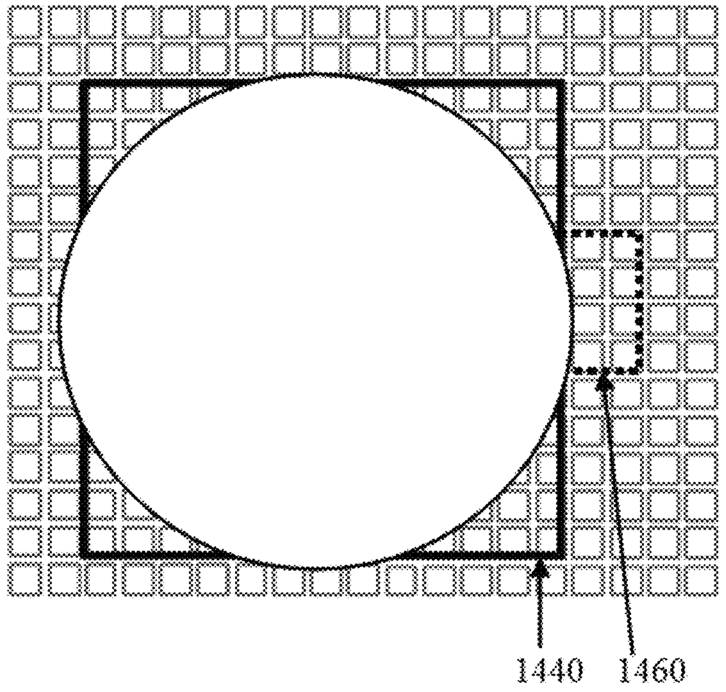

In another embodiment, microelectrode array architecture has the capability to self-adjust the position of the loaded samples or reagents to the reservoirs. This means the need of a precisely positioned input port and the difficulties to handle the samples and reagents through the input port to the reservoir can be avoided. FIG. 14A shows the loaded samples are broken into droplet 1420 and droplet 1430 and both are not precisely positioned on top of the reservoir 1440. Droplet 1420 doesn't even have any overlap with reservoir 1440. For a conventional LOC, it's difficult to re-position the droplet 1420 into the reservoir 1440. This self-positioning embodiment of the invention can be done even if the sample droplet 1420 is loaded away from the reservoir by activating an interim configured-electrode 1460 to pull the droplet 1420 into the overlap of reservoir 1440. Then subsequently deactivating interim configured-electrode 1460 and activating reservoir 1440 to position sample correctly into the reservoir as indicated in FIG. 14B.

Figure 15:
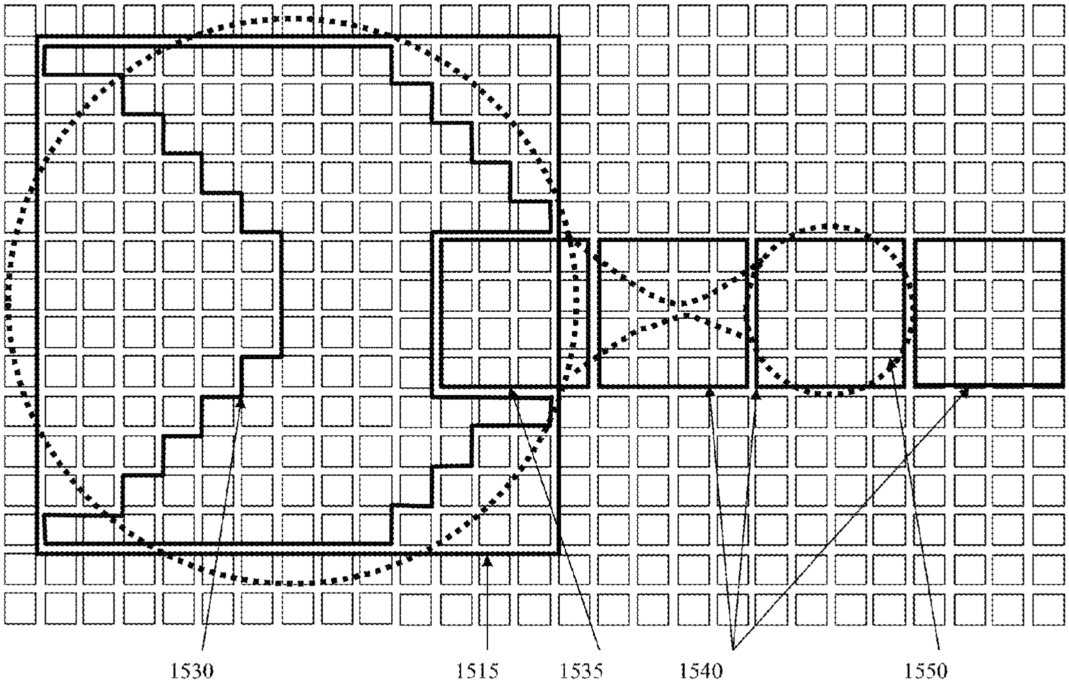
FIG. 15 represents the one embodiment of FPLOC droplet creation procedure.

FIG. 15 represents the one embodiment of the droplet creation procedure under microelectrode array architecture. Conventionally, special shaped reservoir 1530 and an overlapped electrode 1535 are a must to create droplets. In the present invention, the shape of the reservoir 1530 can be a square-shaped reservoir 1515 and don't need an overlapped electrode 1535. In another embodiment, the shape of the reservoir 1515 can be any other shape depending on the design needs by designing the array of the microelectrodes. As shown in FIG. 15, the creation of the droplet refers to the process of extruding the droplet 1550 out from the square-shaped reservoir 1515. To start the droplet creation procedure, interim electrode 1530 is activated first as the pull-back electrode and then another interim electrode 1535 is activated to extrude the liquid. Subsequently, through the activation of adjacent serial configured-electrodes 1540 by extruding a liquid finger from the reservoir 1515 and eventually creating droplet 1550. Each of the configured-electrodes 1540 is composed of a configured 4×4 microelectrode square. In the present invention, the dimensions of the configured-electrodes 1540 can be in a range from tens of micro-meters to several mini-meters but not limited to this range. The shape of the configured-electrodes can be square or other shapes. In the present invention, the reservoirs can be square, round or special-shaped.

Figure 16:
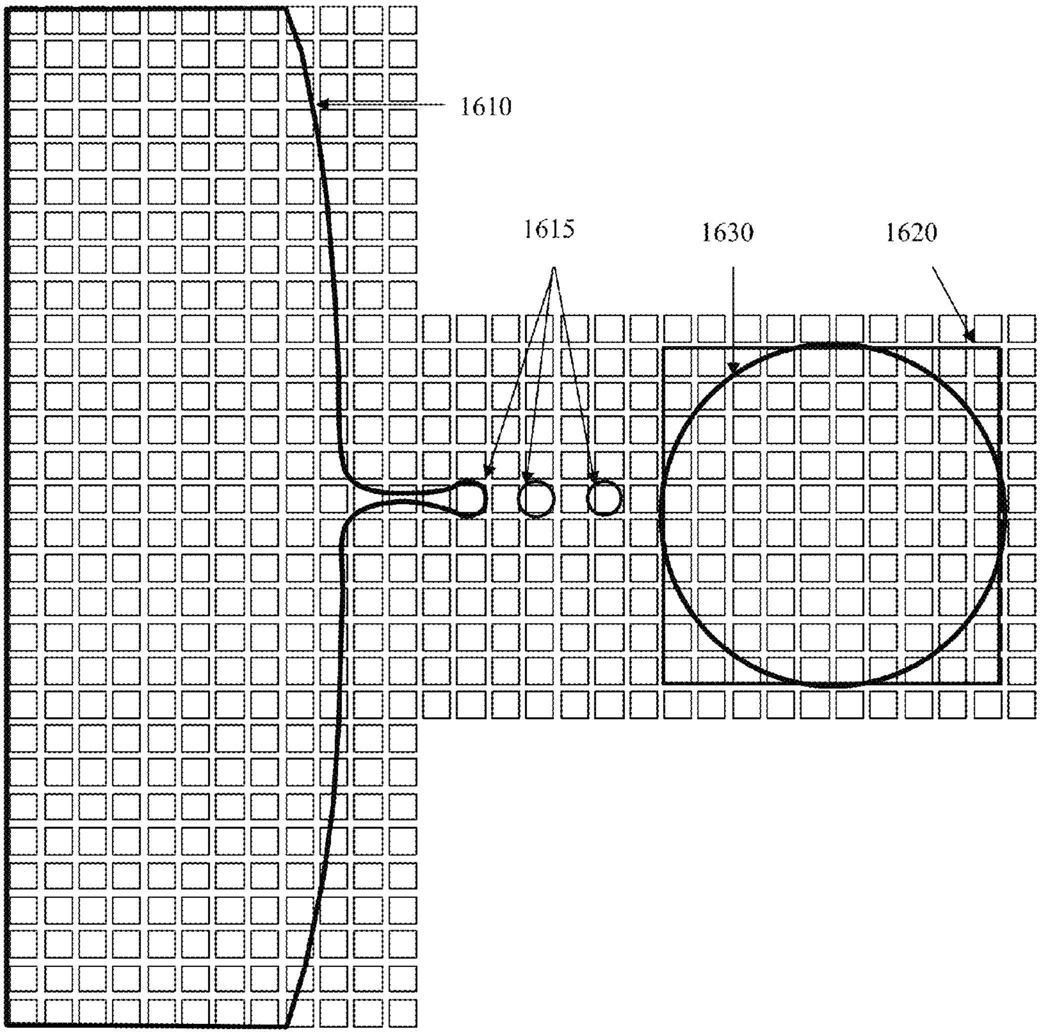
FIG. 16 illustrates the special droplet creation procedure called "droplet aliquots".

FIG. 16 illustrates the embodiment of a special droplet creation procedure called "droplet aliquots" of the present invention. Droplet aliquots is to use the Microelectrode Array Architecture to create smaller droplets 1615 first from reservoir 1610 by microelectrodes or smaller configured-electrodes and then collect the smaller droplets 1615 together by activating configured-electrode 1620 to form a bigger droplet 1630. Conventionally, droplet sizes are approximated to the sizes of the electrodes and a more precise way to control the volumes of the droplets doesn't exist. Droplet aliquots can be used to do more precise control of the volumes of the droplets. Also, in a reverse way, this technique can be used to measure the volume of the bigger droplet 1630, in a way to count how many smaller droplets 1615 can be created from droplet 1630 as indicated in FIG. 16.

Figure 17:
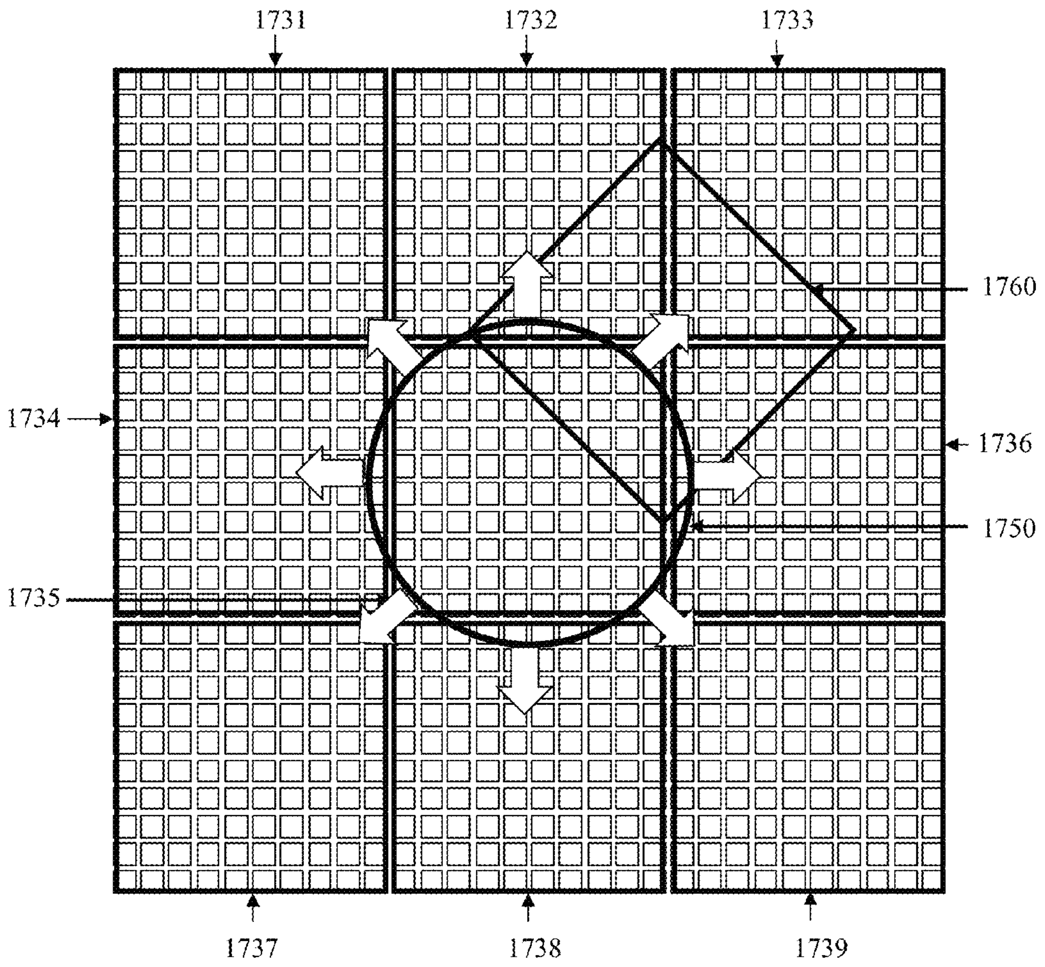
FIG. 17 is a diagram showing the transportation of droplet of FPLOC.

FIG. 17 is a diagram showing the embodiment of the transportation of droplet under microelectrode array architecture. As illustrated there are 9 adjacent configured-electrodes 1731 to 1739. Each of the configured-electrodes is composed of a configured 10×10 microelectrode squares. The droplet 1750 lies on top of the center configured-electrode 1735. In a conventional microfluidic transportation operation, droplet 1750 can only be actuated from configured-electrode 1735 in north-south and east-west directions under this square-electrode setting. For example by activating configured-electrode 1734 and deactivating configured-electrode 1735 will move the droplet from configured-electrode 1735 onto configured-electrode 1734. Nonetheless, this conventional operation will not be able to move droplet 1750 diagonally from configured-electrode 1735 onto anyone of configured-electrodes 1731, 1733, 1737, or 1739 because these four configured-electrodes have no physical overlap with droplet 1750. This droplet-doesn't-cover-the-4-corners limitation is always true for droplets created from typical droplet creation processes. In order to move diagonally, one embodiment is to activate configured-electrode 1760 as the interim step, and then subsequently activate the desired configured-electrode 1733 and deactivate the interim configured-electrode 1760 so therefore can move the droplet 1750 diagonally into the desired configured-electrode 1733. As shown in FIG. 17, based on this invention the droplet 1750 can be moved in all 8 directions in a square-electrode setting. Also, the transportation of the droplet is not limited to the 8 directions. If a adjacent configured-electrode is outside of these 8 directions, an interim configured-electrode still can be activated to transport the droplet into the destination.

Figure 18:
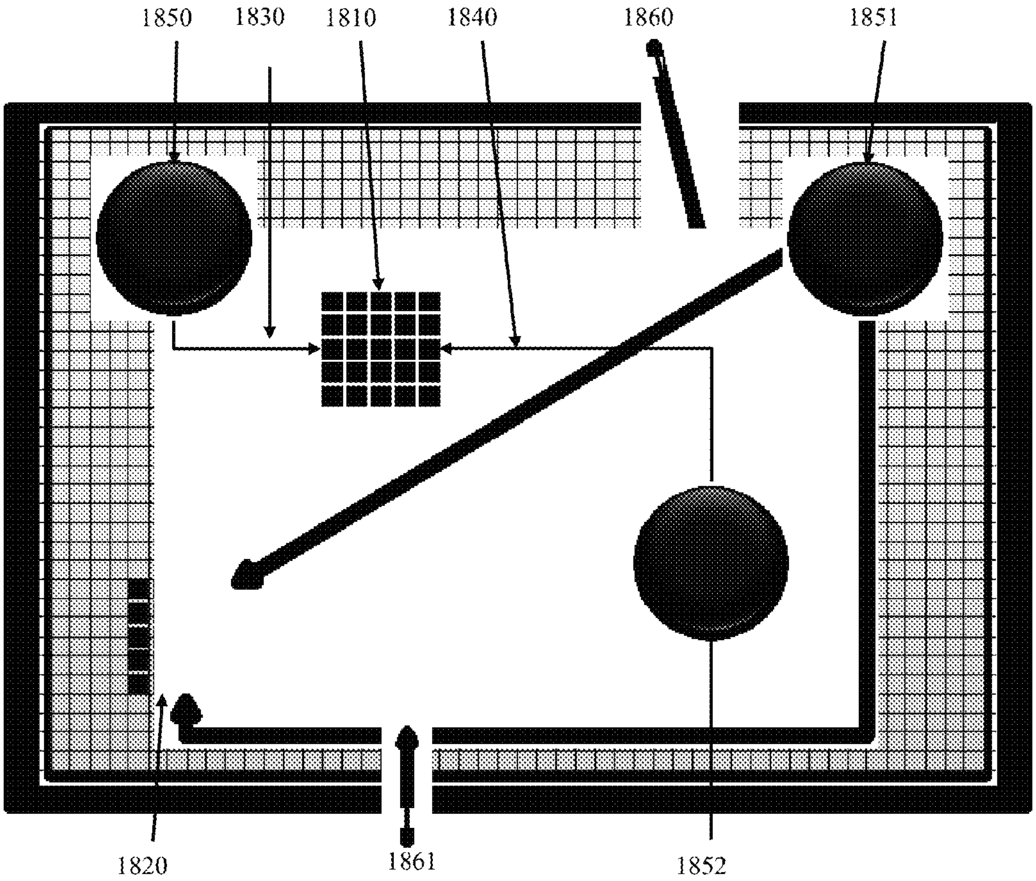
FIG. 18 is a diagram showing the Droplet routing of FPLOC.

Conventionally, a LOC has transportation path electrode 440 to connect different parts of the LOC to transport the droplets as shown in FIG. 4A. One embodiment of the droplet routing for LOC under microelectrode array architecture doesn't require the fixed transportation paths for transporting droplets as illustrated in FIG. 18. Instead, droplet routing is used to move multiple droplets simultaneously from multiple beginning locations to the destinations. Notably the routing process will be very different and efficient than the conventional microfluidic designs, because by activating different microelectrodes virtually can move in any directions including diagonal moves. Droplets 1850, 1851 and 1852 are at their beginning positions as indicated in FIG. 18. Droplet 1850 and droplet 1852 will be mixed at configured-electrode 1810 and droplet 1851 will be transported to configured-electrode 1820. Unlike traditional VLSI routing problems, in addition to routing path selection, the biochip routing problem needs to address the issue of scheduling droplets under the practical constraints imposed by the fluidic property and the timing restriction of the synthesis result. If contamination is not a concern then droplet 1851 can be moved $1^{st}$ by taking the route of 1860 and droplet 1852 can be moved by taking the route of 1840. Cares needed here to arrange the transporting timing of droplet 1851 and 1852 so they don't collide together while moving to their destinations. If contamination is a concern then 1851 might take the route of 1861 to avoid any overlap of droplet moving routes. Also, for the two droplets 1850 and 1852 to merge at configured-electrode 1810, cares might be needed to arrange the timing of droplet actuations so the lengths differences of route 1830 and route 1840 can be taken into consideration and to have a best mixing result. When the applications performed on microelectrode array architecture devices becoming more sophisticated, top-down design automation will be require defining the routing and timing of droplets on the devices. After the biomedical microfluidic functions have been defined then architectural-level synthesis is used to provide the microfluidic functions to LOC resources and to map the microfluidic functions to the time steps of actuations.

Figure 19A:
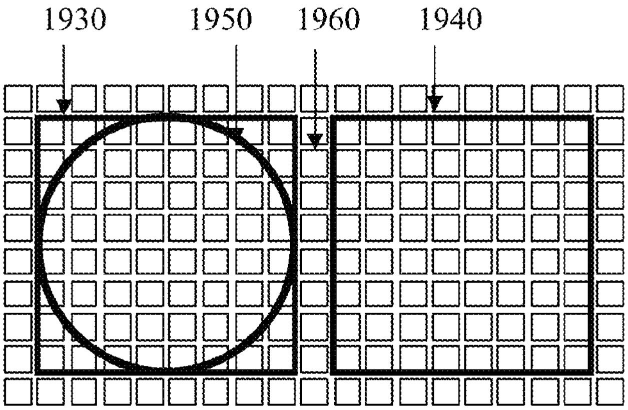
FIGS. 19A, 19B and 19C are diagrams showing the transportation of a droplet using interim bridging procedure of FPLOC.
Figure 19B:
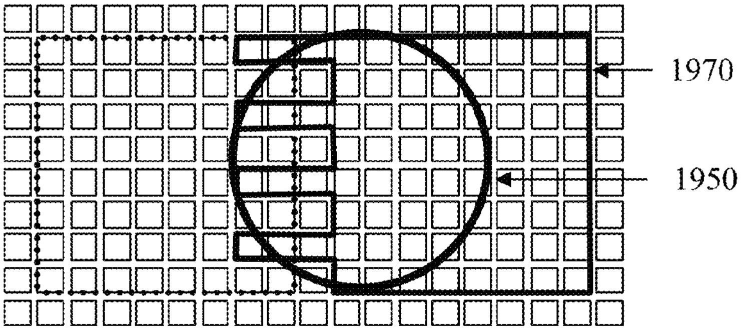
Figure 19C:
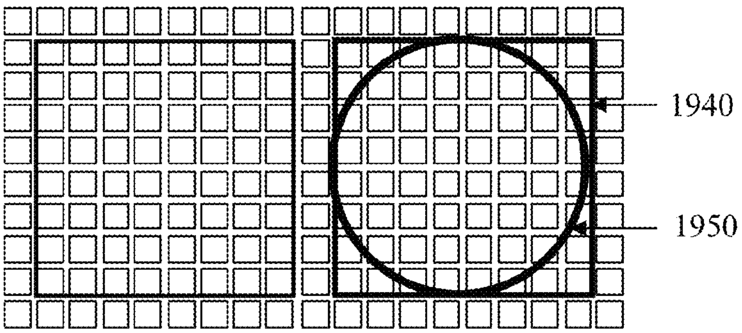

Another embodiment of the invention in the transportation and movement of the droplet under microelectrode array architecture called "Interim bridging technique" is illustrated in FIGS. 19A-19C. Droplet cutting and evaporation sometimes can make the droplet too small and the droplet can't be actuated reliably by electrodes. FIG. 19A indicates two configured-electrodes 1930, 1940, respectively, which are separated by a gap 1960. The droplet 1950 sits on the left-side configured-electrode 1930. The gap 1960 between the two configured-electrodes 1930 and 1940 is wide enough to segregate the two configured-electrodes 1930, 1940 so the droplet 1950 sits on the left-side configured-electrode 1930 would not touch the next adjacent configured-electrode 1940. FIG. 19A shows that under the conventional droplet transportation, the movement of droplet 1950 from configured-electrode 1930 into configured-electrode 1940 generally fails since the configured-electrode 1940 doesn't have a physical overlap with droplet 1950 to change its surface tension. FIG. 19B illustrates the transportation of the droplet 1950 from FIG. 19A into the desired configured-electrode 1940. In this procedure, the microelectrodes covered by the “toothed” area 1970 are activated. The toothed configured-electrode 1970 covers partially the left-side configured-electrode 1930, gap 1960, and the entire next configured-electrode 1940. As shown in FIG. 19B, the “toothed” configured-electrode 1970 has a physical overlap with droplet 1950 and the activation of configured-electrode 1970 will move the droplet 1950 on top of configured-electrode 1970 as shown in FIG. 19B. FIG. 19C illustrates the completion of the droplet transportation to the desired configured-electrode 1940. After the droplet 1950 is moved to the desired configured-electrode 1970, the “toothed” configured-electrode 1970 is de-activated and the next configured-electrode 1940 is activated to position and locate the droplet 1950 into the desired square-shaped configured-electrode 1940.

Figure 20A:
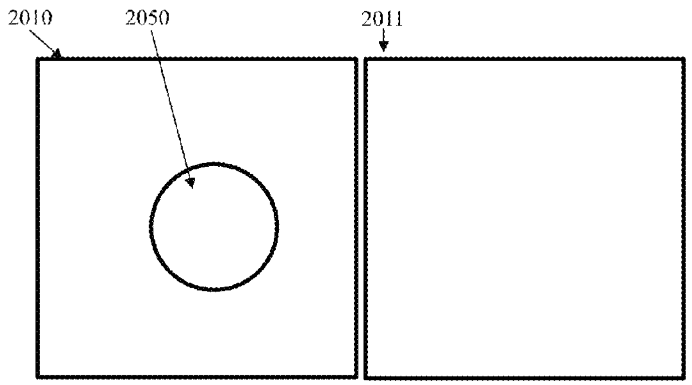
FIGS. 20A, 20B and 20C are diagrams showing the Electrode Column Actuation.
Figure 20B:
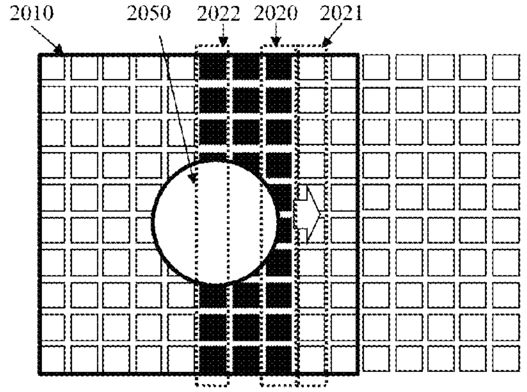
Figure 20C:
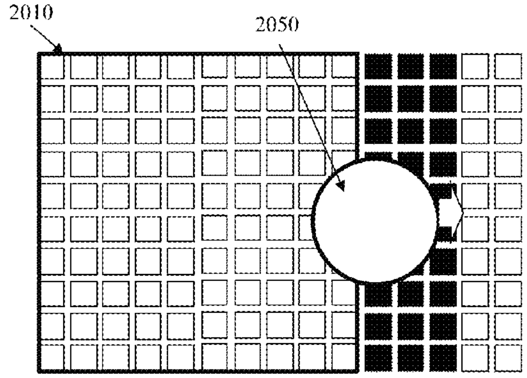

Yet, another embodiment of the invention in the transportation and movement of the droplet under microelectrode array architecture is called “electrode column actuation”. Droplet cutting and evaporation sometimes can make the droplet too small and the droplet can’t be actuated reliably by electrodes. As illustrated in FIG. 20A, sometimes the droplet 2050 becomes so small that it is smaller than the electrode 2010 and has no physical overlap with the adjacent electrode 2011. In this situation even if electrode 2011 is activated the droplet 2050 still can’t be moved into electrode 2011 and the droplet is stuck in the system. One effective way to flush out the stuck droplets is to use the electrode column actuation. The actuating electrodes are arranged into columns to perform the electrode column actuation as shown in FIG. 20B. Here, each configured-electrode column 2020 is composed of 1×10 microelectrodes and 3 configured-electrode columns are grouped together to perform the electrode column actuation as marked black in FIG. 20B. The default column width is one microelectrode but can be other numbers depends on the applications. The most effective electrode column actuation is to have a group of columns that has the width a little bit larger than the radius of the droplet. This is the reason why 3 columns are grouped together here. And the length of the column depends on the application and normally the longer the better. For this 3-column configuration to move the droplet 2050, the configured-electrode column 2021 in front of the leading configured-electrode column 2020 is activated and the trailing configured-electrode column 2022 is deactivated. In this way, regardless the sizes of the droplets, the 3 configured-electrode column always provides a maximum effective length of the contact line. As a result, the droplet can be moved efficiently and smoothly because the capillary force on the droplet is consistent and maximized. So the droplet can be moved in a much lower driving voltage than the conventional droplet operations. This electrode column actuation technique can be used to transport droplets with smooth movement in much lower driving voltage. Also, because the consistent capillary force of this technique, it can be used to do the control of the droplet speed especially in low speed situations by advancing the configured-electrode column in low speed. Experiments showed that under marginal driving voltages, this smooth and effective driving capability of the electrode column actuation is more obvious. Slowly but steadily moving DI water droplet (1.1 mm diameter) in 10 cSt silicon oil has been observed below 8 Vp-p 1 k Hz square driving voltage with 80 μm gap. The length can be configured to be the full length of the LOC that a single sweep of the electrode column actuation can wash out all dead droplets in the LOC. FIG. 20C shows the small droplet 2050 is moved out of configured-electrode 2010.

Figure 21A:
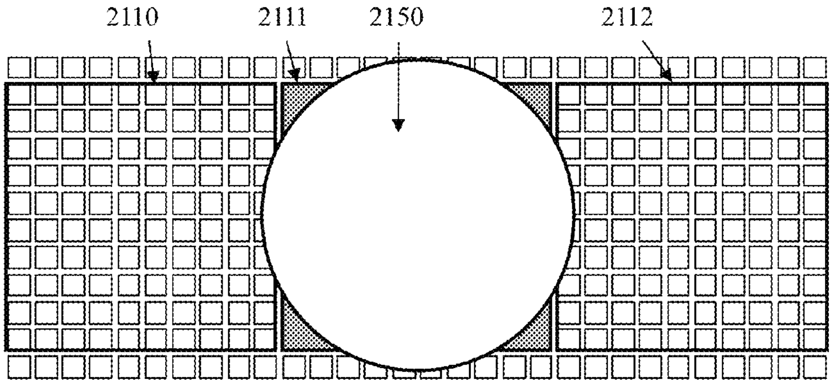
FIGS. 21A, 21B and 21C are diagrams showing the cutting of a droplet of FPLOC.
Figure 21B:
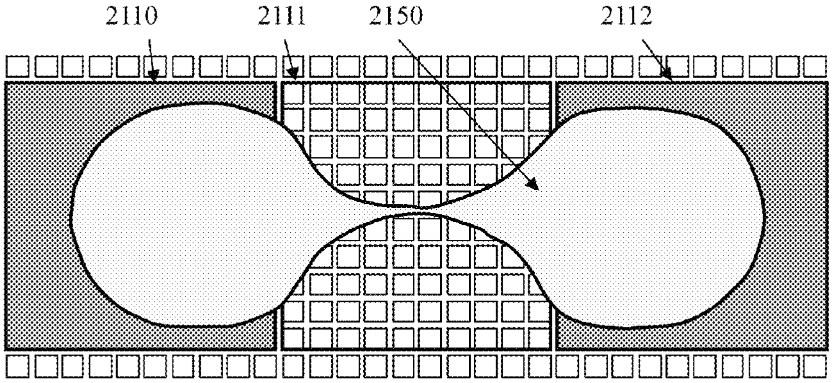
Figure 21C:
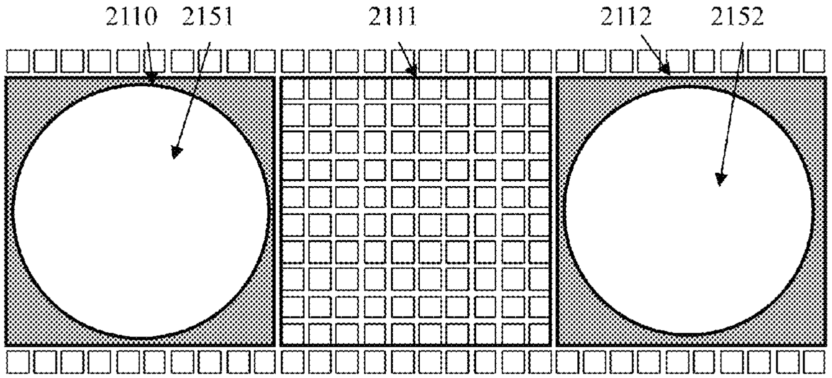

For cutting a droplet three configured-electrodes are used under microelectrode array architecture. One embodiment of the present invention for performing a typical 3-electrode cutting of a droplet under microelectrode array architecture is shown in FIGS. 21A-21C. Three configured-electrodes are used and the droplet to be cut sitting on top of the inner configured-electrode 2111 in FIG. 21A and has partial overlaps with outer configured-electrodes 2110 and 2112. During cutting, the outer two configured-electrodes 2110 and 2112 are activated and with the inner configured-electrode 2111 deactivated and the droplet 2150 expands to wet the outer two electrodes. In general, the hydrophilic forces induced by the two outer configured-electrodes 2110 and 2112 stretch the droplet while the hydrophobic forces in the center pinch off the liquid into two daughter droplets. 2151 and 2152 as shown in FIG. 21C.

Figure 22A:
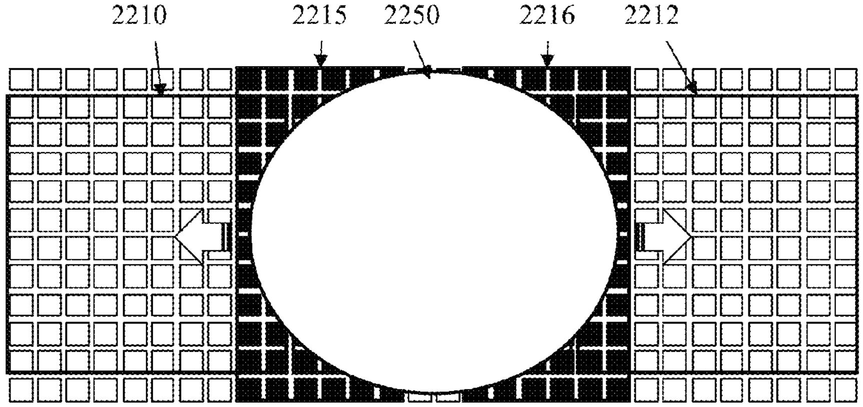
FIGS. 22A, 22B and 22C are diagrams showing the precise cutting of a droplet of FPLOC.
Figure 22B:
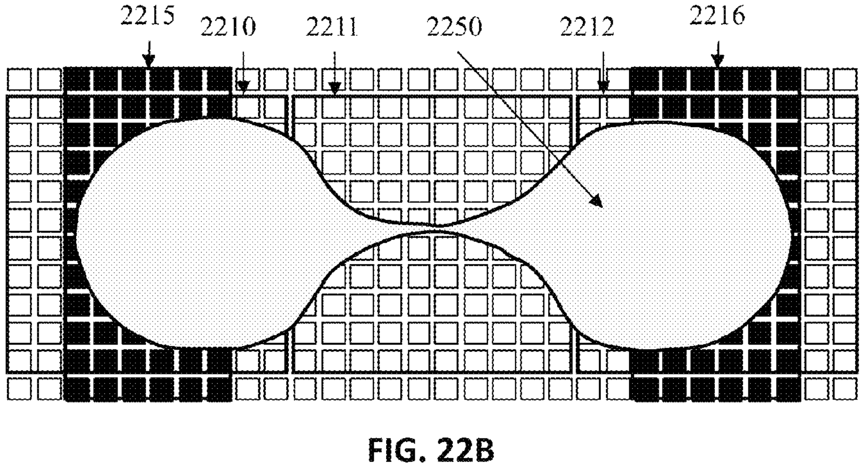
Figure 22C:
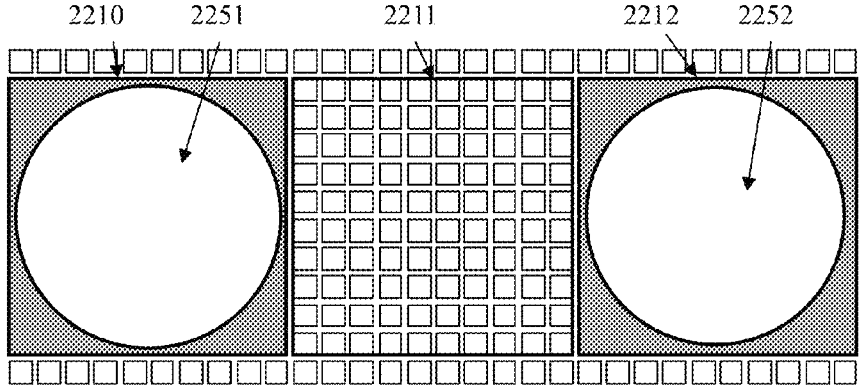

One embodiment of the present invention doing a precise cutting which is similar to the 3-electrode cutting is illustrated in FIGS. 22A-22C. The precise cutting also starts with the droplet to be cut sitting on top of the inner configured-electrode. But instead of using outer two configured-electrodes 2210 and 2212 to cut the droplet, the electrode column actuation technique is used to slowly but firmly pull the droplet 2250 toward configured-electrodes 2210 and 2212 as shown in FIG. 22A. Here two groups of 5 configured-electrode columns 2215 and 2216 (marked as black in FIG. 22A) are used to pull the droplet apart. FIG. 22B illustrates the two electrode column groups keep moving apart by advancing one microelectrode column a time. The hydrophilic forces induced by the two electrode column groups 2215 and 2216 stretch the droplet. When electrode column groups 2215 and 2216 reach the outer edges of the configured-electrodes 2210 and 2212, then all configured-electrode columns are deactivated and the configured-droplets 2210 and 2212 are activated to pinch off the liquid into two daughter droplets 2251 and 2252 as shown in FIG. 22C.

Figure 23A:
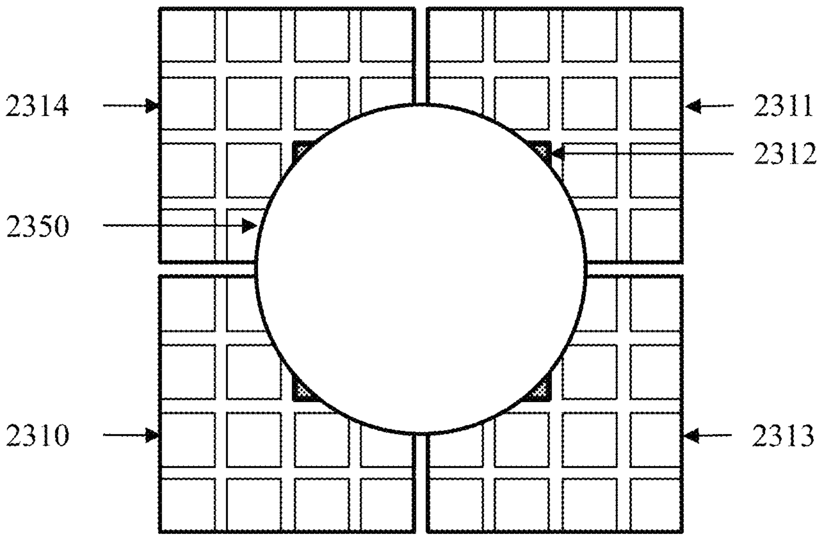
FIGS. 23A, 23B and 23C are diagrams showing the diagonal cutting of a droplet of FPLOC.
Figure 23B:
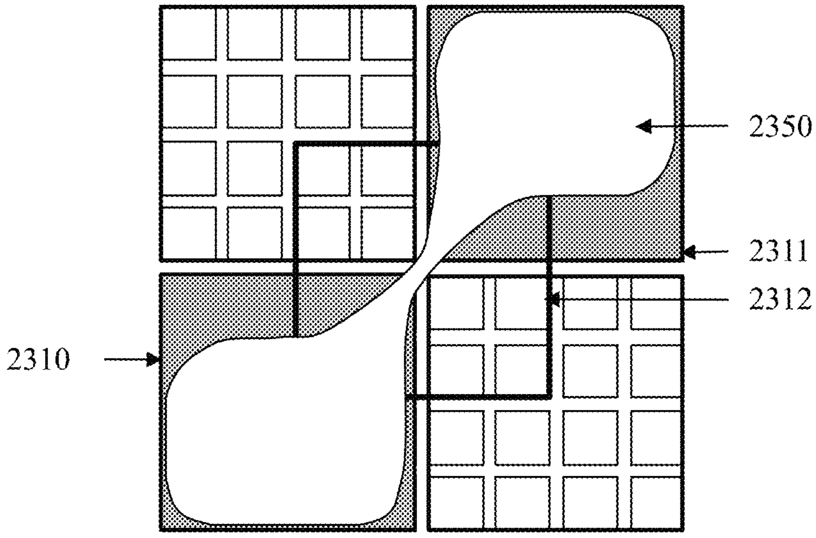
Figure 23C:
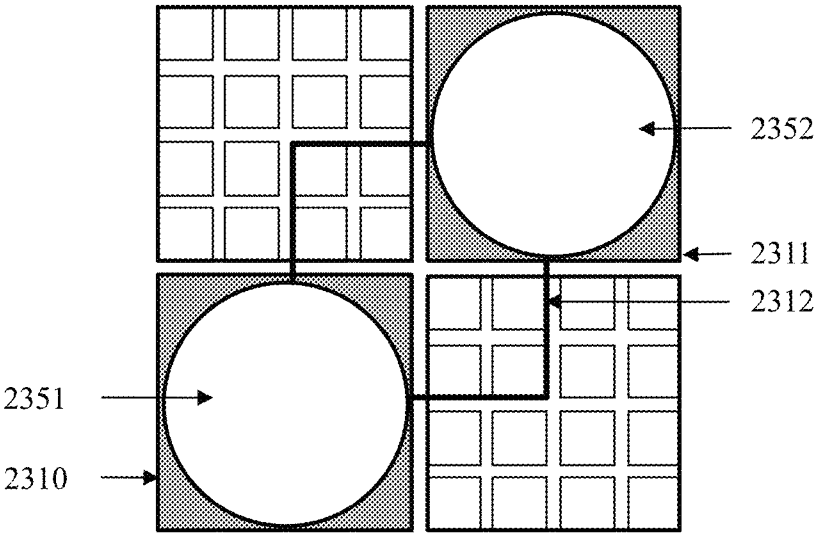

FIGS. 23A-23C illustrates the embodiment of the present invention of performing a diagonal cutting. The diagonal cutting starts with moving the droplet to be cut onto a interim configured-electrode 2312 which is centered at the joint corner of the four configured-electrodes 2310, 2311, 2313 and 2314 in FIG. 23A. After the droplet completely centered at the joint corner of the four configured-electrodes, then the interim configured-electrode 2312 is deactivated and configured-electrode 2310 and configured-electrode 2311 are activated and the droplet 2350 is stretched into a liquid column as indicated in FIG. 23B. To pinch off the liquid into two daughter droplets, the deactivations of the inner corners of configured-electrodes 2310 and 2311 are needed to produce the necessary hydrophobic forces in the middle of droplet 2350. FIG. 23C shows the L-shaped interim configured-electrodes 2315 and 2316 are activated to further stretches the droplet with only a thin neck in between and the hydrophobic forces in the middle subsequently helps to pinch off droplet 2350 into two sub-droplets 2351 and 2352. Finally, configured-electrodes 2310 and 2311 are activated again to center-position droplets 2351 and 2352 to configured-electrodes 2310 and 2311 as illustrated in FIG. 23D.

Figure 24A:
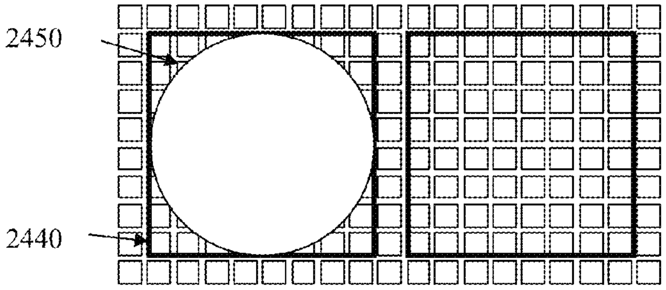
FIGS. 24A, 24B and 24C illustrate the droplet cutting procedure on an open surface of FPLOC.
Figure 24B:
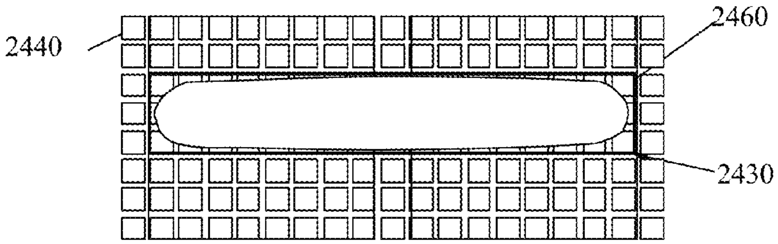
Figure 24C:
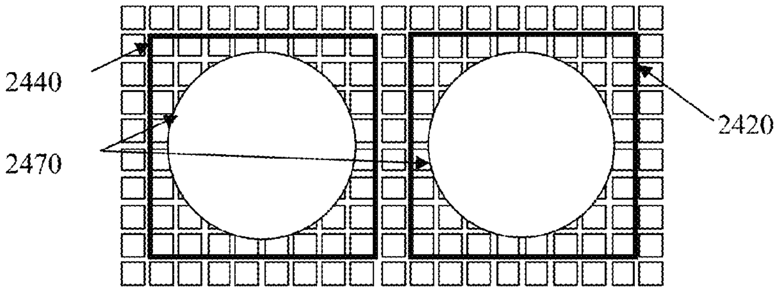

FIGS. 24A-24C illustrate the droplet cutting procedure on an open surface of under microelectrode array architecture. FIG. 24A illustrates a droplet 2450 sits on the left-side configured-electrode 2440. The droplet 2450 will be cut into two daughter droplets 2470 as shown on FIG. 24C. The droplet cutting procedure generally involves the next two procedures.

First, stretch the droplet-to-be-cut 2450 into a thin liquid column 2460 by activating the configured-electrode 2430 under appropriate voltages. This can be seen in FIG. 24B. Such "thin" liquid column generally refers to the liquid column with smaller width than the starting droplet diameter. Next, activate the two preselected configured-electrodes 2440 and 2420 to cut and to center-position droplets 2470 into these two configured-electrodes 2440 and 2420 as shown in FIG. 24C. The key for the coplanar cutting is to have enough overlaps between the droplet and the outer two configured-electrodes to have enough capillary force to overcome the curvature of the droplet to perform the cutting. In one embodiment, a passive cutting is presented when the liquid column 2460 is cut into multiple droplets by hydrodynamic instability. In another embodiment, both the passive and the active cutting are employed in the present invention. While the droplet is stretched into a thin liquid column, either the passive force or active force can be employed to break the starting droplet into two smaller droplets. When use the passive force, the calculation of the length of liquid column is important. When use active force, the optimized length is not important. Either passive cutting or active cutting, at the final step of the cutting procedure, configured-electrodes 2440 and 2420 are normally activated in order to position the droplets into the desired configured-electrodes. In another embodiment, either an active or a passive cutting procedure is performed under the open surface structure under microelectrode array architecture. FIG. 24C illustrates the completion of cutting when the droplet 2450 is cut into two droplets 2470.

Figure 25:
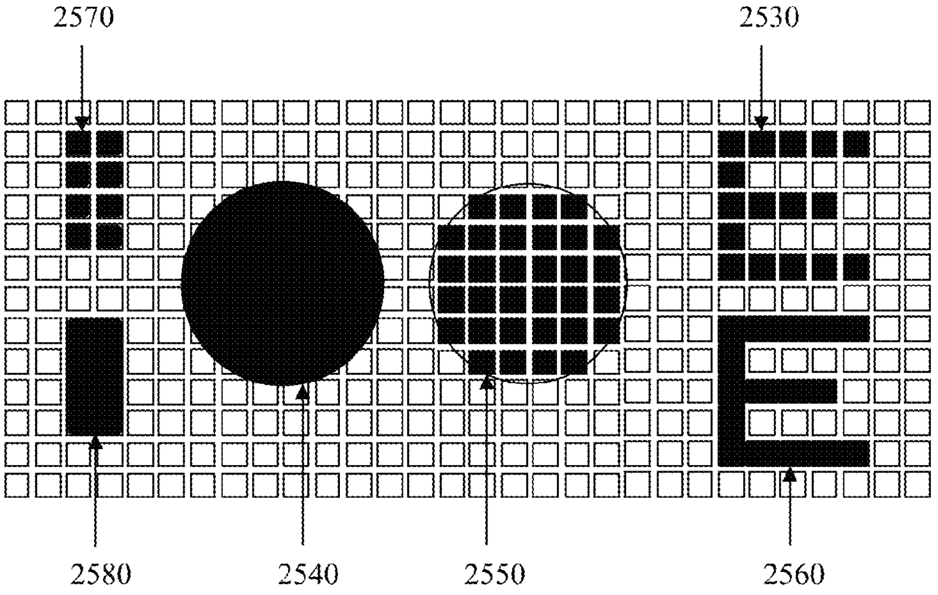
FIG. 25 is the illustration of manipulation droplets to have the dotted and continuous displays under Microelectrode Array Architecture.

Other applications may just need to move the colored-droplets to certain locations to form texts or graphics. One embodiment of the invention is a Microelectrode Array Architecture based display based herein the size and the number of the microelectrode then define the "resolution" of the display. One significant architectural difference between a Microelectrode Array Architecture based display and the conventional display is that the microfluidic droplet-based display can either display the "dots" as discrete dots if necessary but also can form a continuous line or area for better readability. To form a continuous line or area, microelectrodes are grouped into the desired configured-electrode and activated as a group. To form discrete dots, then each dot is moved into the right location individually in a pre-defined manner to prevent the accidental merge. As illustrated in FIG. 25, droplet 2580 is one continuous droplet and it is manipulated by the configured-electrode which is composed of 2×4 microelectrodes. And there are eight discrete droplets 2570 that are formed by 2×4 individual microelectrodes. One continuous circle 2540 is formed by activating a configured-electrode and a dotted circle 2550 are shown in FIG. 25. Also, a continuous "E" 2560 and a dotted "E" 2530 are illustrated. In another embodiment, to prevent the liquid column break up into multiple droplets by hydrodynamic instability, regardless of the structure types (bi-planar, coplanar, or hybrid) a cover plate with small aspect ratio is necessarily implemented for the Microelectrode Array Architecture based displays.

Figure 26A:
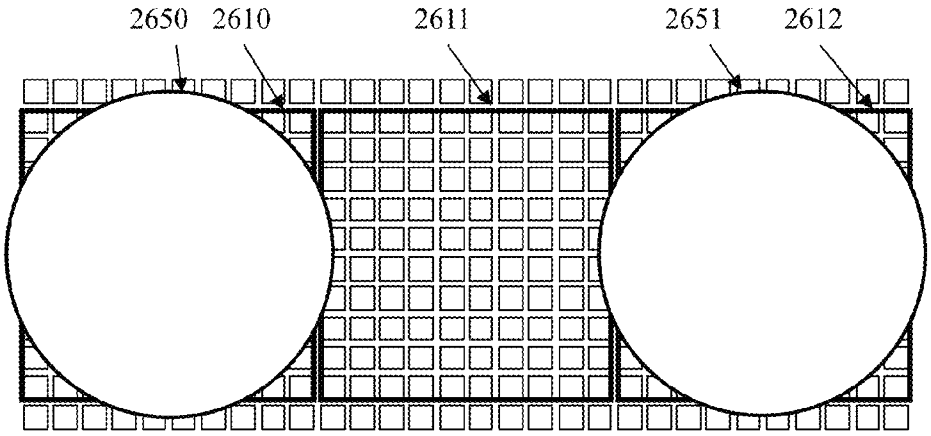
FIGS. 26A and 26B are diagrams showing the basic merger/mixing of FPLOC.
Figure 26B:
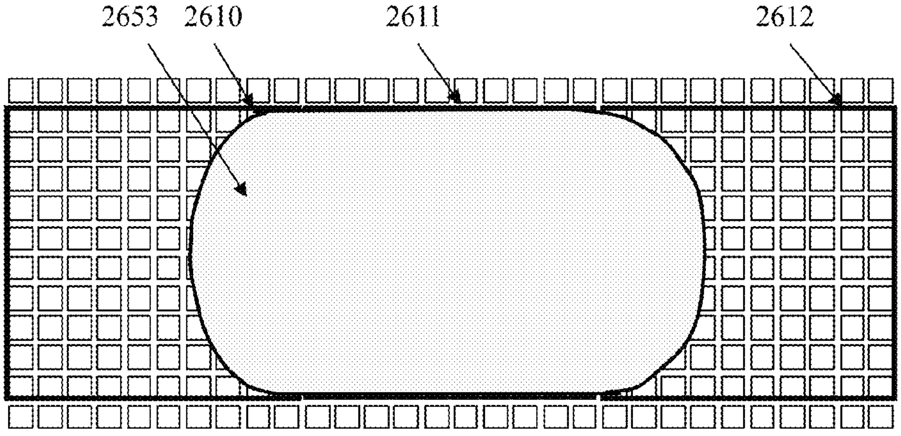

One embodiment of the present invention for performing a basic merge or mixing operation under microelectrode array architecture wherein two droplets 2650 and 2651 are combined into a single droplet 2653 as shown in FIGS. 26A-26B. In the present discussion, the terms merge and mixing have been used interchangeably to denote the combination of two or more droplets. This is because the merging of two droplets does not in all cases directly or immediately result in the complete mixing of the components of the initially separate droplets. In FIG. 26A, two droplets 2650 and 2651 are initially positioned at configured-electrodes 2610 and 2612 and separated by at least one intervening configured-electrode 2611. And both droplets 2650 and 2650 at least have partial overlaps with configured-electrode 2611. As shown in FIG. 26B, the outer two configured-electrodes 2610 and 2612 are deactivated and the central configured-electrode is activated, thereby drawing droplets 2650 and 2651 toward each other across central configured-electrode 2611 and merge into a bigger droplet 2653 as indicated by the arrows in FIG. 26B.

Figure 27A:
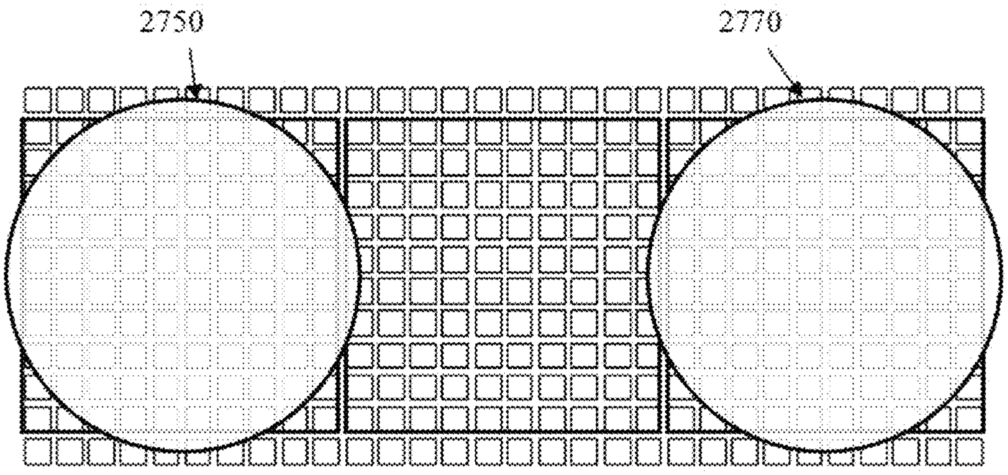
FIGS. 27A, 27B, and 27C are diagrams showing the active mixing procedure of the droplet manipulation by uneven-geometry movement to speed up the mixing.
Figure 27B:
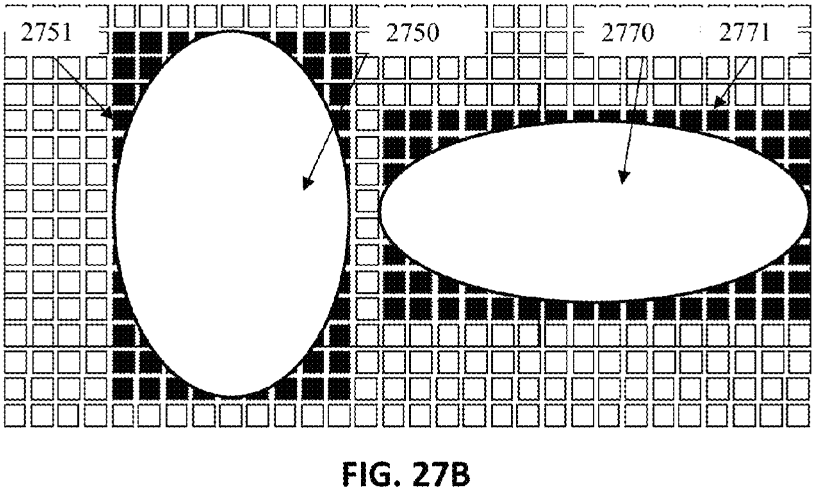
Figure 27C:
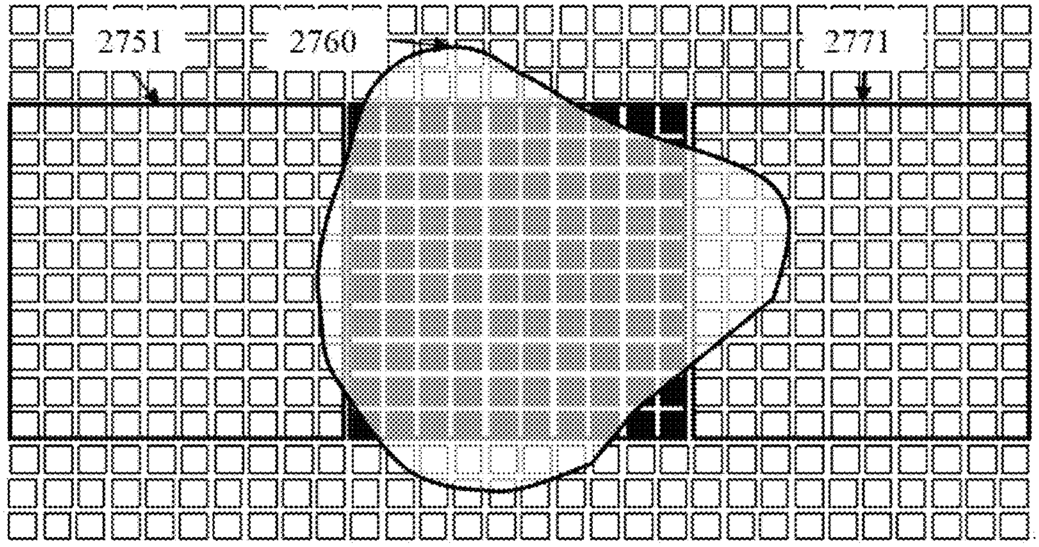

FIGS. 27A-27C illustrate the active mixing procedure of the droplet manipulation by uneven-geometry movement to create turbulent flow under microelectrode array architecture. The droplets 2750, 2770 are deformed by activating the configured-electrodes 2751 and 2771, as indicated in FIG. 27B; therefore to make the droplet 2750 tall and the droplet 2770 fat. The center configured-electrode 2760 then is activated in order to pull the droplets 2750, 2770 into the mixing configured-electrode 2760 (marked in black) as shown in FIG. 27C. In FIG. 27B, the black areas indicate two activated configured-electrodes 2751 and 2771 not only deformed the two droplets 2750 and 2770 but also drew them partially into the center configured-electrode 2760. This interim activating step shown in FIG. 27B also helps a smooth mixing movement of the two droplets. The shapes of the black area and the deformed droplets in FIGS. 27B-27C are for illustration purposes only. In the present invention, such shapes can be any types based on the needs.

Figure 28A:
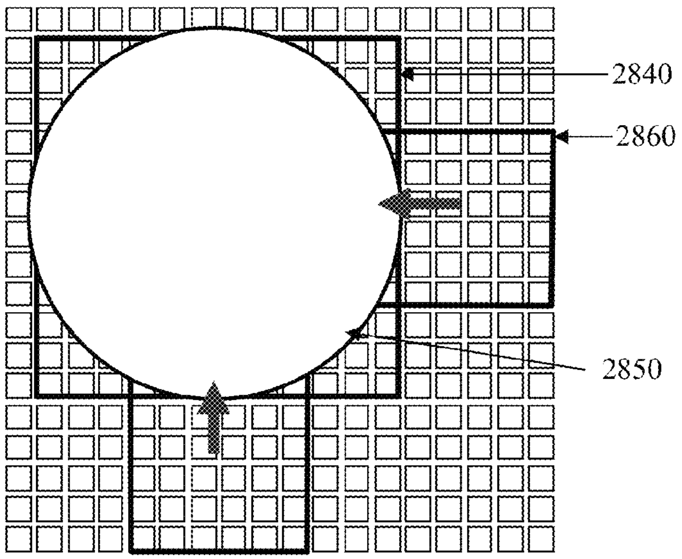
FIGS. 28A and 28B illustrate an uneven back-and-forth mixer for speeding up the droplet mixing.
Figure 28B:
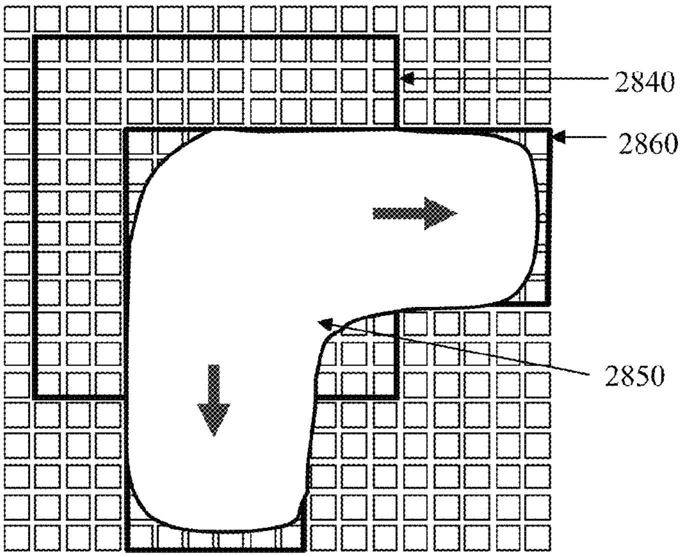

FIGS. 28A and 28B illustrate the microelectrode array mixer for improving the mixing speed. In one embodiment, an uneven back-and-forth mixer can be used to speed up the droplet mixing. This can be done by activating a group of microelectrodes to create an irreversible pattern that breaks the symmetry of the two circulations to improve the speed of mixing. The initial state is illustrated as in FIG. 28A that a droplet 2850 contains both sample and reagent sits on top of configured-electrode 2840. The first step for the uneven back-and-forth mixing is to activate configured-electrode 2860 to deform the droplet 2850 to the direction of the arrows as shown in FIG. 28B. Then configured-electrode 2860 is deactivated and configured-electrode 2840 is activated to pull the droplet back to the original position as indicated in FIG. 28A. The back-and-forth mixing can be done multiple times to achieve the optimized mixing results. Also, the shapes of the configured-electrode 2840 and the deformed droplets in FIGS. 28A and 28B are for illustration purposes only. In the present invention, such shapes can be any types of designs as long as they have the ability to create turbulent flows, or alternatively, the ability to create multilaminates.

Figure 29:
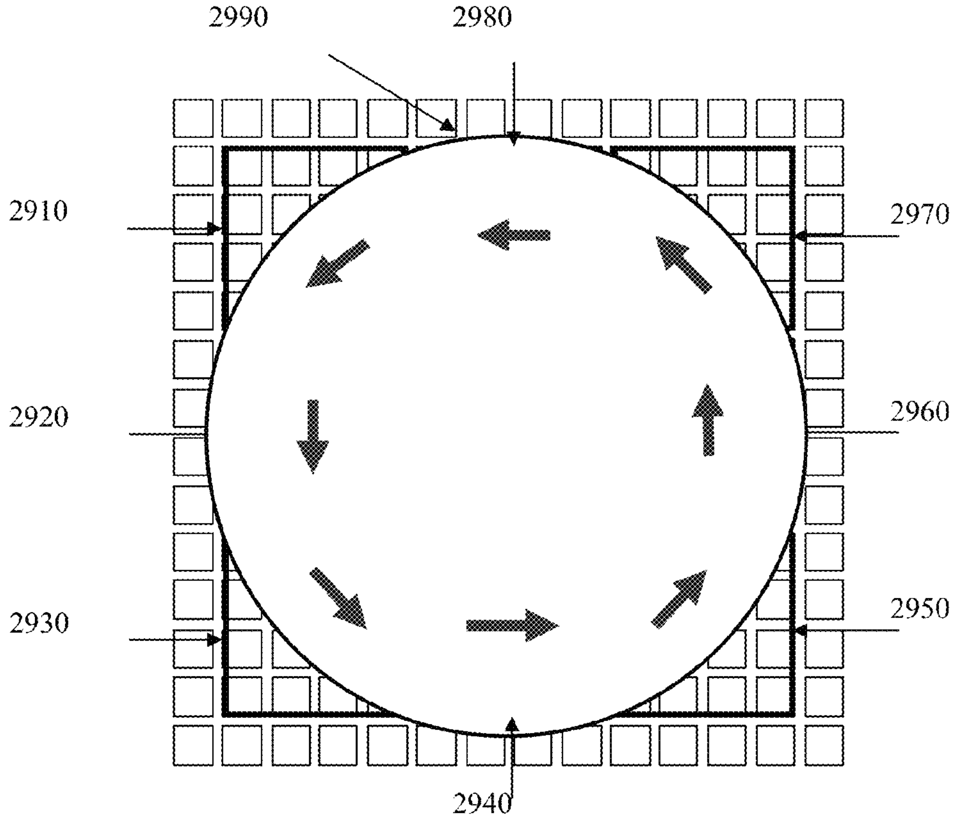
FIG. 29 is a diagram showing the fluidic circular mixer based on the EWOD Microelectrode Array Architecture.

Still in another embodiment of PFLOC droplet based mixing procedure, FIG. 29 illustrates a circular mixer for improving the mixing speed. This can be done by activating a sequence of the smaller groups of microelectrodes to create an irreversible horizontal circulation that breaks the symmetry of the vertical laminar circulation to speed up the mixing. One embodiment, as shown in FIG. 29, is to form eight configured-electrodes (2910, 2920, 2930, 2940, 2950, 2960, 2970 and 2980) that enclose the droplet 2990 and then activate the configured-electrodes one-by-one in sequence and in a circular manner. For example, as the first step, the configured-electrode 2910 is activated for a short period of time to cause surface tension change and to create circulation inside the droplet 2990 toward the configured-electrode 2910. Next, the configured-electrode 2910 is deactivated followed by activating the next adjacent configured-electrode 2920. The circular activating procedure is repeated through entire eight configured-electrodes (2910 to 2980) to create the horizontal circulation inside the droplet 2990. This circulation flow activation can be done multiple times based on the needs. Also, the circulation flow can be done clockwise, counter-clockwise or an alternative mix of the two to achieve the best mixing results. Also, the shapes of the configured-electrodes 2910 to 2980 and the circulation are for illustration purposes only. In the present invention, such circulation mixing can be any types of designs as long as they have the ability to create turbulent flow, or alternatively, the ability to create multilaminates.

Figure 30A:
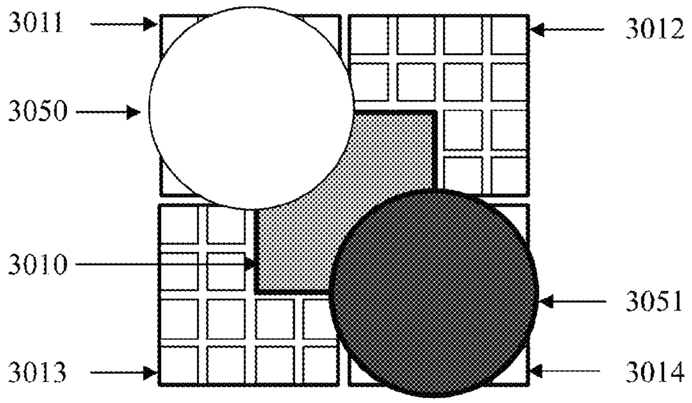
FIGS. 30A-30F are diagrams showing the Multilaminates mixer which is especially effective and useful for low aspect ratio (<1) situation.
Figure 30B:
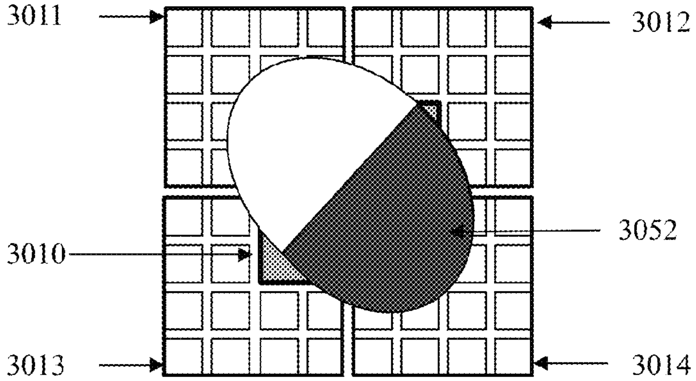
Figure 30C:
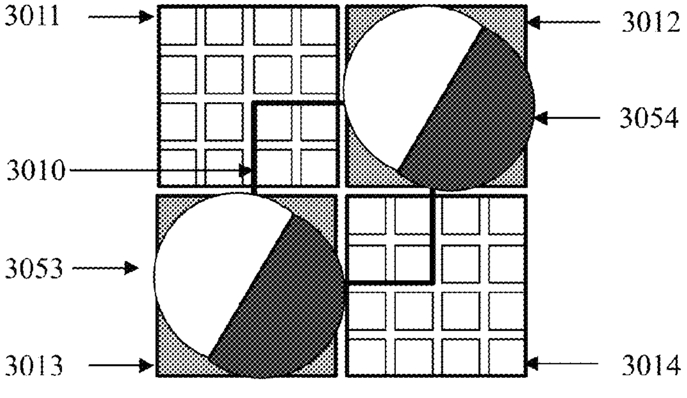
Figure 30D:
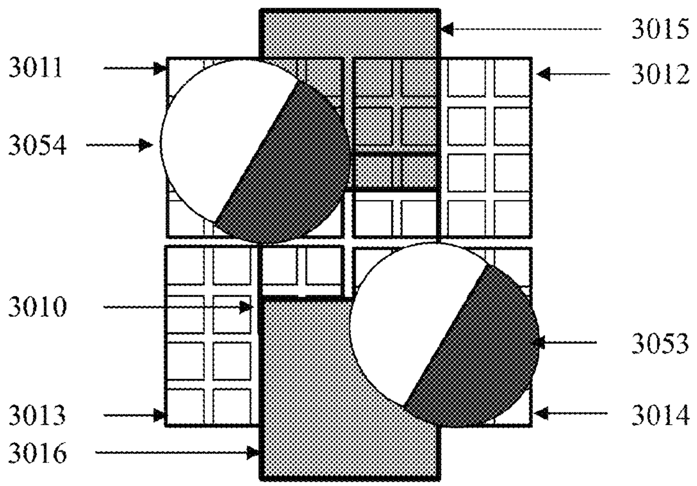
Figure 30E:
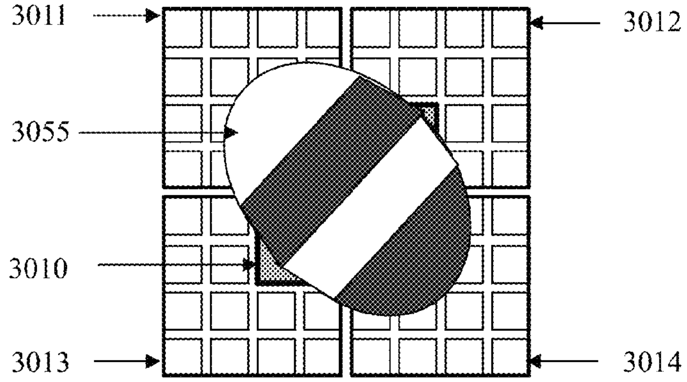
Figure 30F:
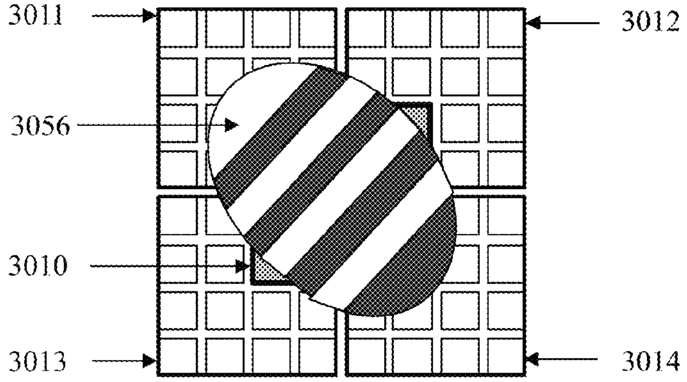

Multilaminates mixer: One embodiment of the invention to have a small footprint (2×2 configured-electrodes) but effective mixer to create multilaminates to speed up the mixing is possible as illustrated in FIGS. 30A-30F. This multilaminates mixer is especially useful for low aspect ratio (<1) situation. Aspect ratio is the ratio of the gap between electrode plate and the ground plate and the dimension of the electrode. Low aspect ratio means more difficult to create turbulent flow inside the droplet and the ability to create multilaminates becomes more important. Diagonal mixing and diagonal cutting are used in this special mixer. In FIG. 30A, the black droplet 3051 at configured-electrode 3014 will be mixed with the white droplet 3050 at configured-electrode 3011. An interim configured-electrode 3010 will be the mix chamber and will be activated to pull in both droplets 3051 and 3050. To start the multilaminates mixing, step one is to merge the two droplets diagonally. The diagonal direction of the droplet merge can be 45 degree or 135 degree but the subsequent step of diagonal cutting needs to be perpendicular to the merge operations. FIG. 30B indicates the 1st merge of droplet 3051 and droplet 3050 into a black-and-white droplet 3052. Because of the low Reynolds number and the low aspect ratio, droplet 3052 has purely diffusion-based static mixing which results in a long mixing time, so the droplet is shown as half white and half black. The second step is to do the diagonal cutting, 90 degree from the starting diagonal mixing, of droplet 3052 as illustrated in FIG. 30C. While the interim configured-electrode 3010 is deactivated, configured-electrodes 3012 and 3012 and other interim configured-electrodes are activated to diagonally cut droplet 3052 into two daughter droplets 3053 and 3054 as shown in FIG. 30C. The details of the diagonal cutting are discussed in previous section. Because of the slow mixing rate, so the two daughter droplets 3053 and 3054 keep the black/white laminates with the same orientation after the diagonal cutting. Then, the 3rd step of the multilaminates mixing is to move the two droplets back onto the starting configured-electrodes to repeat the diagonal mixing and cutting in. FIG. 30D, droplets 3054 is moved from configured-electrode 3012 onto configured-electrode 3011 and droplets 3053 is moved from configured-electrode 3013 onto configured-electrode 3014. Cares are needed to avoid the merge of droplets 3053 and 3054 while they are moving. Simple droplet move manipulations of deactivating configured-electrodes 3012 and 3013 and activating configured-electrodes 3011 and 3014 might cause a physical contact of the two droplets while they are moving and then the two droplets would merge together. So interim configured-electrodes 3015 and 3016 need to be activated first to create the safeguard zone between the two droplets to prevent any accidental merge while they are moving toward their destinations. After droplets 3053 and 3054 are moved into configured-electrodes 3016 and 3015, then it's straight forward to move the two droplets into configured-electrodes 3011 and 3014. Step one to step three can be repeated to create the necessary number of multilaminates to speed up the mixing. FIG. 30E shows four-laminated droplet 3055 as the result of repeating step one to diagonally merge droplets 3053 and 3054 in FIG. 30D into droplet 3055. FIG. 30F illustrates eight-laminated droplet 3056 after being through another cycle of step one to step 3 of the multilaminates mixing.

Also, other embodiments of present invention can broaden microfluidic operations beyond the range of applications in medicine, drug discovery, environmental and food monitoring. For example, droplets formed by the electrodes can be used as virtual chambers either for chemical mixing and reactions, it also can be used as pixels of display or containers of medium of nutrients for tissue cells.

Depending on the application needs, the underlying fabrication technologies for the microelectrodes can be semiconductor, thin film transistor (TFT) array, PCB, plastic or paper based technologies. The sizes of the final products can be small as a nail-sized FPLOC, paper sized Fluidic Micro-Crane system or up to a building sized Field-programmable billboard permanent display. The material can be rigid or flexible and bendable.

Figure 31:
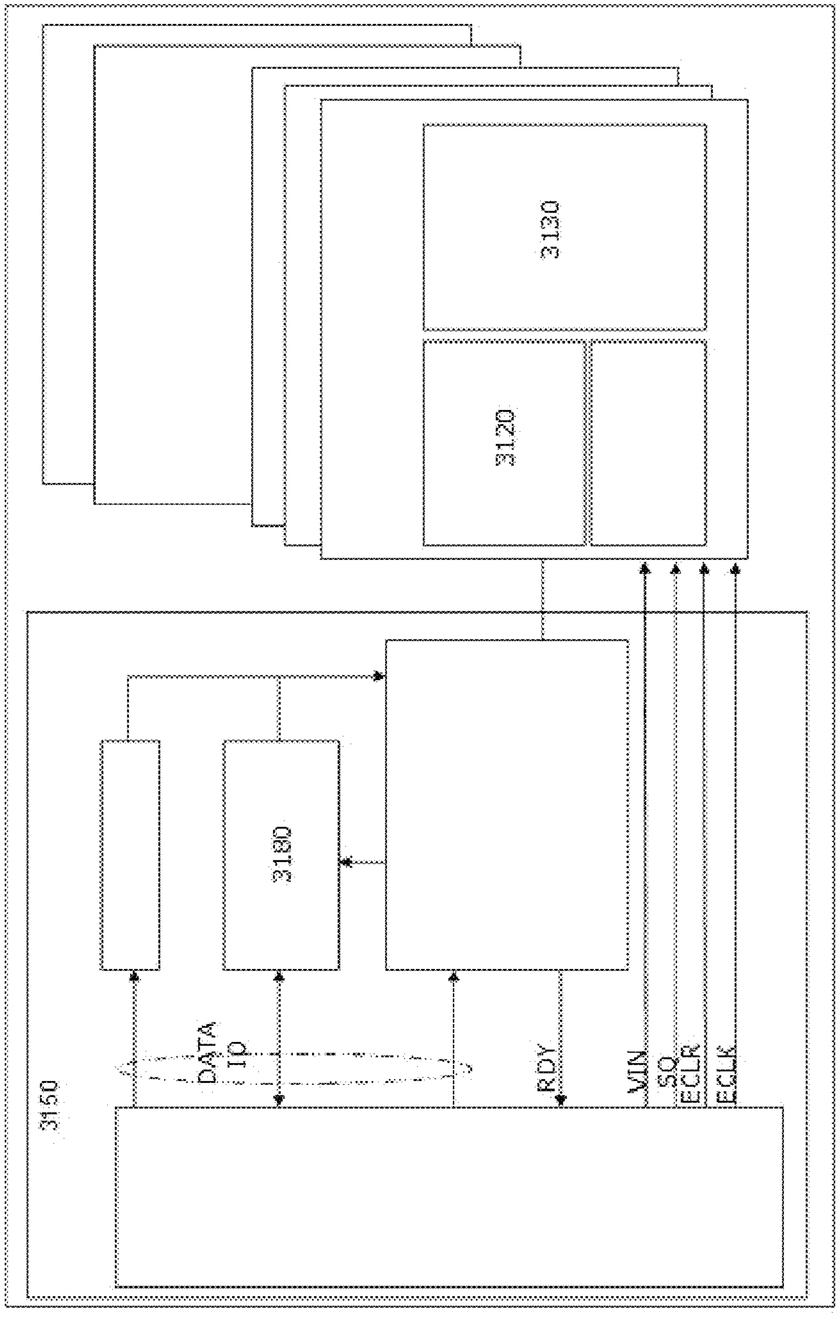
FIG. 31 is the block diagram of fabricating microelectrode array architecture devices by using the standard CMOS fabrication processes.

In one embodiment of fabricating a LOC based on Microelectrode Array Architecture by using the standard CMOS fabrication processes is illustrated as is the block diagram in FIG. 31. The two main blocks of the EWOD Microelectrode Array Architecture are the System Control Block 3150 and the Fluidic Logic Blocks (FLB) 3110. Normally there is only one System Control block 3150 needed for a system but a plurality of FLB 3110 is required based on the applications and the limitation of the fabrication technologies.

The microelectrode array is implemented by the FLBs that are daisy-chained together. The number of FLBs is determined by the applications and mainly the limitation of the fabrication technologies. One FLB is composed of the High-Voltage Driving Microelectrode 3130, one bit Memory Map data 3120 and the Control Circuit 3140. The High-Voltage Driving Microelectrode 3130 is the physical microelectrode that can be activated by applying necessary electrical voltages to cause the EWOD effect to move the droplets. The one-bit Memory Map data 3120 holds the logic value of the activation of the microelectrode that typically a "one" means activation and a "zero" means deactivation of the microelectrode. The Control Circuit 3140 manages the control logics and forms the daisy-chain structure of the FBLs.

The System Control 3150 is composed of four main blocks: Controller 3160, Chip Layout 3170, Droplet Location Map, 3180 and Fluidic Operations Manager 3190. The Controller 3160 is the CPU plus necessary memory spaces, interface circuitries and the software programming capabilities. Depend on the fabrication technologies, the Controller 3160 can be integrated as part of the fabrication or can be an attached external device. The Chip Layout block 3170 is the memory which stores the configured-electrode configuration data and the LOC layout information and data. The Droplet Location Map 3180 reflects the actual locations of the droplets on the LOC. The Fluidic Operations Manager 3190 translates the layout information, the droplet location map and the LOC applications from the controller 3160 into the physical actuations of the droplets by activating a sequence of "configured-electrodes".

Microelectrode Array Architecture can provide the field-programmability that the electrodes and the overall layout of the LOC can be software programmable. A microfluidic device or embedded system is said to be field-programmable or in-place programmable if its firmware (stored in non-volatile memory, such as ROM) can be modified "in the field," without disassembling the device or returning it to its manufacturer. The field-programmability or the software-configuration of LOC is achieved by the System Control 3150 and FLBs 3110. The designs of the shapes and sizes of the electrodes and the LOC layout information and data are stored in non-volatile memory within the Chip Layout block 3170 as illustrated in FIG. 31. The information of activated electrodes including the interim electrodes is stored in non-volatile memory in Droplet Location Map 3180. The soft-configuration data is then delivered to every microelectrode 3130 by the one bit Memory Map data 3120. The grouping, activating, deactivating of a group of microelectrodes are actually performed through the configuration of FLBs 3110. Furthermore, all FLBs 3110 are soft-connectable and physically are in a monolithically integrated way that can be fabricated with standard fabrication technologies.

Figure 32:
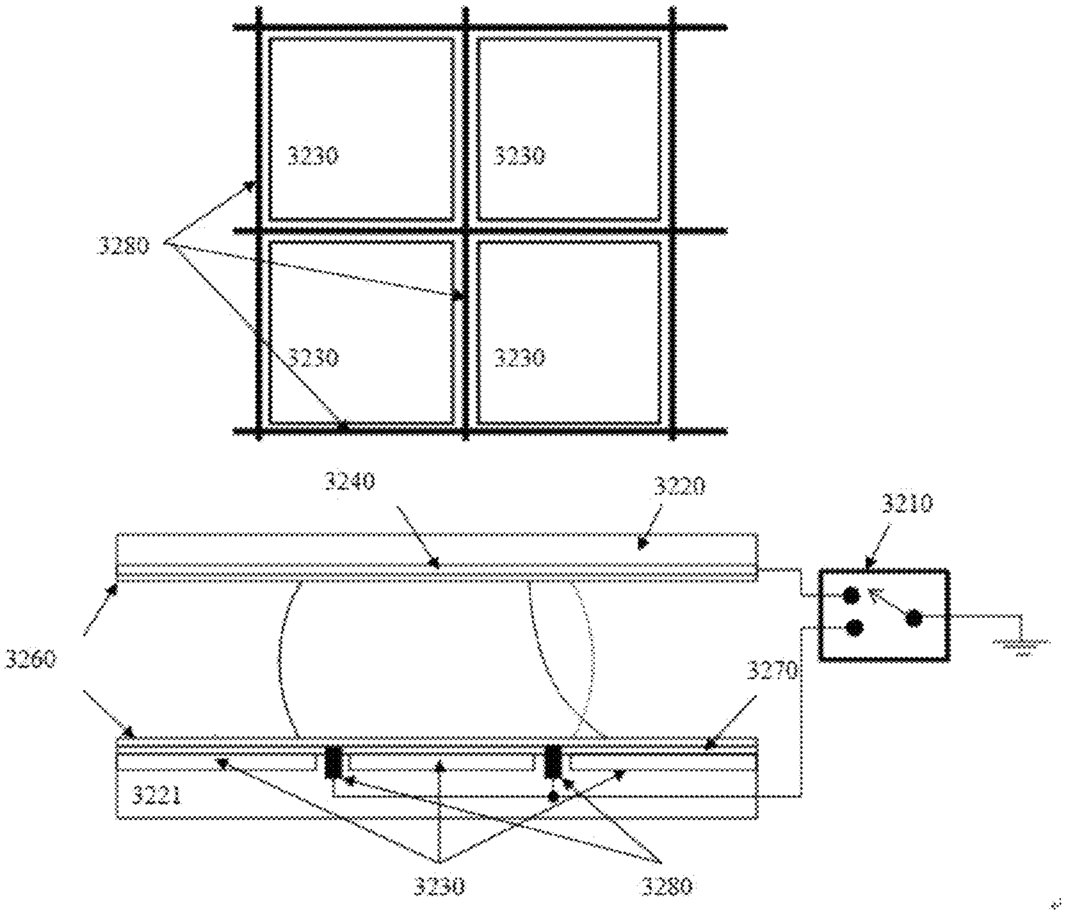
FIG. 32 shows the microelectrode structure for fabrication based on standard CMOS fabrication technologies.

The High-Voltage Driving Microelectrode 3130 in FIG. 31 or physically the "microelectrode" can be implemented in many different structures. In one embodiment, a hybrid structure shown in FIG. 32 is used for The High-Voltage Driving Microelectrode 3130. The hybrid structure composed a microelectrode 3230 and ground grids 3280 on the same plate 3221 as shown in FIG. 32. A top cover plate with continuous ground electrode 3240 and the ground grids 3280 on the electrode plate 3221 are connected to a switch 3210 which is used to choose the structure modes.

Figure 33:
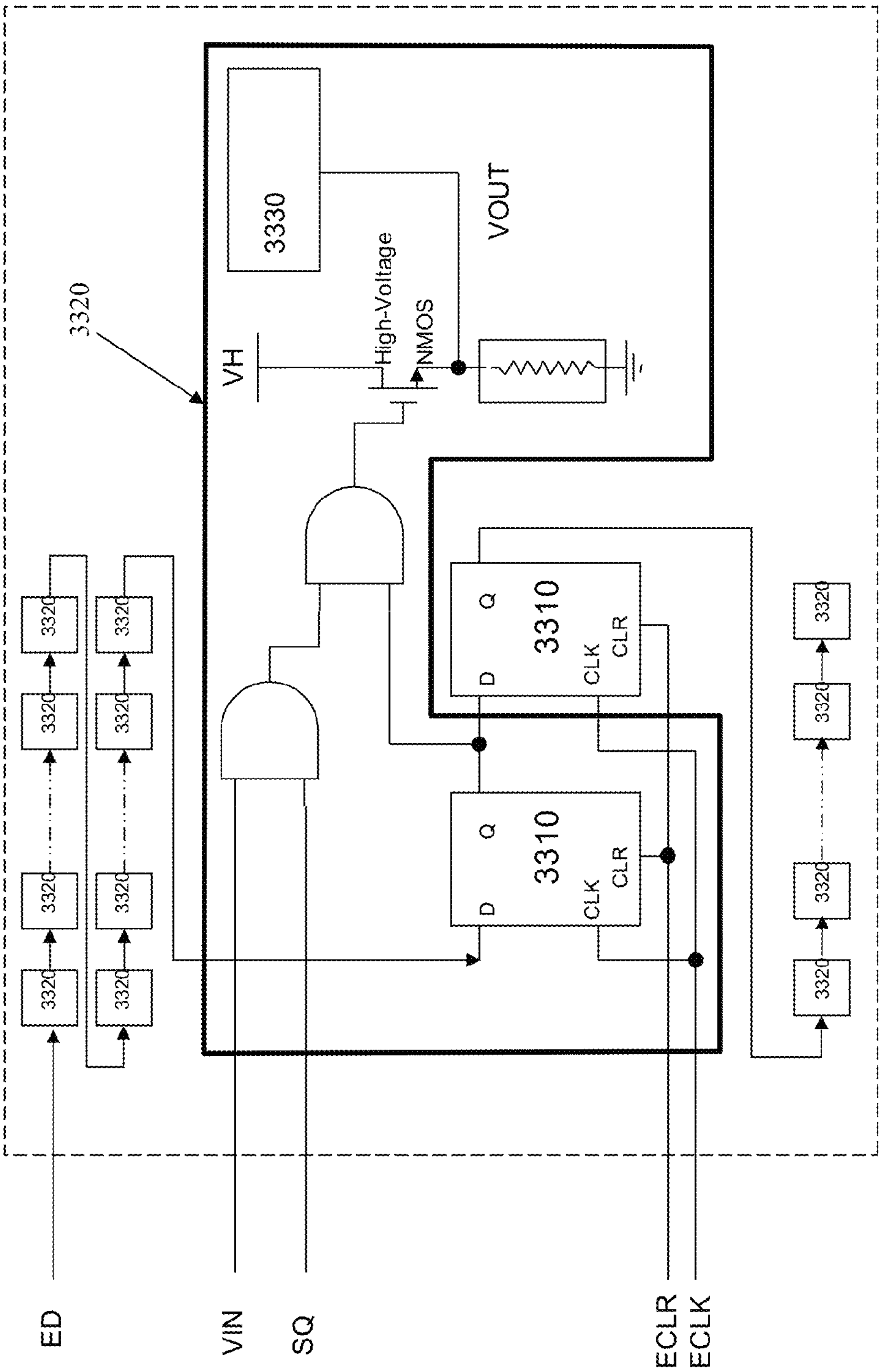
FIG. 33 shows the electrical design of the FLB array based on standard CMOS fabrication technologies.

FIG. 33 shows one embodiment of the electrical design of the FLB array 3300 that composes of many FLBs 3320"s in daisy chain configuration. Daisy chain is a wiring scheme used in electrical engineering. The connection wires are in series and do not form webs or loops. While the size of the microelectrode keeps shrinking and the number of microelectrodes keeps growing, one inevitable challenge for the Microelectrode Array Architecture is the interconnection issue. Without the daisy chain configuration, the interconnections will grow exponentially and will be too complicated to manage to scale the system. By using the daisy chain scheme, it simplifies the connection between each FLB 3320 and the interconnections of FLBs will not grow with the increase number of FLBs and a scalable and cleaner layout design can be achieved. Each FLB 3320 contains a storage device, such as a D flip-flop 3310, that stores the activation information, and the high voltage circuit that activate the microelectrode 3330. When the signal VIN is applied, the microelectrode 3330 would be activated or deactivated depending upon the output value of the flip-flop 3310. The SQ signal controls a square waveform instead of a steady-on DC to the microelectrode. Before activating the microelectrode array, the values of the flip-flop 3320 are loaded through clocking in the data signal ED. The one-bit storage device, such as a D flip-flop 1410, can also be other flip-flop design or other data storage application.

Figure 34:
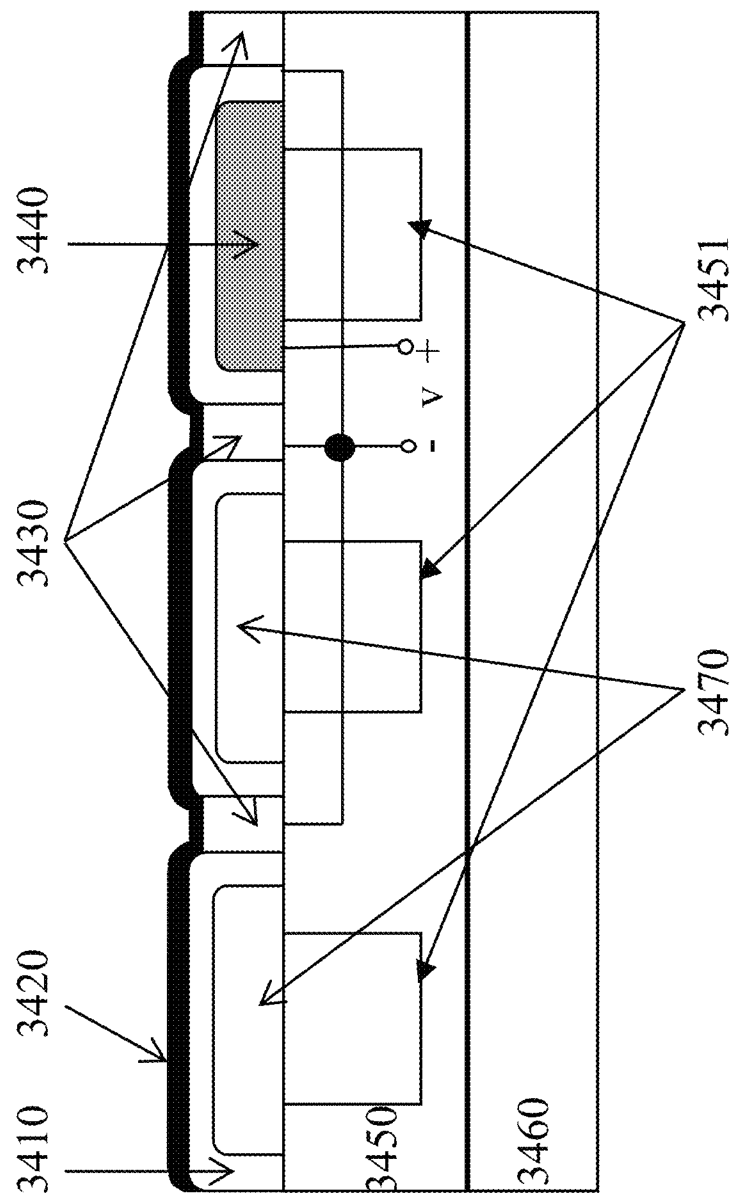
FIG. 34 shows the cross section of the FLB array fabrication based on standard CMOS fabrication technologies.

FIG. 34 shows the cross section of the FLB array fabrication. In one embodiment, there are three metal layers and one poly layer used. The bottom layer is the substrate 3460, and the layer above it is the control circuit layer 3450. The control circuit, flip-flop, and high-voltage driver are all contained in the area of 3451 which is directly beneath the microelectrode 3440 and 3470. The metal-3 layer is used to do the microelectrodes 3440 and 3470 and the ground lines 3430. The top view of this electrodes and ground lines structure is illustrated as FIG. 5A. An activated microelectrode 3440 is applied with an electrical voltage, and microelectrodes 3470"s are inactive. On top of the microelectrodes is the dielectric layer 3410. In this embodiment, the ground lines 3430 are not covered by the dielectric layer 3410 to reduce the necessary activate electrical voltage. On the very top, there is a coated hydrophobic film 3420 to decrease the wettability of the surface. If viewing from the top, one can only see an array of microelectrodes without any visibility of circuits that are hidden under the microelectrodes. This self-contained microelectrode structure is the key to have the great scalability in the fabrication of FLBs.

Figure 35A:
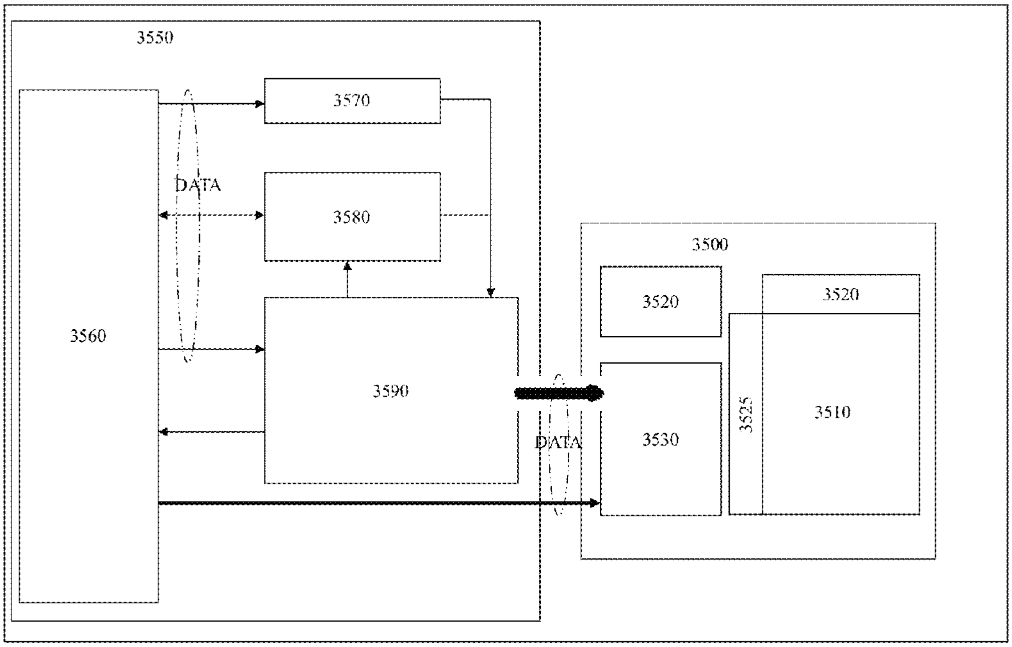
FIG. 35A is the block diagram of fabricating microelectrode array architecture devices by using the thin film transistor (TFT) array fabrication processes.

In another embodiment of fabricating a LOC based on Microelectrode Array Architecture by using the thin film transistor (TFT) array fabrication processes is illustrated as is the block diagram in FIG. 35A. The two main blocks of the Microelectrode Array Architecture are the System Control Block 3550 and the Active-Matrix Block (AMB) 3500. The System Control Block 3550 is composed of four main blocks: Controller 3560, Chip Layout 3570, Droplet Location Map, 3580 and Fluidic Operations Manager 3590. The Controller 3560 is the CPU plus necessary memory spaces, interface circuitries and the software programming capabilities. The Chip Layout block 3570 is the memory which stores the configured-electrode configuration data and the LOC layout information and data. The Droplet Location Map 3580 reflects the actual locations of the droplets on the LOC. The Fluidic Operations Manager 3590 translates the layout information, the droplet location map and the LOC applications from the controller 3560 into the physical actuations of the droplets by activating a sequence of "configured-electrodes".

In one embodiment, the field-programmability or the software-configuration of LOC is achieved by the System Control 3550. The designs of the shapes and sizes of the electrodes and the LOC layout information and data are stored in non-volatile memory within the Chip Layout block 3570 as illustrated in FIG. 35A. The information of activated electrodes including the interim electrodes is stored in non-volatile memory in Droplet Location Map 3580. The soft-configuration data is then delivered to every microelectrode 3530 by the one bit Memory Map data 3520. The data of grouping, activating, deactivating of configured-electrodes then are sent to Active-Matrix Block (AMB) 3500 in a "frame-by-frame" manner.

Figure 35B:
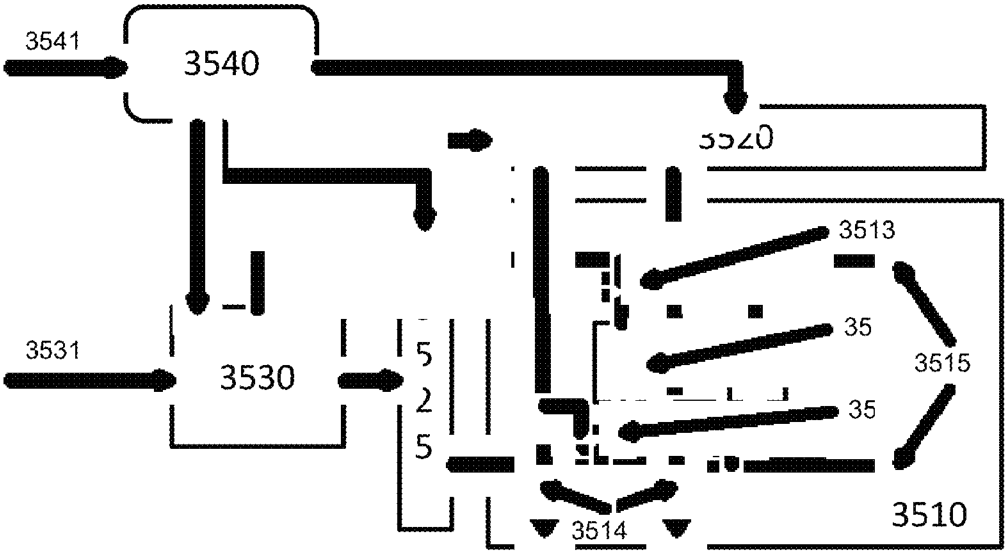
FIG. 35B is the illustration of the block diagram of Active-Matrix Block (AMB).

In another embodiment, AMB 3500 is composed of five main blocks: Active-Matrix Panel 3510, Source Driver 3520, Gate Driver 3525, DC/DC Converter 3540 and AM Controller 3530 as shown in FIG. 35A. In Active-Matrix Panel 3510, the gate bus-line 3515 and source bus-line 3514 are used on a shared basis, but each microelectrode 3512 is individually addressable by selecting the appropriate two contact pads at the ends of the rows and columns as shown in FIG. 35B. The switching devices use transistors made of deposited thin films, which are therefore called thin-film transistors (TFTs) 3511. The TFT-array substrate contains the TFTs 3511, storage capacitors 3513, microelectrodes 3512, and interconnect wiring 3514 and 3515. A set of bonding pads are fabricated on each end of the gate bus-lines 3515 and data-signal bus-lines 3514 to attach Source Driver IC 3520 and Gate Driver IC. AM Controller 3530 using the data 3531 from System Control 3550 and to drive the TFT-array by a driving circuit unit consisting of a set of LCD driving IC (LDI) chips 3520 and 3525. DC power 3541 applied to DC/DC Converter 3540 which applies a positive pulse to a gate electrode through a gate bus-line 3515 to turn the TFT on. The storage capacitor is charged and the voltage level on the microelectrode 3512 rises to the voltage level applied to the source bus-line 3514. The main function of the storage capacitor 3513 is to maintain the voltage on the microelectrode until the next signal voltage is applied.

Figure 35C:
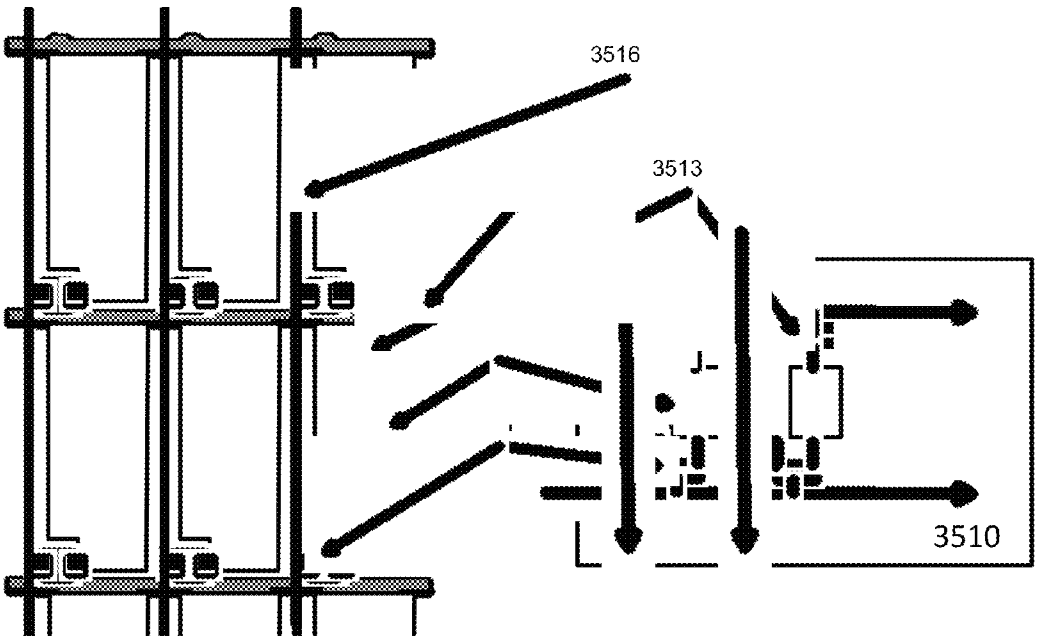
FIG. 35C is the top view of a TFT-array based microelectrode array.

In one embodiment, the top view of a TFT-array based microelectrode array is illustrated in FIG. 35C. Microelectrodes 3512, TFTs 3511, and storage capacitors 3513 are shown in a typical TFT LCD layout. In another embodiment, a hexagon TFT-array layout as shown in FIG. 4B is implemented to reduce the impact from the relatively big gaps 3516 among adjacent microelectrodes.

Figure 35D:
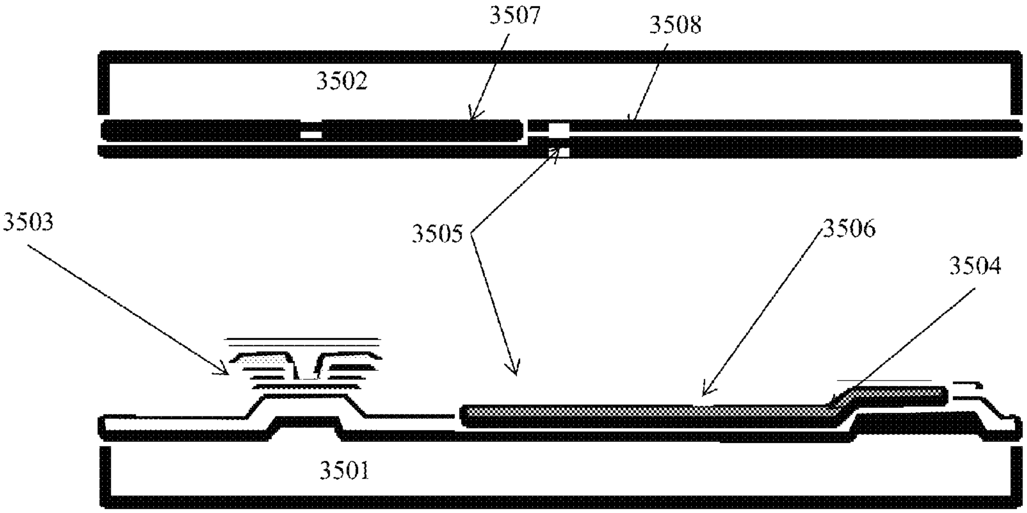
FIG. 35D is the illustration the cross section view of microelectrode array architecture device fabrication based on the TFT technology in a bi-planar structure.

In another embodiment, a microelectrode array based on the TFT technology is in a bi-planar structure as shown in FIG. 35D. TFT 3503 is fabricated on the glass substrate 3501 with microelectrode 3504 and a dielectric insulator 3506 coated with a hydrophobic film 3505 is added to decrease the wettability of the surface and to add capacitance between the droplet and the microelectrode. On the top plate 3502, besides the continuous ground electrode 3508 coated with a hydrophobic film 3505 a black matrix (BM) 3507 made of an opaque metal which shields the a-Si TFTs from stray light might be needed.

Figure 36:
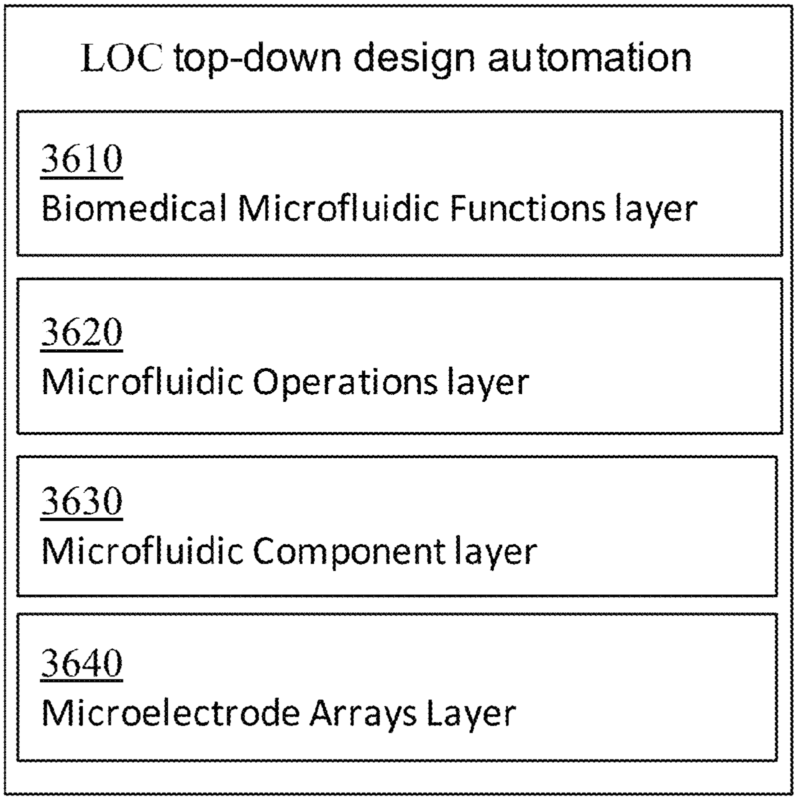
FIG. 36 is the block diagram of the hierarchical system structure of the microelectrode array architecture.

Hierarchically, microelectrode arrays form the foundation of building the entire LOC functions as indicated in FIG. 36. A hierarchical system structure of the microelectrode array architecture starts from the Biomedical Microfluidic Functions layer 3610. At this layer, application-level functions and the purposes of the LOCs are defined. For example, one LOC could just do one function such as glucose reading or multiple analyses such as a 12-in-1 Drug-of-Abuse check. Microfluidic Operations layer 3620 is one level down layer that controls and manages the microfluidic operations such as transportation, mixing, and detection. After the biomedical microfluidic functions have been defined then architectural-level synthesis is used to provide the microfluidic functions to LOC resources and to map the microfluidic functions to the time steps. Ideally, both Biomedical Microfluidic Functions layer and Microfluidic Operations layer are a methodology of design abstraction, whereby a low-level microelectrode configuration and layout is encapsulated into an abstract microfluidic representation (such as "Diagonal Cutting" or "Precise Cutting"). Along with microfluidics advances, this top-down methodology will be responsible for allowing designers to scale digital microfluidic system from comparatively simple single-function LOCs, to complex multi-function LOCs. At the Microfluidic Component layer 3630, geometry-level synthesis creates a physical representation of the final layout of the LOC at the geometrical level. The final layout includes the locations of all microfluidic components, the shapes and sizes of the microfluidic components. A key problem in the geometry-level synthesis of LOCs is the placement of microfluidic modules such as different types of mixers and reservoirs. This issue can be managed much easier with the FLB of the Microelectrode Array architecture because all microfluidic components (configured-electrodes) are composed of the same basic FLBs. Also with the standard component FLB, the determination of accurate and efficient design rules for the physical verification of digital microfluidic LOCs is more achievable. In one embodiment, FLB is amenable to the well established high-voltage CMOS fabrication technologies that microfluidic components can be integrated with microelectronic components monolithically. Microelectrode Arrays Layer 3640 managed the library, 2-D layout, 3-D geometrical modeling, physical-level simulation and physical verification of the chip either a LOC or a next-generation system-on-chip (SOC) with the integration of microfluidics and microelectronics.

There are many embodiments in at least three major application categories by using Microelectrode Array Architecture: (1) Field-programmable Lab-on-a-chip (LOC), (2) Field-programmable Permanent Display and (3) Fluidic Micro-Crane system.

Figure 37A:
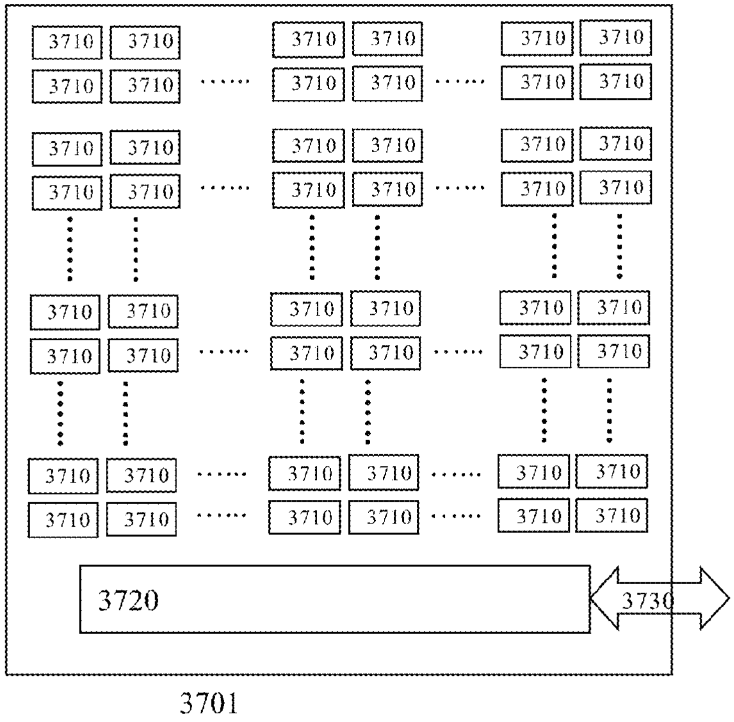
FIG. 37A shows a blank microelectrode array architecture device before any programming or configuration.
Figure 37B:
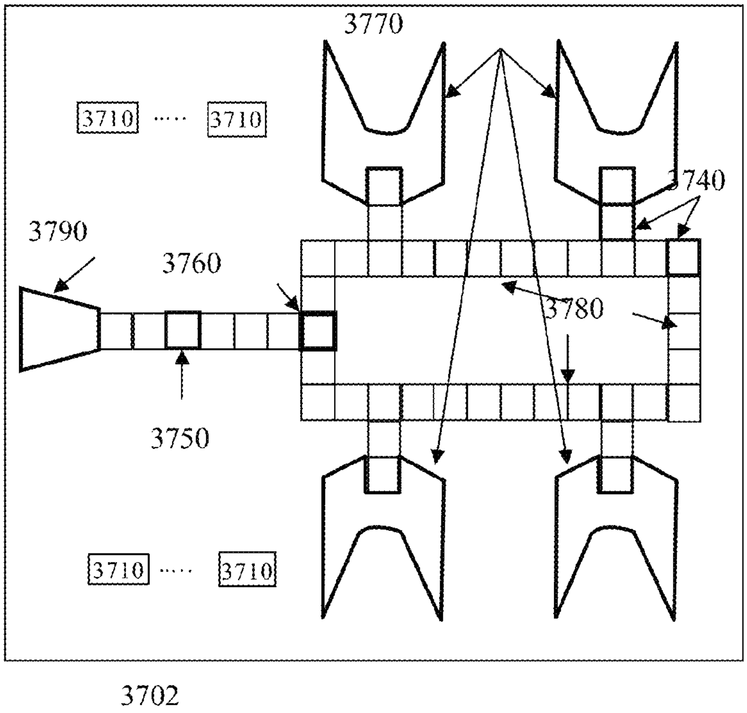
FIG. 37B illustrates an example of a configured-LOC design based on microelectrode array architecture.

FIGS. 37A and 37B illustrate one embodiment of a Field-Programmable Lab-on-Chip (FPLOC) and how to design an application from it. Before any programming or configuration, a blank FPLOC 3701 can be illustrated and shown in FIG. 37A. This blank FPLOC 3701 comprises the array of a plurality of FLBs 3710, the FPLOC System Control 3720, and the I/O Interface 3730. In one embodiment of the present invention, the number of I/O Interface 3730 can be singular or plural according to the design needs. In another embodiment, the location of placement of the I/O Interface 3730 and the FPLOC System Control 3720 can be placed under the array of FLBs 3710 or next to the array of FLBs 3710 on the same chip (as shown in FIG. 37A). The FPLOC System Control 3720 provides the system partition, configuration, control, management and other system related functions. The I/O Interface 3730 provides the functions of connection between FPLOC and external devices for programming the chip, displaying the test results, calibration, and data management. In another embodiment, the I/O Interface 3730 can also provide the connection to the printer, USB memory storage devices, or network interface. The I/O Interface 3730 also provides the passage for necessary power source to power the FPLOC.

The first design step (or the lowest-level work) for designing the FPLOC is to do the field programming of physical locations, sizes, and shapes of all microfluidic components such as reservoirs, mixing areas, detection areas, and transportation paths and the overall layout of the FPLOC. FIG. 37B illustrates one embodiment that a blank FPLOC 3701 is programmed to implement a configured-LOC design 3702. This configured-LOC 3702 has microfluidic components including the electrodes 3740 and reservoirs 3770, the waste reservoir 3790, mixing chamber 3760, detection window 3750 and transportation path 3780 consist of electrodes that connect different areas of the FPLOC. After the layout design of the FPLOC, there are also some unused microelectrodes 3710 in FIG. 37B. The second step of designing a FPLOC is to define microfluidic operations for the chip. Basic fluidic operations include: the creation of droplet, transportation, cutting and mixing. There are more advanced fluidic operations can be done as discussed in previous sections based on the Microelectrode Array Architecture. Designers of the FPLOC can choose to use the fundamental building blocks FLBs to build the entire FPLOC including the fluidic operations. But to bring the convenience to the designers and to be able to scale up the design of FPLOC, an application level representation for the microfluidic operations is highly desirable.

Figure 38A:
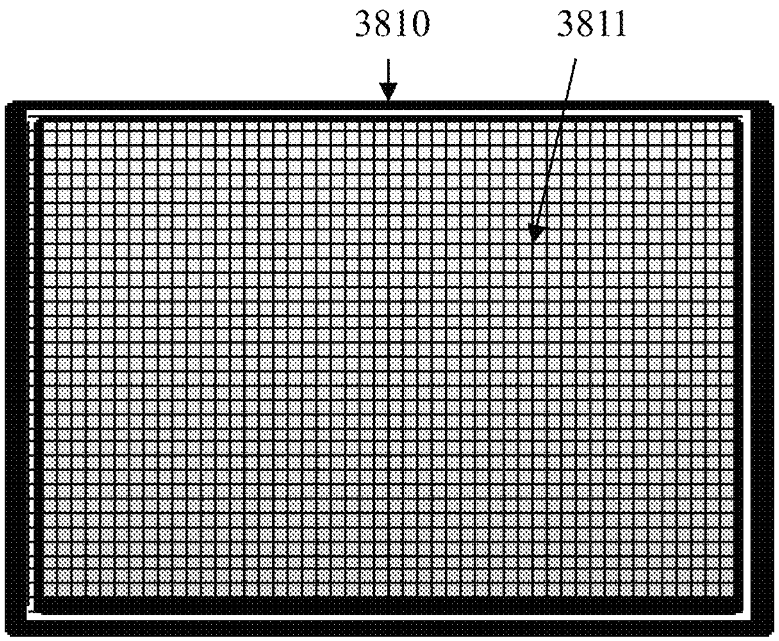
FIGS. 38*a* and 38B are illustrations of a Field-programmable Permanent Display based on Microelectrode Array architecture.
Figure 38B:
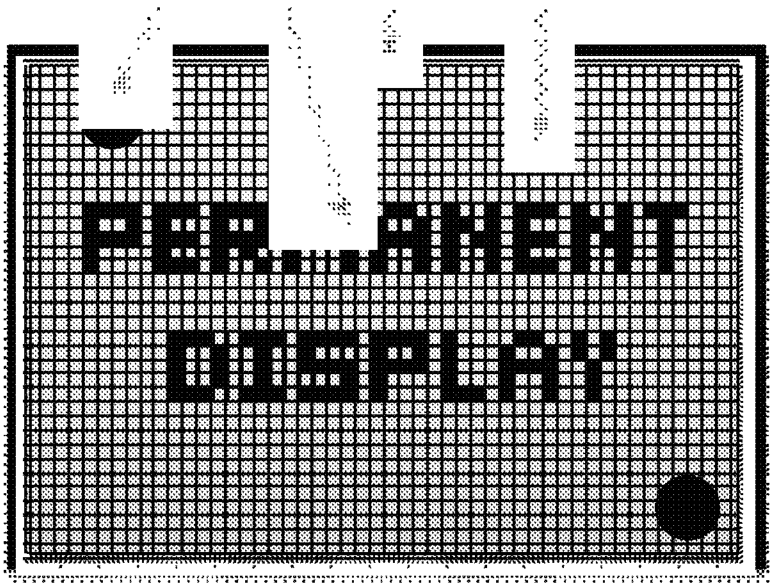
Figure 38C:
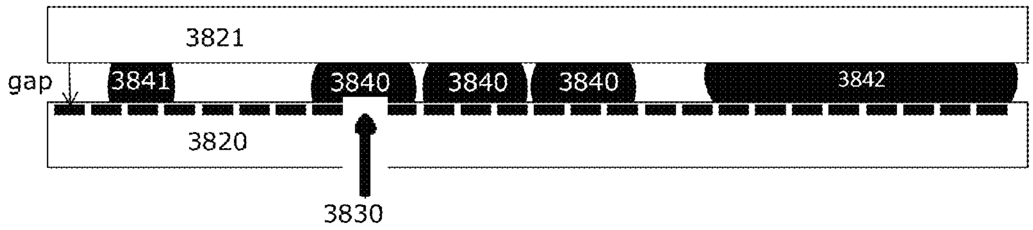
FIGS. 38C and 38D are the cross section views of rigid and bendable Field-programmable Permanent Displays.
Figure 38D:
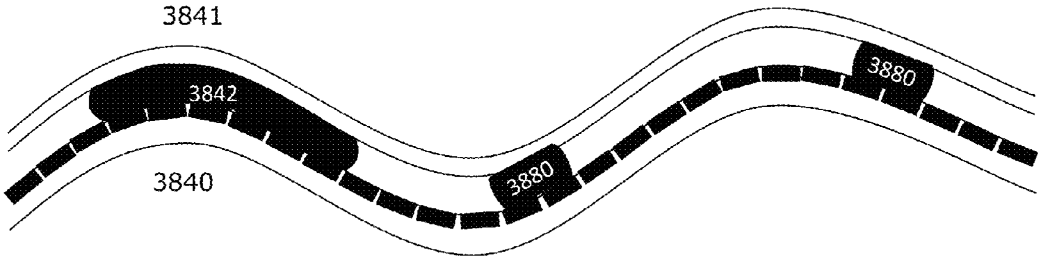

FIGS. 38A-38E illustrate embodiments of the Field-programmable Permanent Display. FIG. 38A indicates one embodiment of Microelectrode Array Architecture based flat display that black ink (or visible died droplets) frame 3810 is stored at the edge of the device and empty microelectrodes 3811 show no text or graphic. In FIG. 38B, droplets created from the black ink frame are transported into positions to display circles 3812 and text characters 3813. Empty microelectrodes 3815 are the background and the amount of ink 3814 is less than 3810 in FIG. 38A. To turn off the display, all droplets are moved back to the ink frame as shown in 38A. FIG. 38C illustrates the side-view of the display. The top cover 3821 typically is a strong transparent plastic. The microelectrode array 3830 is fabricated on the electrode plate 3820. A droplet 3841 is sandwiched between the plates. A group of droplets 3840 form a dotted-line with discrete dots. Droplet 3842 form a continuous line. The forming of a continuous lines or areas has visual advantage than the dotted forms and it's a differentiation of the invention. When the Microelectrode Array based permanent display is fabricated by flexible material and technologies, then the display will be bendable. In one embodiment of the invention, FIG. 38D indicates a bendable display. Droplet 3870 is a line or area and droplet 3880 is a dot.

In one embodiment of the invention, no power will be needed for keep displaying the text or graphics on the Microelectrode Array architecture. When the droplets are moved into the right locations for texts or graphics, the power to activate the moves of droplets can be turned off and the droplets will be sandwiched between the top and bottom plates. Because the droplets are small enough and the gap between the top and the bottom plates is very small, typically around 70 μm or less, these droplets will be trapped at the precise locations permanently if the system is sealed and the filler medium like silicon oil is used to prevent evaporations of the droplets. It will be very difficult to move these trapped droplets by outside physical forces like gravity or normal reading/moving activities. The biggest advantage of the Field-programmable Permanent Display is that it needs no power to keep the display.

In one embodiment of the invention, droplet based microactuators use the Field-programmable Permanent Display technique to display the test results or other important messages as illustrated in FIGS. 38A and 38B. In FIG. 38A, the display ink is not touched when the system is performing other microfluidic operations by activating or deactivating electrodes 3811. After the test or targeted microfluidic operations are done, then droplets created from the black ink (or other color and liquid) frame 3814 in FIG. 38B are moved into the right locations to display graphics or texts. Two advantages of this embodiment: (1) almost no extra cost for displaying the test results or other massages because the electrodes for test or other microfluidic operations are used as the display pixels, and (2) the display is permanent even if the power is cut off from the microactuators, so it can be used as a test records. In another embodiment of the invention, not only Microelectrode Array architecture based FP Permanent Display technique is used for this test result display purpose, all droplet based microactuators with a transparent cover can be also used to double up the test electrodes and display electrodes to display messages or test results.

Figure 39A:
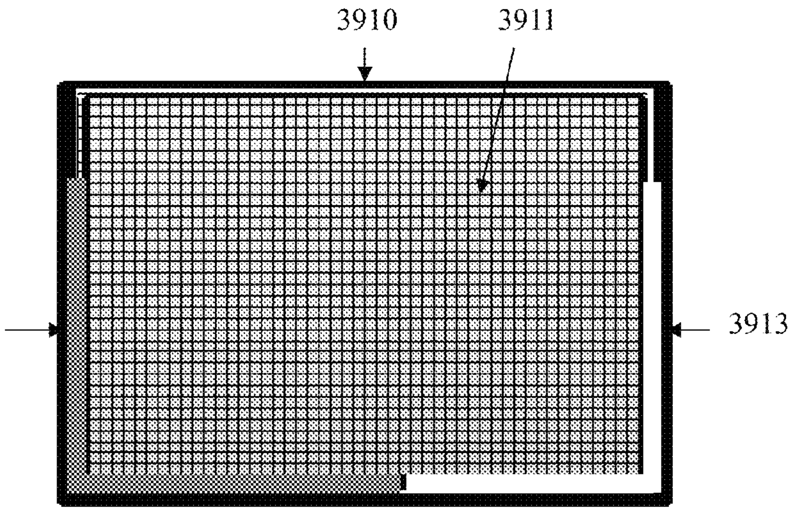
FIGS. 39A and 39B are illustrations of a mixing-color-beads Field-programmable Permanent Display based on Microelectrode Array architecture.
Figure 39B:
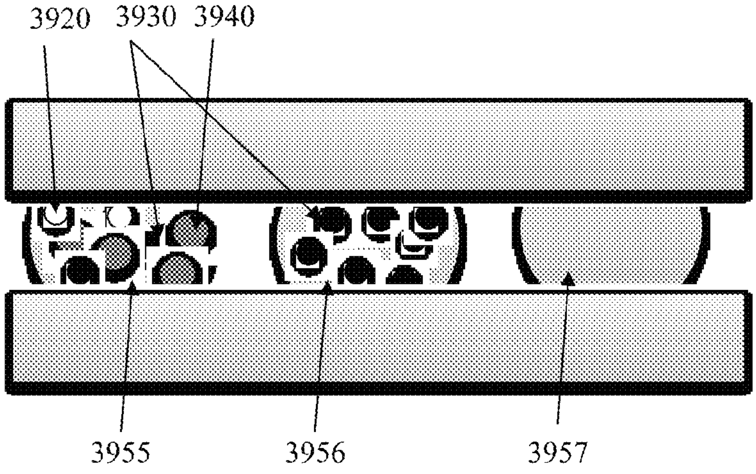
Figure 39C:
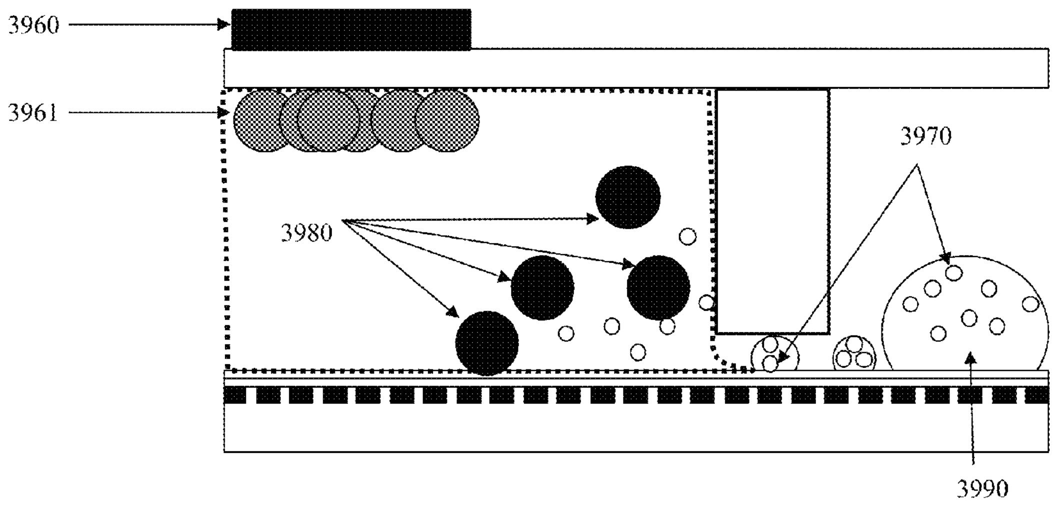
FIG. 39C is the illustration of the sorting of color beads by magnetic force and the different sizes of the color beads.

Droplets can be dyed or colored by other means to display colors for the Field-programmable Permanent Display. In one embodiment of the invention, three primary colors: red, green, and blue beads are added to transparent liquid droplets to show different colors. Mixing of different color beads can create unlimited colors for the droplets. FIG. 39A shows three different frame positions for storing different color-bead liquid: 3910 for red beads, 3913 for green beads and 3912 for blue beads. FIG. 39B illustrates different color beads (red 3930, green 3920, and blue 3940) are mixed to show the mixed color. Droplet 3956 only has red bead and also droplet 3957 has no color beads in it. Many particle sorting technologies are available to separate beads either by sizes, magnetic forces or shapes. FIG. 39C shows one embodiment of using a combination of the magnetic force and the sizes to sort out three different color beads back to their frame positions. Magnet 3960 pulls and separates magnetic blue beads to the top wall. While green color beads 3970 are moved through a channel that bigger red beads 3980 can't go through. The combination of different color beads and the separation of the beads can make the Field-programmable Permanent Display technology display colors.

Figure 40:
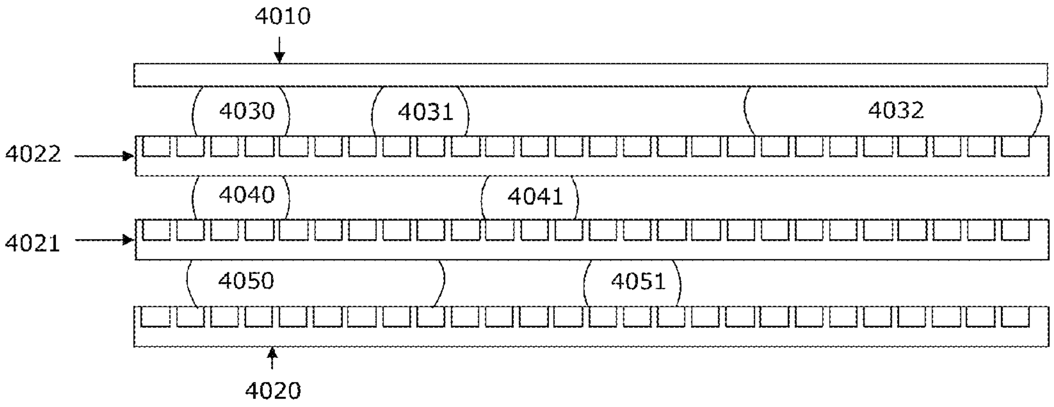
FIG. 40 is the illustration of a stacked multiple layers of single-colored Field-programmable Permanent Display to form a color display.
Figure 41:
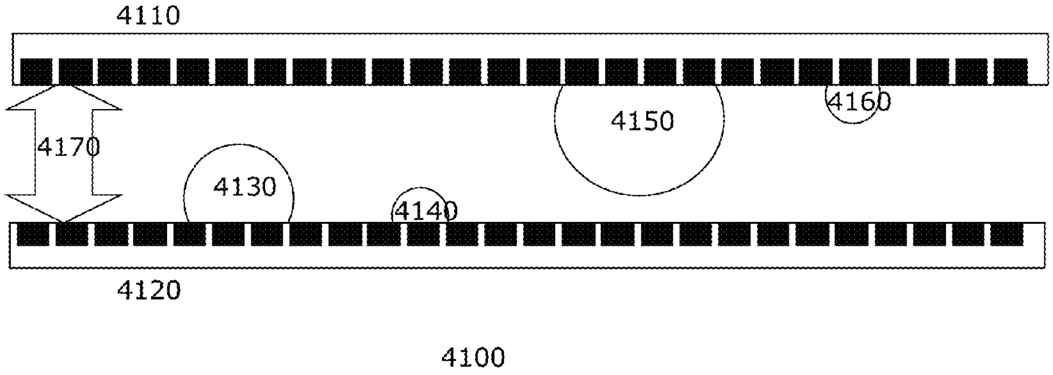
FIG. 41 shows the 3-dimensional Fluidic Micro-Crane system.

FIG. 40 illustrates another embodiment to display colors for the Field-programmable Permanent Display. Multiple layers of coplanar microelectrodes 4020, 4021 and 4022 are stacked together and each microelectrode plate contains different color droplets. As long as the microelectrode plates are made from transparent thin films and the gaps are small, the colors can be seen from the top clearly. The droplets 4030, 4040 and 4050 can be stacked up or the droplets 4031, 4041 and 4051 can be viewed separately, depending on the display requirements. Droplet 4032 is an illustration of a continuous color presentation.

In one embodiment, the Microelectrode Array Architecture expands the two-dimensional conventional architecture into a three-dimensional architecture. As illustrated in FIG. 22, a coplanar microelectrode array 2220 is designed as the bottom plate and another coplanar microelectrode array 2210 is designed as the top plate. The coplanar structure of the microelectrode array plus the flexible gap adjustment 2270 forms a three-dimensional microfluidic delivery system. This three-dimensional delivery system is especially useful when the access to the locations on one of the plates is blocked or unwanted contaminations may happen while using only one plate for transport droplets. Another advantage of the three-dimensional architecture is that a layer-by-layer construction of a three-dimension models or tissues will be possible.

FIG. 22 shows one embodiment of the Fluidic Micro-Crane system 2200. The surface tension of the small droplets in the nano to micro liter range is very significant that the gravity force has very little effect, so the Fluidic Micro-Crane system delivery plates can be in any orientations, upward 2220, and downward 2210 or sideway in any angle. Typically, two delivery plates 2210 and 2220 will be required to form a Fluidic Micro-Crane system. Droplets are the virtual chambers of chemical reactions or containers for medium of nutrients for tissues. Different sized and shaped droplets are illustrated in FIG. 22. Drop 2240 on the bottom delivery plate is a minimum droplet that is manipulated by a single electrode. A single electrode in this case could be a configured-group-of-microelectrodes or a microelectrode. The size of the electrode should be configured accordingly based on the application needs. Droplet 2260 shows the same minimum droplet hangs on the top delivery plate. Droplets can be combined together by activating according electrodes to move them together. Droplet 2230 and droplet 2250 show bigger droplets manipulated by the Fluidic Micro-Crane system on both delivery plates 2220 and 2210. The adjustable gap 2270 between the top and bottom delivery plates plays a key role in the system that will be illustrated in sections below.

FIG. 42 shows the basic operation of a Fluidic Micro-Crane system. The first step for the delivery, shown in FIG. 42A, is to move one droplet 4230 on the top plate to the location of electrode 4210 and move another droplet 4240 on the bottom plate to the location of electrode 4220. The gap 4207 between the top and the bottom plates is adjusted to allow a small gap 4204 between droplet 4230 and droplet 4240. Increase the size of one of the droplet will change the radius of the droplet. Because the strong surface tension of the relatively small droplet, the surface curvature of the droplets can be approximated by a circle on the open end. The increase of the radius of droplet 4260 shown in FIG. 42B make the two droplets touch each other. At that situation if electrodes 4220 and 4290 are activated and electrode 4210 is deactivated, the combined droplet 4270 will be pulled down from the top to the bottom plate as indicated in FIG. 42C.

Figure 42A:
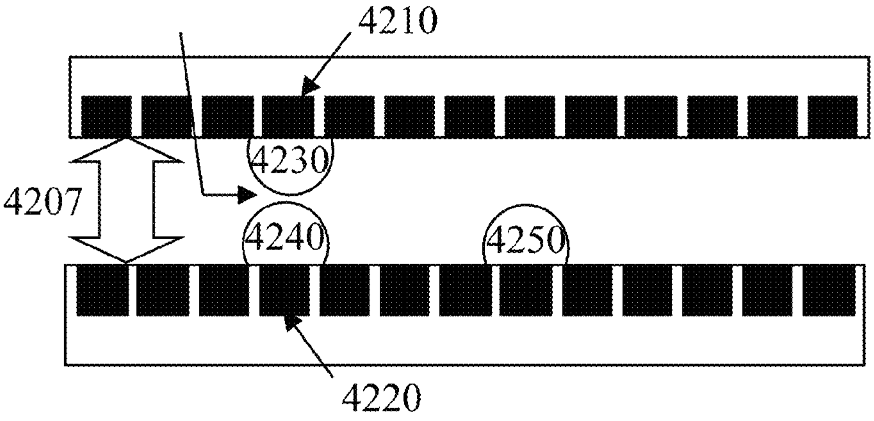
FIGS. 42A, 42B, 42C and 42D are illustrations of basic operations of the Fluidic Micro-Crane system.
Figure 42B:
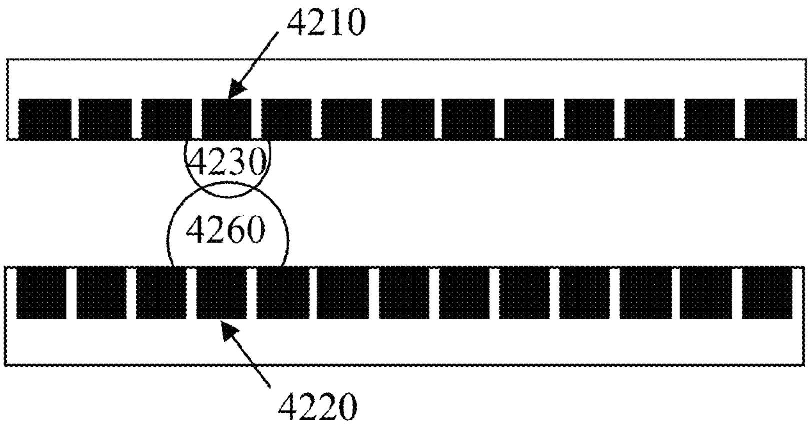
Figure 42C:
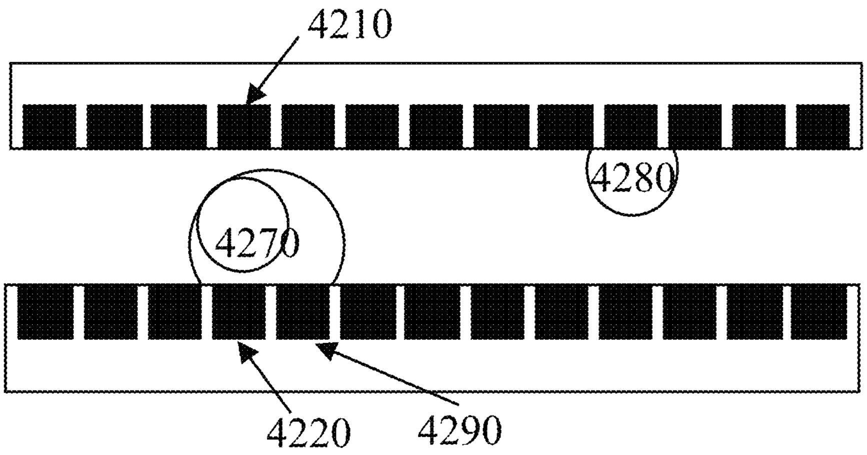
Figure 42D:
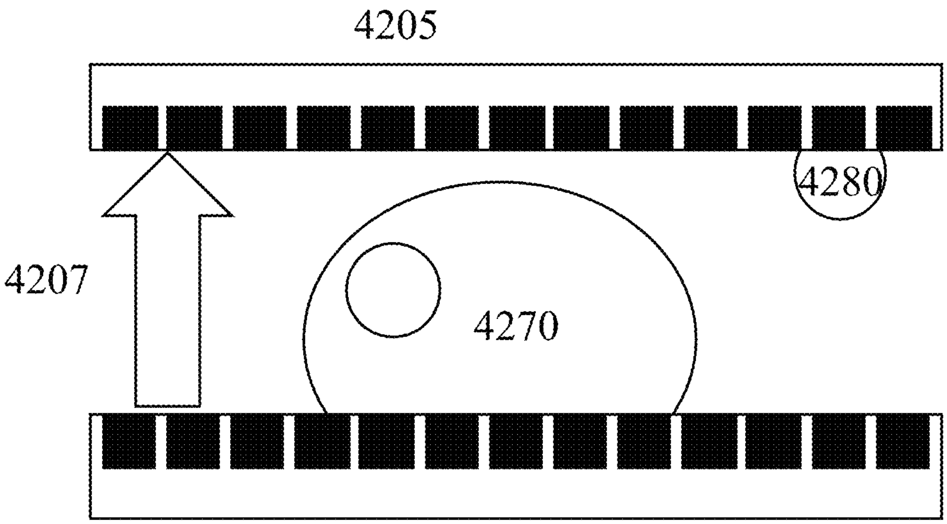

This technique can be repeatedly applied when the droplets on two plates are not significantly different in sizes. Once one of the droplets is much bigger than another, the gap 4207 can be adjusted to let the moved-in-droplet 4280 touches the targeted droplet 4270 as shown in FIG. 42D. The precaution to have the gap between droplet 4230 and droplet 4240 in FIG. 42A is to prevent a premature merge of droplet when the droplet is relatively small that the liquid surface tension is the significant force in work and the merged droplet could be pulled to the wrong side of the plate.

FIG. 43 shows one embodiment of the Fluidic Micro-Crane system in work from the top view. The initial locations of the growing tissues are described as in FIG. 43A. The initial black droplets 4310 and white droplets 4320 are formed on the bottom plate. The black and white colors indicate different chemical compounds or tissues. When living cells or chemicals are precisely added to the locations, the sizes of the droplets 4310 and 4320 start to grow as shown in FIG. 43B. Also the tissues or chemical compounds are housed by the droplets 4310 and 4320. When the droplets keep increasing in size and eventually touch and connect with other droplets then they form the necessary shape of the layer of the tissues or chemical compounds as shown in FIG. 43C.

Figure 43A:
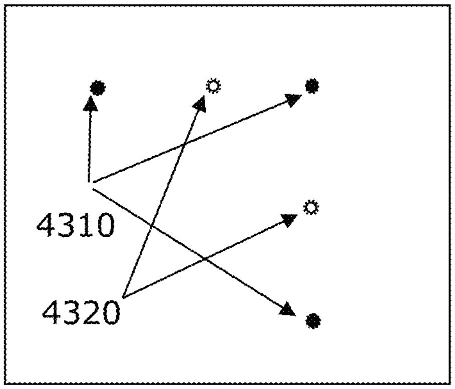
FIGS. 43A, 43B, 43C and 43D are illustrations of a 3D biochemical constructing system based on the Fluidic Micro-Crane system.
Figure 43B:
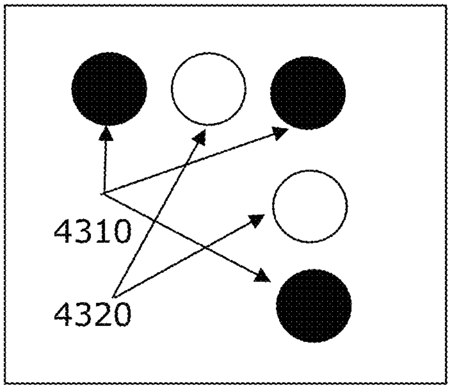
Figure 43C:
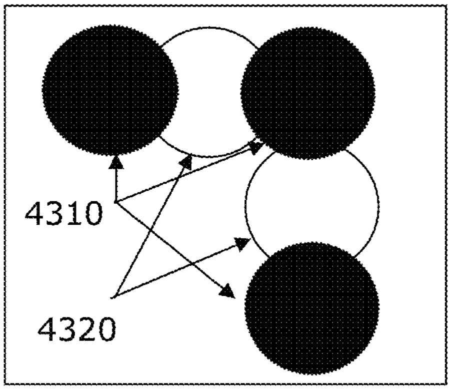
Figure 43D:
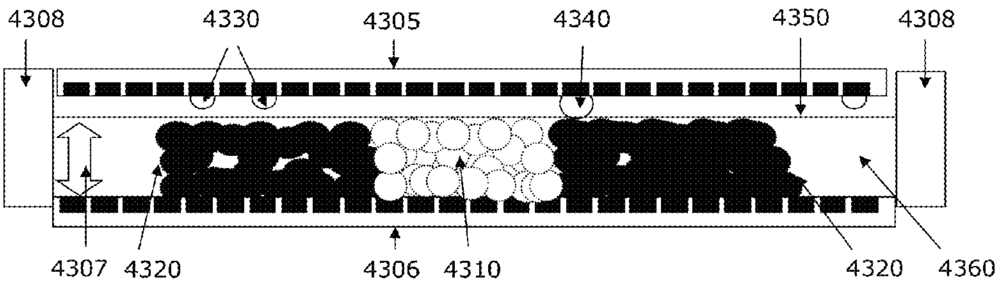

FIG. 43D shows a side view of FIG. 43C. The top plate 4302 is jacked up to increase the gap 4307 and leaves room for the growth of the next layer of tissues or chemical compounds. If the tissues or chemical compounds 4310 and 4320 grow to the size that is bigger than droplets can effectively contain then side walls 4308 are added and liquid such as medium of nutrients 4360 is added to the level of the liquid surface 4350. Droplets 4330 are moved along the top delivery plate and droplet 4340 is an added-up droplet that touches the liquid surface 4350 and will be pulled down. This process can be repeated until the desired tissues or chemical compounds are formed.

Figure 44:
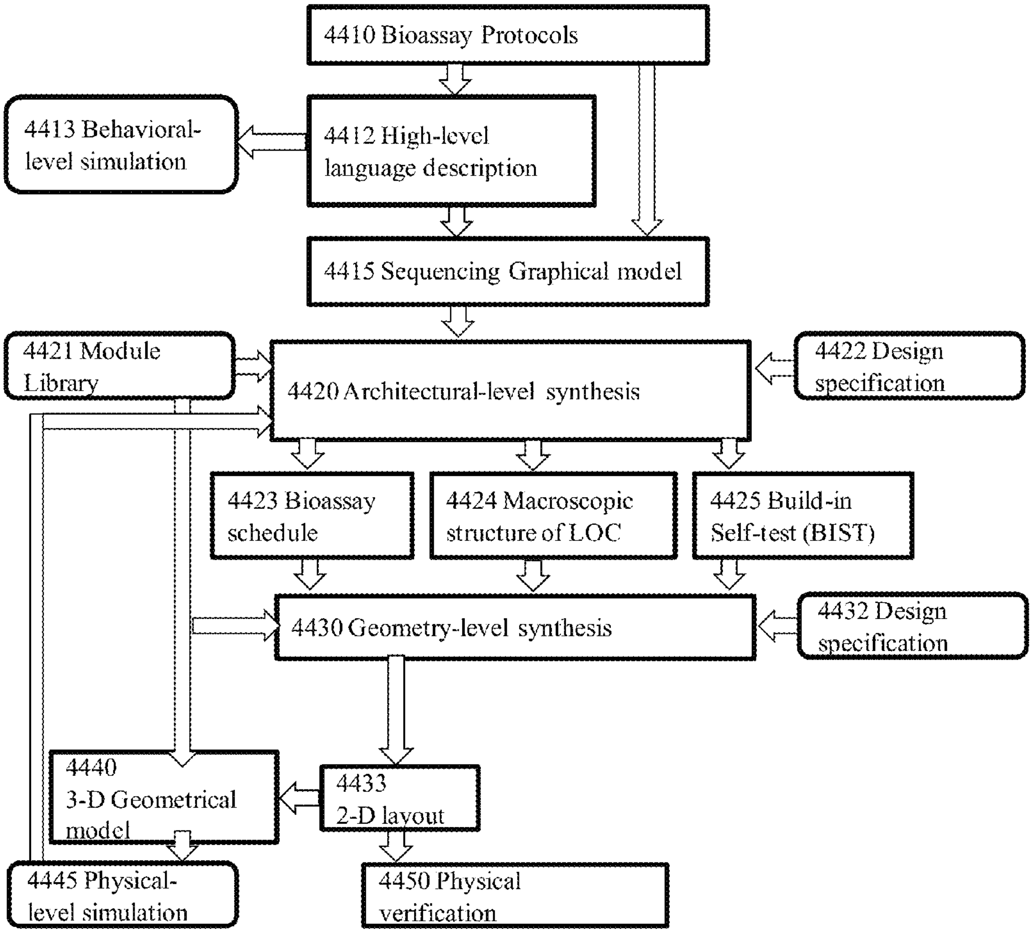
FIG. 44 is the illustration of the flow chart of a top-down design methodology for FPLOC design and programming.

The framework of the top-down design methodology for microelectrode array architecture is illustrated in FIG. 44. The design starts at the "bioassay protocols" 4410 provided by the biochip users. A "sequencing graph model" 4415 can be generated from "High-level Language description" 4412 to describe this assay protocol. This model can be used to perform "behavioral-level simulation" 4413 to verify the assay functionality at the high level. Next, "Architectural-level Synthesis" 4420 is used to generate detailed implementations from the sequencing graph model. A "microfluidic module library" 4421 and "Design Specification" 4422 are also provided as an input of the synthesis procedure. This module library, analogous to a standard cell library used in cell-based VLSI design, includes different microfluidic functional modules, such as mixers and storage units. Compact models are used to different microfluidic functional modules and parameters such as width, length and operation duration through device simulations or laboratory experiments. In addition, some design specifications are also given a priori, for example, an upper limit on the completion time, an upper limit on the size of chip footprint, and the set of non-reconfigurable resources such as on-chip reservoirs/dispensing ports and integrated optical detectors. The output of the synthesis process 4420 includes a mapping of assay operation to on-chip resources 4442, a schedule for the assay operations 4423, and Build-in Self-test (BIST) 4425. Then the geometry level synthesis 4430 takes place with input of Design specification on geometry-level 4432. The synthesis procedure attempts to find a desirable design point that satisfies the input specifications and also optimizes some figures of merit, such as performance and area. After synthesis, the 2-D physical design 4433 of the biochip (i.e., module placement and routing) can be coupled with detailed physical information from the module library (associated with some fabrication technology) to obtain a 3-D geometrical model 4440. This model can be used to perform physical-level simulation 4445 and design verification 4450 at a low level. After physical verification, the biochip design can be sent for manufacturing.

In another embodiment, a next-generation system-on-chip (SOC) with the integration of microfluidics and microelectronics is achieved by the combination of Microelectrode Array Architecture and by leveraging the same level of computer-aided design (CAD) support that the semiconductor industry now takes for granted. In one embodiment, to integrate the design of microfluidics in next-generation SOC microfluidic application-level function descriptions are added as libraries. Each FLB 3320 as illustrated in FIG. 33 can be easily described in VHDL (stands for VHSIC Hardware Description Language, and VHSIC in turn stands for Very High Speed Integrated Circuits) or Verilog. VHDL and Verilog are industry standard languages used to describe hardware from the abstract to the concrete level. The EDA vendors support VHDL both in & out of their tools (Simulation tools, Synthesis tools, & Verification tools). Initially the RTL description in VHDL or Verilog is simulated by creating test benches to simulate the system and observe results. Then, after the synthesis engine has mapped the design to a netlist, the netlist is translated to a gate level description where simulation is repeated to confirm the synthesis proceeded without errors. Finally the design is laid out (illustrative examples as control circuit 3451, microelectrode 3470, and the ground lines 3430 shown in FIG. 34) in the SOC at which point propagation delays can be added and the simulation run again with these values back-annotated onto the netlist. In addition to existing EDA languages, simulations and other tools, microelectrode structure as illustrated in FIG. 32 including the dielectric layer, hydrophobic layer, the hybrid structure and the droplet 3250 will need new descriptions added into VHDL and Verilog to simulate the design at multiple stages throughout the design process as Microfluidic Device Simulation Tools. Three-dimensional device geometry is discretized into a set of small cells or elements ("meshes"), based on which, a set of partial differential equations (PDE) that describe the corresponding domain physics (e.g., hydrodynamics, mechanics or electrostatics) or coupled multidomains of physics (e.g., electro-kinetics, fluid structure interaction) will be solved numerically. Device simulation usually offers high-fidelity predictions of the device behavior under the given operating condition.

Figure 45A:
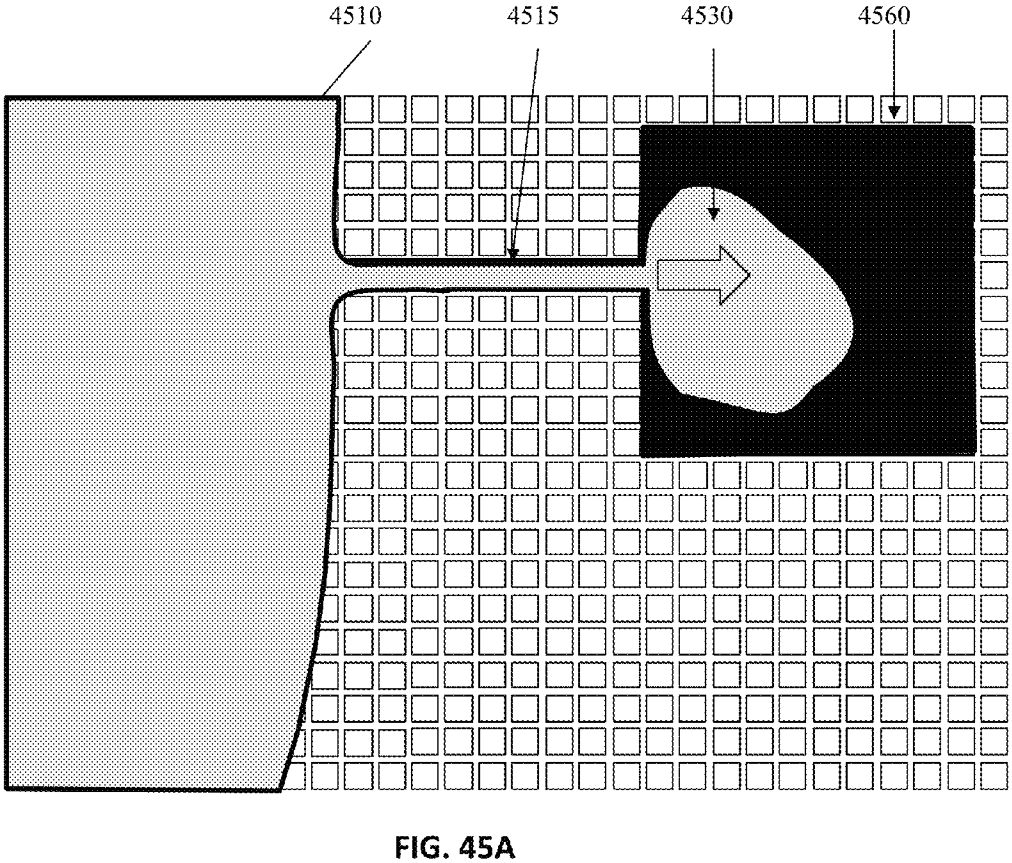
FIGS. 45A, 45B and 45C are illustrations of the creation of liquids by continuous-flow actuations.
Figure 45B:
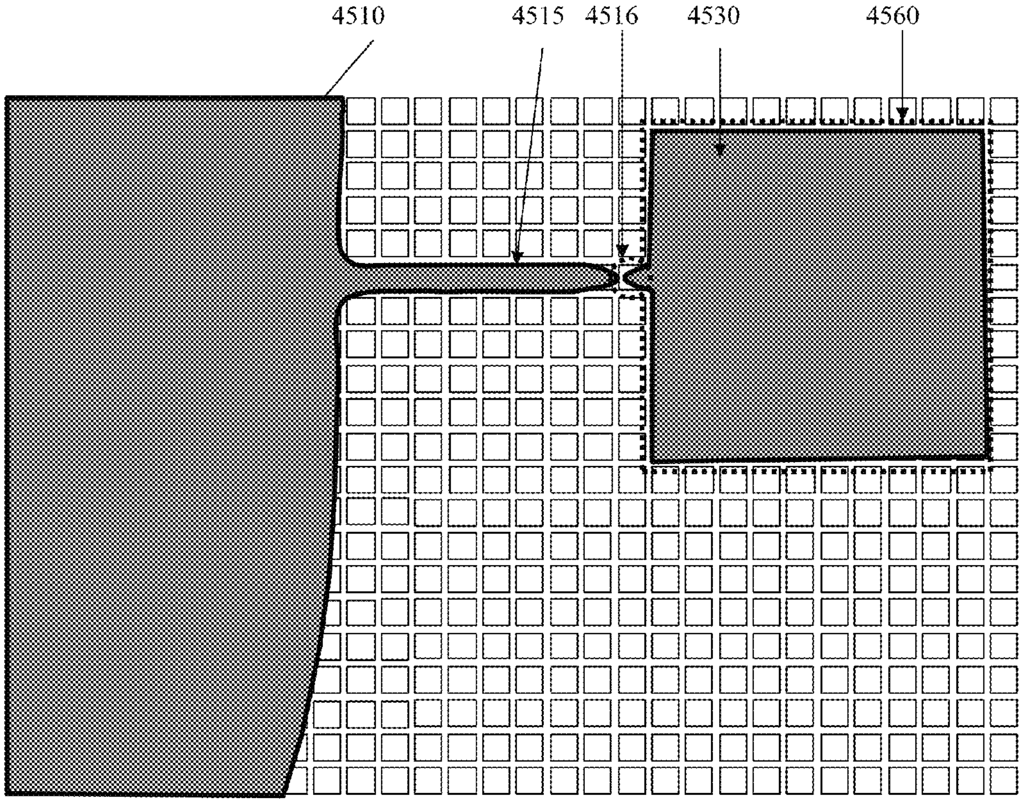
Figure 45C:
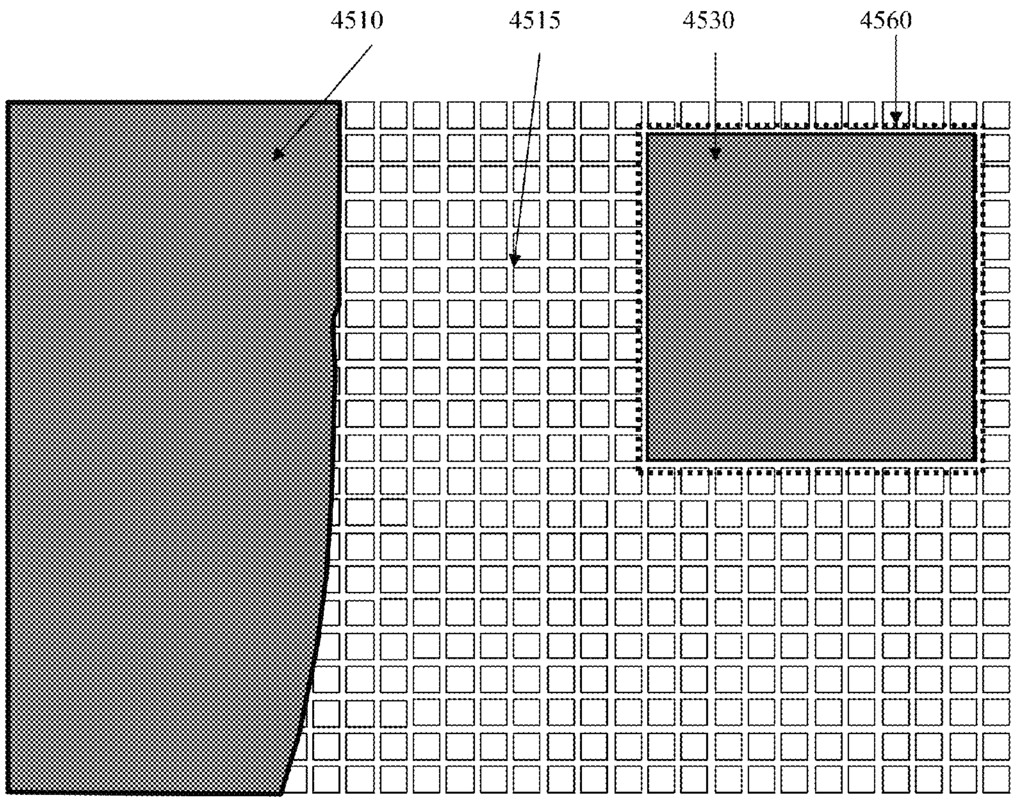

In various embodiments, Microelectrode Array Architecture can perform continuous-flow microfluidic operations instead of droplet-based microfluidic operations. Continuous microfluidic operations provide very simple in control but very effective way of doing microfluidic operations. FIGS. 45A-C illustrate the creation of a certain volume of liquid 4530 from the reservoir 4510. As shown in FIG. 45A, a small line of microelectrodes formed a bridge 4515 between the targeted configured-electrode 4560 and the reservoir 4510. When the bridge 4515 and the targeted configured-electrode 4560 are activated that causes a liquid flow from the reservoir into the targeted configured-electrode 4560. 4530 indicates the liquid flows from the bridge into the configured-electrode 4560. The bridge here is a single line of microelectrodes. This bridge configuration has the characteristics of both continuous-flow and droplet-based systems. It has all the benefits of a channel that once the bridge configured-electrode is activated the liquid will flow through it without extra controls and concerns on the activating timing and speeds. But it also has all the advantages of droplet-based system that once the bridge 4515 is deactivated all liquid will be pulled back to either the reservoir or the targeted configured-electrode 4560 and it has no dead-volume in the channel. Once the targeted configured-electrode 4560 is filled up then deactivated the bridge 4515 to cut the liquid 4530 from the reservoir 4510 as shown in FIG. 45B. The liquid fill-up of the configured-electrode 4560 is automatic that once all microelectrodes of the bridge and the configured-electrode are filled up with liquid then the liquid flow from the reservoir 4510 will stop, so the timing control of the procedure is not critical. The creation of liquid 4530 can be precisely controlled by activating the appropriate microelectrodes 4560 and the breaking point of the bridge. As shown in FIG. 45B, liquid 4530 is breaking out from the reservoir 4510 by deactivating microelectrode 4516 first then the bridge is deactivated. This procedure will make sure most of the liquid formed the bridge will be pull back to the reservoir 4510 and the liquid 4530 will be precisely controlled by the number of microelectrodes of the configured-electrode 4560. In FIG. 45B, the configured-electrode 4560 is composed of 10×10 microelectrodes. Other sizes and shapes of the configured-electrodes can be defined to create different liquid sizes and shapes. FIG. 45C shows the disappearing of the liquid bridge and the liquid 4530 is created by activating reservoir 4510 and the configured-electrode 4560.

Figure 45D:
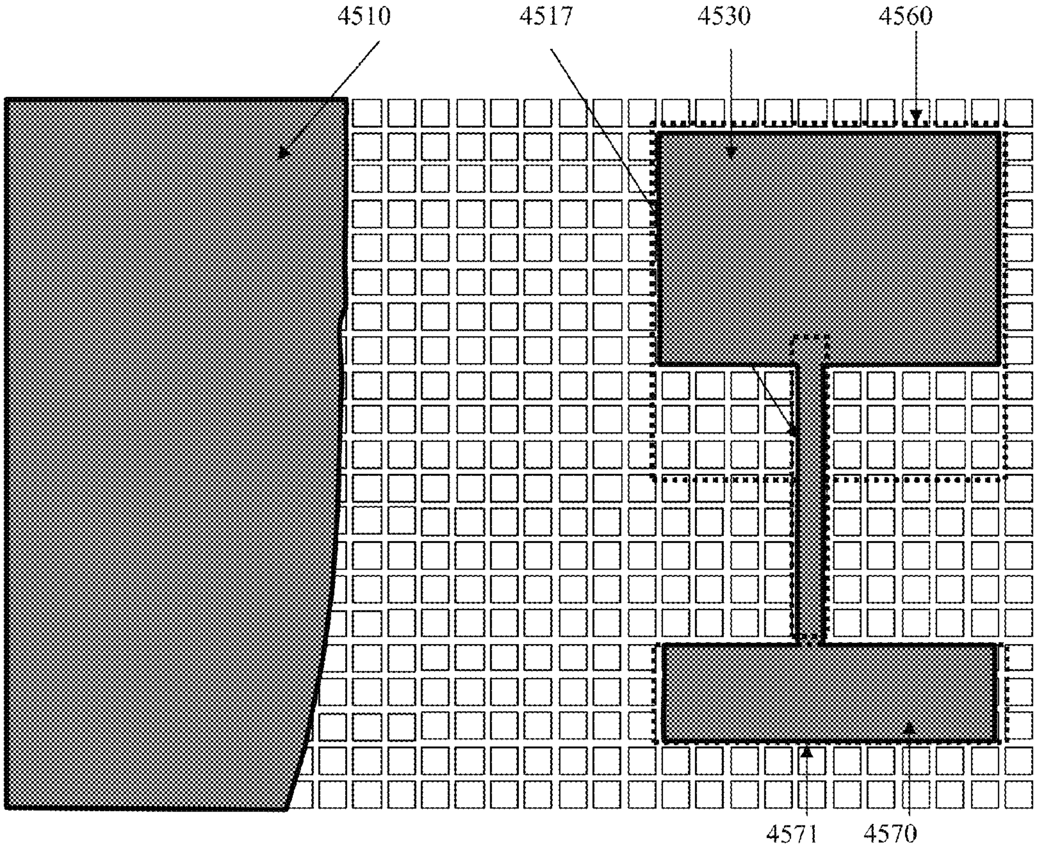
FIGS. 45D and 45E are illustrations of the cutting of liquid by continuous-flow actuations.
Figure 45E:
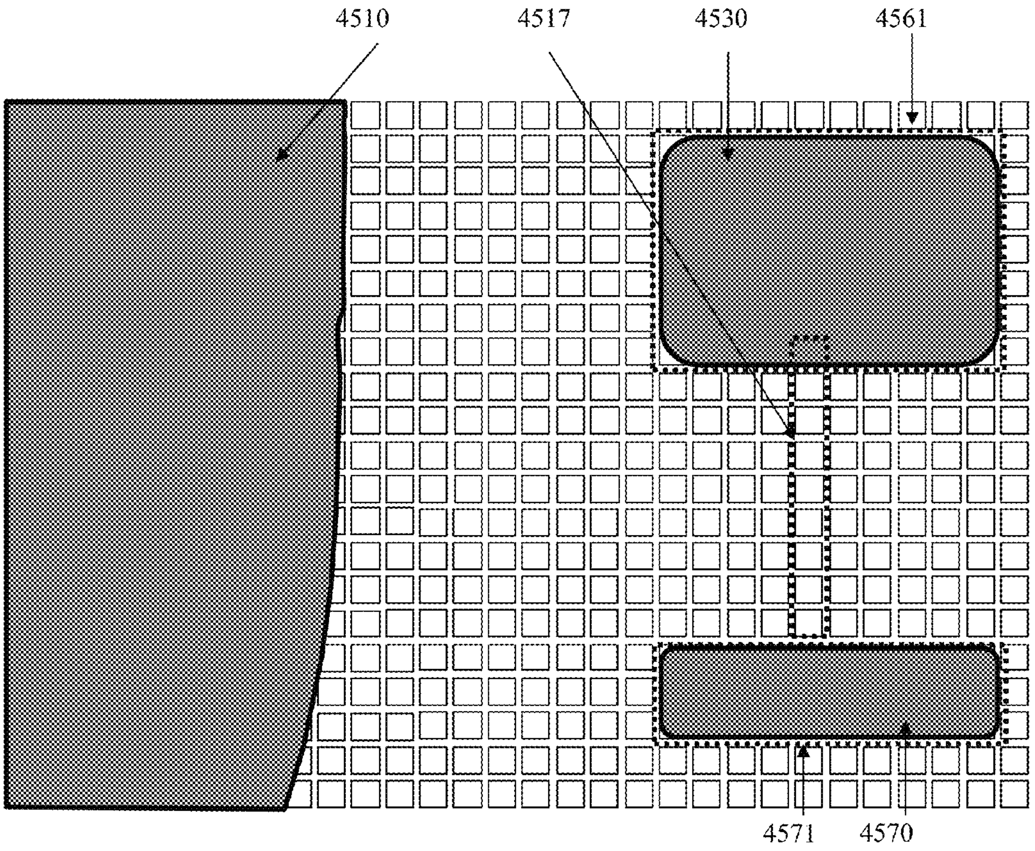

In one embodiment, the same creating procedure of liquid can be used to perform the cutting of the liquid into two sub-liquids as illustrated in FIG. 45D. After deactivating configured-electrode 4560, configured-bridge-electrode 4517 and targeted configured-electrode 4571 are activated and liquid flows from the bridge into the area of 4570. Deactivating the configured-bridge-electrode 4517, then activating configured-electrodes 4561 and 4571 breaks up and forms the two sub-liquids 4570 and 4530 as illustrated in FIG. 45E. This cutting process can generate the two sub-liquids in different sizes as long as the size of the configured-electrodes 4561 and 4571 are pre-calculated to the desired sizes.

Figure 46A:
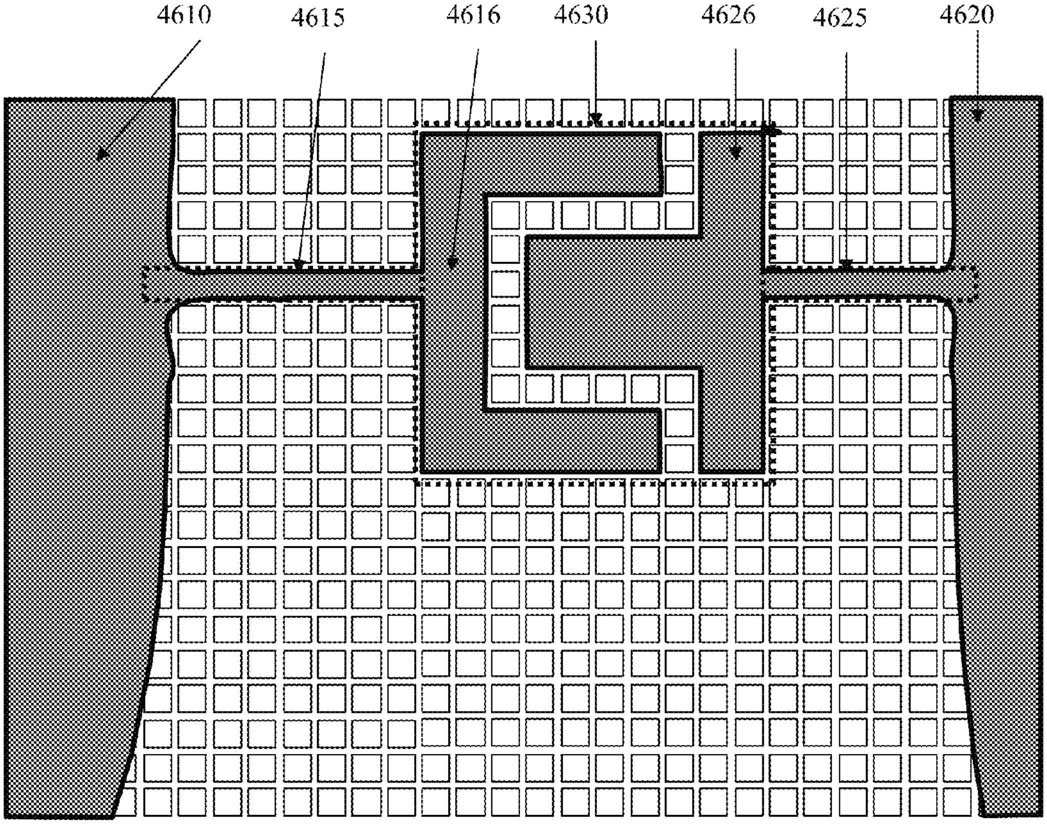
FIGS. 46A, 46B and 46C are illustrations of the merge/mixing of liquids by continuous-flow actuations.
Figure 46B:
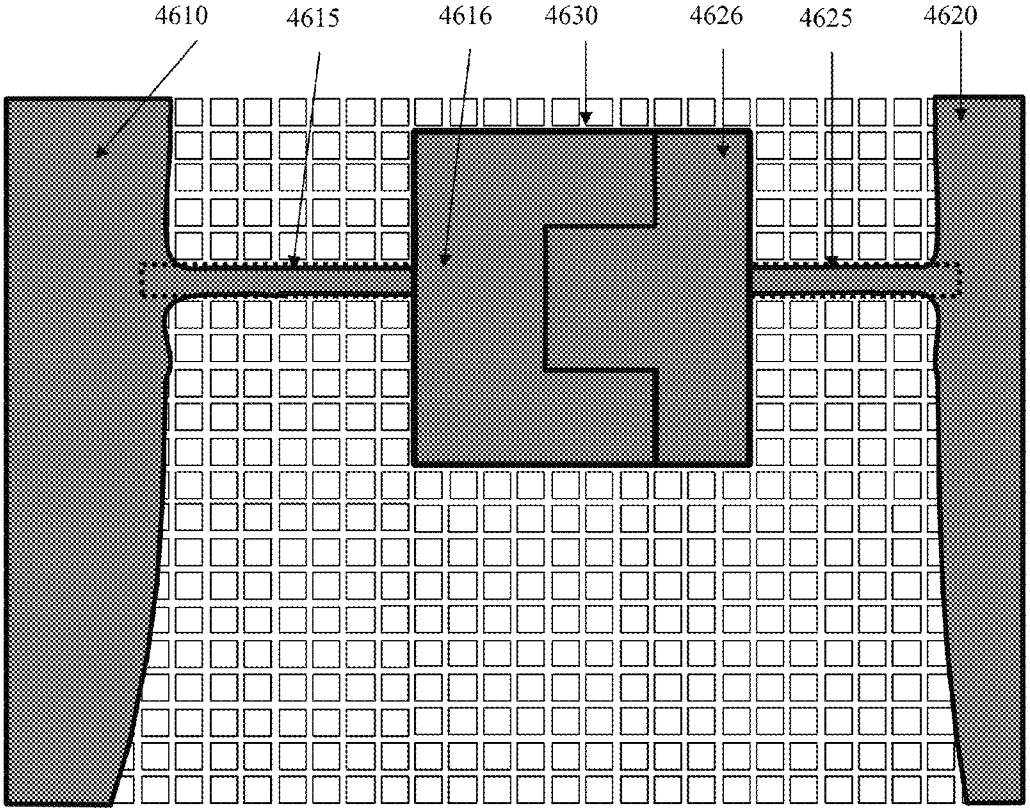
Figure 46C:
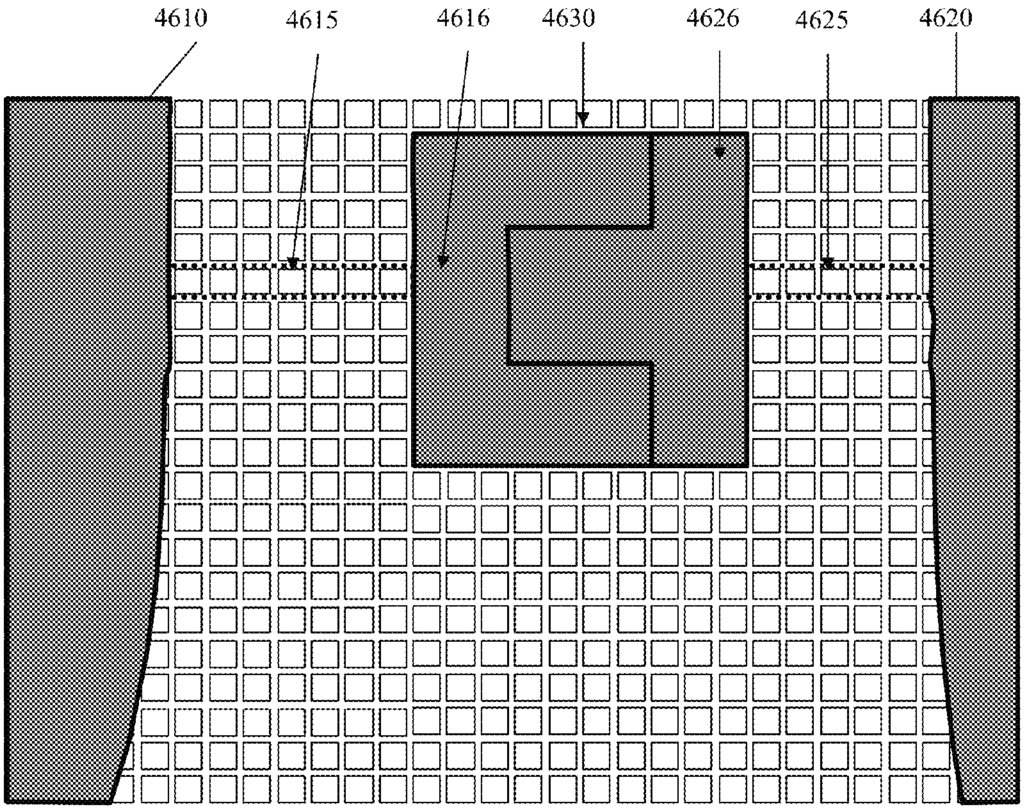

In another embodiment, FIGS. 46A-C illustrate the mixing procedure by the continuous-flow microfluidic operations. FIG. 46A shows the activating of bridges 4615 and 4625 and the activating of configured-electrodes 4616 and 4626, liquids are flowing from reservoirs 4610 and 4620 through the bridges into the mixing chamber 4630. Here liquids associate with configured-electrodes 4616 and 4626 are in de-formed shapes for better mixing and also liquids also are in different size for a ratio mixing. Gap is between configured-electrodes 4616 and 4626 to prevent the premature mixing. Once the liquid fill up both configured-electrodes 4616 and 4626, then configured-electrode 4630 (10×10-microelectrodes) is activated and the two liquid will be mixed as indicated in FIG. 46B. Then two bridge-electrodes are deactivated as illustrated in FIG. 46C.

In this simple mixing microfluidic operations, actually all fundamental microfluidic operations are demonstrated: (1) Creating: liquids 4616 and 4626 are created from reservoirs 4610 and 4620 in a precise way, (2) Cutting: liquid 4616 is cut off from liquid 4610 and liquid 4626 is cut from liquid 4620, (3) Transporting: Bridges 4615 and 4625 transport liquids to the mixing chamber, and (4) Mixing: liquid 4616 and 4626 are mixed at 4630. It's very obvious that this continuous-flow technique not only can be used to perform all microfluidic operations but also in a more precise way because the resolution of the precision is depend on the small microelectrode.

Although the present invention has been described with reference to preferred embodiments, persons skilled in the art will recognize that changes may be made in form and detail without departing from the spirit and scope of the invention.

What is claimed is:

1. A device of the microelectrode array, comprising:

a bottom plate comprising an array of multiple microelectrodes disposed on a top surface of a substrate covered by a dielectric layer; wherein each of the microelectrode is coupled to at least one grounding elements of a grounding mechanism, wherein a hydrophobic layer is disposed on the top of the dielectric layer and the grounding elements to make hydrophobic surfaces with droplets;

a field programmed lab-on-chip (LOC) for programming a group of configured-electrodes to generate microfluidic components and layouts with selected shapes and sizes; and a droplet operation module comprising etched electrodes and ground lines;

a system control for configuring the microelectrodes into microfluidic components and layout/networks for the microfluidic components, controlling and managing microfluidic operations, and partitioning the device;

an I/O interface for obtaining, displaying, reporting and storing assay results, connecting to the device to external information system, and connecting to external systems.

2. The device of claim 1, wherein the configured-electrodes in the field programmability lab-on-chip comprising: a first configured-electrode comprising multiple microelectrodes arranged in array, and at least one second adjacent configured-electrode adjacent to the first configured-electrode, the droplet being disposed on the top of the first configured-electrode and overlapped with a portion of the second adjacent-configured-electrode.

3. The device of claim 2, wherein the configured-electrodes comprise at least one microelectrode.

4. The device of claim 3, wherein the microfluidic components of the group of configured-electrodes in the field programmability lab-on-chip comprise reservoirs, electrodes, mixing chambers, detection windows, waste reservoirs, droplet pathways and special functional electrodes.

5. The device of claim 4, wherein the layout of the microfluidic components comprises the physical allocations of input/output ports, reservoirs, electrodes, mixing chambers, detection windows, waste reservoirs, pathways, special functional electrodes and electrode networks.

6. The device of claim 1 wherein the reservoir is loaded with liquid.

7. The method of claim 1, wherein the grounding mechanism is fabricated on the top plate of a bi-planar structure wherein the top plate is above the bottom plate with a gap in-between.

8. The device of claim 1, wherein the grounding mechanism is a coplanar structure comprises a passive top cover or without a top cover.

9. The device of claim 1, wherein the grounding mechanism is a coplanar structure comprising ground grids.

10. The device of claim 1, wherein the grounding mechanism is a coplanar structure comprising ground pads.

11. The device of claim 1, wherein the grounding mechanism is a coplanar structure comprising programmed ground pads.

12. The device of claim 1, wherein the grounding mechanism is a hybrid structure, a combination of the bi-planar structure and the coplanar structure with a selectable switch.

13. The device of claim 1, wherein the droplet is sandwiched between the top plate and the bottom plate with a gap distance for accommodating the wide ranges of droplets with different sizes, wherein the device can perform the steps comprising: a. configuring the height of the gap distance between the top plate and the bottom plate; b. configuring the size of the configured-electrode to control the size of the droplet resulting touching the top and bottom plates; and c. configuring the size of the configured-electrode to control the size of the droplet resulting touching only the bottom plate.

14. The device of claim 1, wherein the microelectrode can be generally round, square, hexagon bee-hive, or stacked-brick shapes arranged in array.

15. The device of claim 1, wherein the droplet manipulation unit performs sample preparation comprising a narrow channel with a blocking material attached to the top plate for preparing the samples, comprises the steps of: a. activating microelectrodes to create micro-sized droplet which is too small to carry the particles; b. moving the micro-sized droplets through the narrow channel to the desired location while particles are left behind; and c. repeating the movement of the micro-sized droplets until the desired-size droplet is created.

16. The device of claim 1, wherein the system control unit-comprises a hierarchical system structure, comprising: a. a biomedical microfluidic functions layer for defining application-level functions and the purposes of the microelectrode array device; b. a microfluidic operations layer under the biomedical microfluidic functions layer for controlling and managing the microfluidic operations; c. a microfluidic component layer under the microfluidic operations layer for creating a physical configurations and layouts of the microfluidic components; and d. a microelectrode arrays layer under the microfluidic component layer for managing the geometrical parameters of the microelectrodes.

17. The device of claim 1 is an EWOD device wherein the driving voltage is in the range from DC to 10 kHz of AC with less than 150V.

18. The device of claim 1 is a DEP device wherein the driving voltage is in the range from 50 kHz to 200 kHz of AC with 100 to 300 Vrms.

* * * * *